United States Patent
Seto et al.

(10) Patent No.: US 6,965,739 B2
(45) Date of Patent: Nov. 15, 2005

(54) OPTICAL COMMUNICATION SYSTEM

(75) Inventors: Ichiro Seto, Fuchu (JP); Tazuko Tomioka, Tokyo (JP); Shigeru Ohshima, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 393 days.

(21) Appl. No.: 10/267,596

(22) Filed: Oct. 10, 2002

(65) Prior Publication Data
US 2003/0035183 A1 Feb. 20, 2003

Related U.S. Application Data

(63) Continuation of application No. 09/329,574, filed on Jun. 10, 1999, now Pat. No. 6,504,636.

(30) Foreign Application Priority Data

Jun. 11, 1998 (JP) ............................................. 10-163561
Oct. 30, 1998 (JP) ............................................. 10-309981

(51) Int. Cl.⁷ ................................................ H04J 14/00
(52) U.S. Cl. ........................... 398/183; 398/31; 398/32; 398/115; 370/485; 370/491
(58) Field of Search ............................ 398/116, 31, 32, 398/182, 183, 186; 370/343, 481, 485, 491; 379/56.2; 359/124, 152

(56) References Cited

U.S. PATENT DOCUMENTS 3,717,814 A * 2/1973 Gans ........................... 455/504
5,339,184 A * 8/1994 Tang ........................... 398/116
5,475,707 A 12/1995 Ficarra et al.
5,615,034 A 3/1997 Hori

FOREIGN PATENT DOCUMENTS

| JP | 06-098365 | 4/1994 |
|----|-----------|--------|
| JP | 06-164427 | 6/1994 |
| JP | 06-350537 | 12/1994 |
| JP | 08-316908 | 11/1996 |

* cited by examiner

*Primary Examiner*—M. R. Sedighian
*Assistant Examiner*—David C. Payne
(74) *Attorney, Agent, or Firm*—Oblon, Spivak, McClelland, Maier & Neustadt, P.C.

(57) ABSTRACT

An optical communication system for optically transmitting transmission data from a transmitting station to a transmitting device includes an adder for adding an intermediate frequency subcarrier signal modulated with data to be transmitted to a pilot carrier signal as a sinusoidal wave, and an electro-optical converter for electro-optically converting the above sum signal to an optical signal by directly modulating a semiconductor laser element having a resonant frequency fr in accordance with the sum signal and transmitting the signal to an optical fiber for a down link. The frequency $f_{IF}$ of the intermediate frequency subcarrier signal and the frequency $f_{LO}$ of the pilot carrier signal satisfy $f_{LO} - f_{IF} \geq 1[GHz]$, $2 \times f_{IF} < f_{LO} < (\text{⅔}) \times fr$, $f_{IF} < 1[GHz]$, and $2 [GHz] \leq f_{LO}$.

10 Claims, 20 Drawing Sheets

OPTICAL COMMUNICATION SYSTEM

RELATED APPLICATIONS

This Application is a continuation of Ser. No. 09/329,574, filed Jun. 10, 1999 now U.S. Pat. No. 6,504,636, which claims priority to Japanese Patent No.'s 10-163561, filed Jun. 11, 1998 and 10-309981, filed Oct. 30, 1998, the disclosures of which are incorporated by reference herein in their entirety.

BACKGROUND OF THE INVENTION

The present invention relates to an optical communication system for transmitting a high-frequency analog signal such as a radio signal via an optical fiber.

This application is based on Japanese Patent Application No. 10-163561, filed Jun. 11, 1998 and Japanese Patent Application No. 10-309981, filed Oct. 30, 1998, the contents of which are incorporated herein by reference.

Along with recent development of mobile communication, expansion of radio communication service areas is required. To effectively utilize radio wave frequency resources and reduce cost of base station equipment, a scheme in which individual radio zones (cells) are made small, and instead, a number of radio zones are arranged at a high density has received a great deal of attention. This is called a picocell radio zone. To realize the picocell radio zone, a radio communication base station arrangement in which transmitting/receiving devices and transmitting/receiving stations are connected through optical fibers has been examined.

More specifically, a radio base station has transmitting/receiving stations and transmitting/receiving devices. A plurality of transmitting/receiving devices are prepared for one transmitting/receiving station. The output power from each transmitting/receiving device is made small for the picocell radio zones. The transmitting/receiving devices and the transmitting/receiving station are connected through optical fibers. The transmitting/receiving devices transmit signals received from a common transmitting/receiving station to subscribers and transmit signals received from subscribers to a common transmitting/receiving station. The output from each transmitting/receiving device is made small to reduce cost.

A transmitting/receiving device is mainly formed from an antenna section and placed in each cell. A transmitting/receiving station has a modem and a controller corresponding to the plurality of transmitting/receiving devices in the cells. Therefore, the transmitting/receiving station is also called a central control terminal station. An analog radio signal is optically transmitted through an optical fiber between the transmitting/receiving device and transmitting/receiving station. With this arrangement, each transmitting/receiving device can be made simple, compact, and low-cost, and one radio communication base station can provide a number of cells.

In this arrangement, the basic arrangement of a transmitting/receiving device includes only an antenna, and opto-electric and electro-optic conversion devices and does not depend on the data rate or modulation scheme of a radio signal. Therefore, even when the radio transmission scheme is changed, replacement of the transmitting/receiving device or change in constituent elements of the transmitting/receiving devices is unnecessary.

For the above optical analog transmission, an electro-optical converter (E/O converter) is required to convert an electrical signal into an optical signal. At the E/O converter, light intensity of a semiconductor laser element is modulated with a radio frequency signal. As the modulation scheme, a scheme of directly modulating a semiconductor laser element or a scheme using an external optical modulator is employed.

Advantages and disadvantages of these two schemes will be compared. In terms of modulation distortion characteristics, device scale, and device cost, the scheme of directly modulating a laser element is more advantageous.

However, the trend of technology obviously indicates carrier frequency shift to a higher frequency band, e.g., shift to the 2- to 5-[GHz] band as the capacity of a radio frequency signal increases. However, in a distributed feedback laser element (DFB-LD) as a representative laser element, the modulation frequency range with a relatively small modulation distortion is as low as 2 to 3 [GHz]. Therefore, direct modulation of a laser element using a radio frequency signal is becoming difficult.

As disclosed in, e.g., Japanese Patent Publication (KOKAI) No. 6-164427, a scheme (subcarrier transmission) of superposing an intermediate frequency subcarrier signal $f_{IF}$ modulated by a data signal on a pilot carrier signal $f_{LO}$ as a sinusoidal wave and optically transmitting the superposed analog signal from a transmitting/receiving station to a transmitting/receiving device has been proposed.

In the transmission scheme proposed in this prior art, the intermediate frequency subcarrier signal $f_{IF}$ is frequency-converted (up-converted) by a multiplied signal obtained by multiplying the received pilot carrier signal $f_{LO}$ on the transmitting/receiving device side, thereby obtaining a radio frequency signal. The laser element is used in a low frequency band with excellent modulation distortion characteristics, and the pilot carrier signal $f_{LO}$ is superposed on a frequency close to the intermediate frequency subcarrier signal $f_{IF}$.

According to an embodiment described in the above prior art, a pilot carrier signal $f_{LO}$ having a frequency of 300 [MHz] is superposed near an intermediate frequency subcarrier signal $f_{IF}$ in the 200-[MHz] band, as shown in FIG. 1. In this scheme, on the transmitting device side, to ensure the noise characteristics of the radio frequency signal and increase the frequency stability, the CNRs (Carrier-to-Noise Ratios) of the received intermediate frequency subcarrier signal $f_{IF}$ and pilot carrier signal $f_{LO}$ must be high. That is, the noise level must be low.

However, in the frequency band near the pilot carrier signal $f_{LO}$, the RIN (Relative Intensity Noise) increases. Therefore, when the pilot carrier signal $f_{LO}$ is arranged near the frequency band of the intermediate frequency subcarrier signal $f_{IF}$, as in the prior art, the CNR decreases.

FIG. 2 shows the result of an experiment conducted by the present inventors. When the intermediate frequency subcarrier signal $f_{IF}$ is set at 500 [MHz] and the pilot carrier signal $f_{LO}$ is set at 550 [MHz], the RIN characteristics largely degrade in accordance with the optical modulation index of the pilot carrier signal $f_{LO}$ and, more particularly, at an optical modulation index of 15 [%] or more, as shown in FIG. 2. Therefore, the communication quality of a radio frequency signal greatly degrades.

Especially, when the optical modulation index of the pilot carrier signal $f_{LO}$ increases, degradation in RIN becomes conspicuous. Hence, a radio frequency signal generated by frequency-converting the intermediate frequency subcarrier signal $f_{IF}$ using the pilot carrier signal $f_{LO}$ contains a number of noise components and therefore has poor transmission characteristics. When a radio frequency signal containing a number of noise components is transmitted, the noise components adversely affect other radio frequency signals to impede radio communication. Solutions to this problem are required.

To cope with a shortage in channels due to the recent increase in number of subscribers or an increase in transmission rate, extensive studies have been made for radio communication using a frequency band higher than the conventional frequency band, e.g., millimeter waves or submillimeter waves. For this system as well, an arrangement for connecting transmitting/receiving devices and transmitting/receiving stations through optical fibers has been examined.

As a connection form using optical fibers, a PON (Passive Optical Network) is used. In the PON, as shown in FIGS. 3 and 4, a transmitting/receiving station 1 and a plurality of transmitting/receiving devices 2 are connected through optical fibers 4 in which a passive optical divider 3 is inserted. An optical signal transmitted from the transmitting/receiving station 1 to the optical fiber 4 is divided by the optical divider 3 inserted into the optical fiber 4, and distributed to the transmitting/receiving devices 2.

In the PON, a passive optical divider 3 is inserted midway along optical fibers 4 to accommodate the plurality of transmitting/receiving devices 2. Hence, the optical transmission/reception device of the transmitting/receiving station 1 and optical fibers 4 can be shared, and accordingly, the equipment can be made compact.

In the PON, an optical signal transmitted from the transmitting/receiving station 1 is divided, so the same signal reaches the plurality of transmitting/receiving devices 2. There is no problem when radio signals transmitted from the plurality of transmitting/receiving devices are completely equal. However, different transmitting/receiving devices 2 normally transmit different radio signals.

Conventionally, as shown in the spectrum arrangement in FIG. 5, an optical signal to be transmitted from the transmitting/receiving station to the transmitting/receiving device is frequency-multiplexed while changing the frequency of the intermediate frequency subcarrier signal $f_{IF}$ corresponding with each transmitting/receiving devices and sent (subcarrier multiplex transmission scheme). In this case, each transmitting/receiving device receives the optical signal, extracts a component to be transmitted from the self station, converts the component into a radio signal frequency, and transmits the signal from the antenna.

In the example shown in FIG. 5, the frequencies of the intermediate frequency signal are assigned at an appropriate interval and frequency-multiplexed: for example, a signal $f_{IF1}$ to a transmitting/receiving device 2-1 is assigned near 100 [MHz], a signal $f_{IF2}$ to a transmitting/receiving device 2-2 is assigned near 200 [MHz], and a signal $f_{IF3}$ to a transmitting/receiving device 2-3 is assigned near 300 [MHz]. Therefore, if radio signals sent from the transmitting/receiving devices 2-1, . . . , 2-3 are in the 2 [GHz] band, the transmitting/receiving device 2-1 must up-convert the signal $f_{IF1}$ by 1.9 [GHz], the transmitting/receiving device 2-2 must up-convert the signal $f_{IF2}$ by 1.8 [GHz], and the transmitting/receiving device 2-3 must up-convert the signal $f_{IF3}$ by 1.7 [GHz].

For a conventional radio system using optical subcarrier transmission, a method has been proposed in which not only the intermediate frequency subcarrier signal $f_{IF}$ but also the pilot carrier signal $f_{LO}$ as a signal for maintaining the frequency stability of the radio wave transmitted from the transmitting/receiving devices is transmitted, and each transmitting/receiving device frequency-converts (up-converts) the intermediate frequency subcarrier signal $f_{IF}$ using the pilot carrier signal $f_{LO}$, as shown in FIG. 1.

As a consequence, when the frequencies of intermediate frequency subcarrier signals for the individual transmitting/receiving devices are different, as shown in FIG. 5, pilot carrier signals $f_{LO}$ for frequency conversion must be prepared for the respective intermediate frequency subcarrier signals $f_{IF}$. Pilot carrier signals $f_{LO}$ corresponding to the number of intermediate frequency subcarrier signals multiplexed must be sent. These signals are multiplexed and sent in optical transmission.

As a result, the total number of signals including the pilot carrier signal $f_{LO}$ increases. Since the optical modulation index of the intermediate frequency subcarrier signals in optical transmission is shared by the pilot carrier signals $f_{LO}$, the optical modulation index decreases to degrade the transmission quality.

In the radio system, when a plurality of radio base stations (transmitting/receiving devices) provide the same service, frequencies slightly different from each other in the same frequency band are sometimes used to prevent interference between signals from adjacent base stations.

For example, frequencies are separated at an interval of 100 [kHz] in the 2 [GHz] band. When such transmitting/receiving devices are accommodated through one fiber, a system in which subcarrier signals with different frequencies are multiplexed in the radio frequency band while only one pilot carrier signal is transmitted can be constructed.

In this case, however, each transmitting/receiving device 2 that has received the optical signal from the transmitting/receiving station 1 must select a signal to be used in the self station from signals arranged at an interval as small as 100 [kHz]. For this purpose, a very steep filter with high frequency stability is required, resulting in an increase in cost. In a radio system using a radio scheme other than frequency multiplexing, e.g., CDMA, signals transmitted from transmitting/receiving devices are in the same frequency band. Therefore, the method of transmitting only one pilot carrier signal $f_{LO}$ using a steep filter cannot be used.

To simplify the arrangement, an intermediate frequency signal to be used in the self station must be separated from intermediate frequency signals, which are multiplexed as subcarriers, using a simple filter, as described above. For this purpose, subcarriers are preferably multiplexed at a large frequency interval.

However, to do this, a plurality of pilot carrier signals $f_{LO}$ corresponding to the number of the intermediate signals $f_{IF}$ are necessary. To stabilize transmission quality, the optical modulation index should not be decreased. Sending more signals including a plurality of pilot carrier signals $f_{LO}$ means increasing the optical modulation index for the total signals. The amount of RIN corresponds to the optical modulation index. There is the effect of interference modulation as one of the others noise decreasing transmission quality. The effect of the interference modulation also corresponds to the number of signals and the optical modulation index. The plurality of pilot carriers inevitable degrades the data transmission quality.

BRIEF SUMMARY OF THE INVENTION

Accordingly, it is an object of the present invention to provide an optical communication system which can generate a radio frequency signal excellent in noise characteristics without decreasing the CNR of an intermediate frequency subcarrier signal $f_{IF}$ when a laser beam is directly modulated using a signal obtained by synthesizing the intermediate frequency subcarrier signal $f_{IF}$ and a pilot carrier signal $f_{LO}$ to optically transmit the analog intermediate frequency subcarrier signal $f_{IF}$ and pilot carrier signal $f_{LO}$ with a large optical modulation index.

It is a second object of the present invention to provide an inexpensive and simple optical communication system which can reduce the number of pilot carrier signals $f_{LO}$ to be sent from a transmitting/receiving station to transmitting/receiving devices, that are necessary for frequency conversion, multiplex subcarriers at a large frequency interval, and separate the intermediate frequency subcarrier signals using a simple filter.

An optical communication system according to the present invention, which multiplexes a subcarrier signal and a pilot carrier signal and optically transmits the multiplexed signal from a transmitting/receiving station to a transmitting/receiving device has the following arrangement.

The frequency band of a pilot carrier signal $f_{LO}$ and that of a subcarrier signal $f_{IF}$ are arranged such that $f_{LO}-f_{IF} \geq 1$ [GHz] and $2 \times f_{IF} < f_{LO} < (2/3) \times fr$ (resonant frequency of a laser) are satisfied.

With this arrangement, the RIN characteristics of the subcarrier signal $f_{IF}$ can be prevented from degrading due to multiplex of the pilot carrier signal $f_{LO}$. Since satisfactory CNR characteristics can be provided on the transmitting/receiving device side, the communication quality of the transmitted optical signal is improved. When the above conditions are satisfied, degradation in RIN characteristics can be suppressed even when a large optical modulation index is set for the pilot carrier signal. Since the optical modulation index of the pilot carrier signal can be made large, the pilot carrier signal $f_{LO}$ with excellent CNR characteristics can be provided on the transmitting/receiving device side. Since the pilot carrier signal $f_{LO}$ is used by a multiplier as a local oscillation signal for frequency conversion, an additive noise amount in the output from the multiplier decreases, so a radio frequency signal with few noise components can be obtained.

When the pilot carrier signal $f_{LO}$ is excellent in CNR characteristics, the Q value of the filter for extracting the pilot carrier signal $f_{LO}$ can be made small, so the frequency band of the pilot carrier signal $f_{LO}$ to be transmitted becomes wide. That is, since the frequency range of the radio frequency signal to be processed on the transmitting/receiving device side is widened, a transmitting/receiving station with a large application range can be provided.

On the transmitting/receiving device side, the pilot carrier signal $f_{LO}$ transmitted from the transmitting/receiving station side can be extracted with a high CNR. Therefore, the frequency of the radio frequency signal can be up- or down-converted while suppressing the additive noise amount. Since the degradation in CNR characteristics of the subcarrier signal and pilot carrier signal is small, the optical transmission distance between the transmitting/receiving station and transmitting/receiving device can be increased. More specifically, the setting range of a transmitting/receiving device connected to one transmitting/receiving station can increase, the number of transmitting/receiving devices which can be connected can be increased, and the radio communication service area can be efficiency expanded.

Except the RIN value, a modulation distortion also degrades the CNR characteristics. The frequency band with good laser modulation distortion characteristics is lower than 1 [GHz]. Hence, when $f_{IF}<1$[GHz] and 2 [GHz]$<f_{LO}$ are satisfied, a transmission system in which degradation in CNR due to not only the RIN value but also modulation distortion is suppressed can be provided.

According to the present invention, when a plurality of transmitting/receiving devices are connected to a transmitting/receiving station through a PON, the frequency stability between the transmitting/receiving devices can be maintained using a simpler optical transmission system. More specifically, the frequency of a radio wave is set such that when data signals subcarrier-multiplexed are to be distributed from a transmitting/receiving station to a plurality of transmitting/receiving devices, the data signals to be used by the transmitting/receiving devices are subcarrier-multiplexed at a sufficiently large frequency interval so that the data signals can be separated by a simple filter after reception of an optical signal, and only two pilot carrier signals suffice to synchronize the frequencies of radio waves radiated from the transmitting/receiving devices (independently of the number of transmitting/receiving devices). As a consequence, an optical communication system in which while establishing frequency synchronization between the transmitting/receiving devices, satisfactory transmission can be performed without sacrificing the optical modulation index of the data signal in optical subcarrier transmission due to transmission of the pilot carrier signal, and the process of extracting necessary signals after reception of an optical signal is easy and inexpensive can be provided.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

A preferred embodiment of an optical communication system according to the present invention will now be described with reference to the accompanying drawings.

First Embodiment

Figure 6:
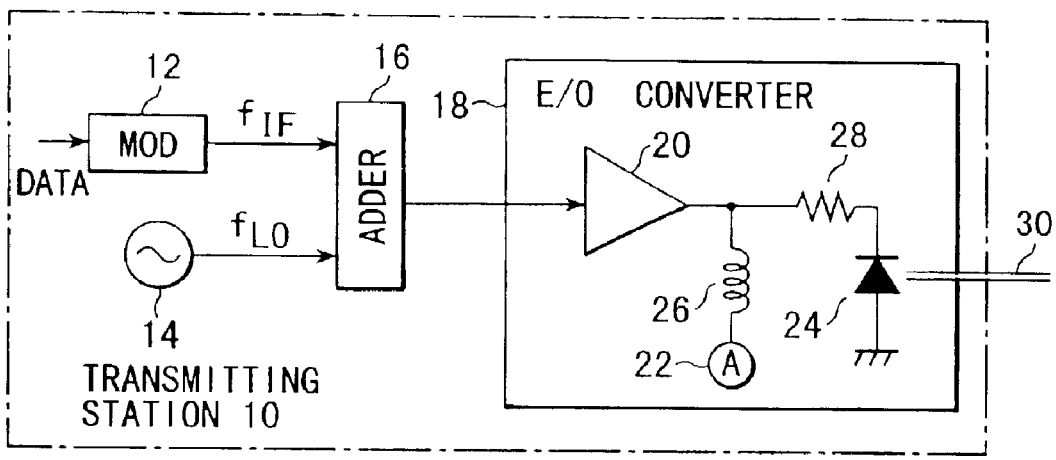
FIG. 6 is the block diagram showing the arrangement of a transmitting station in an optical communication system according to a first embodiment of the present invention.

FIG. 6 shows the arrangement of a transmitting station as part of the first embodiment of the present invention. A transmitting station 10 comprises a modulator 12, an oscillator 14, an adder 16, and an electro-optical converter (E/O) converter 18.

The modulator 12 modulates an intermediate frequency signal, which is output from an oscillator (not shown), with a data signal to be transmitted and supplies an intermediate frequency subcarrier signal $f_{IF}$ as the modulation result to the first input terminal of the adder 16. The adder 16 adds the intermediate frequency subcarrier signal $f_{IF}$ to a pilot carrier signal $f_{LO}$ output from the oscillator 14.

The E/O converter 18 converts the sum signal of the intermediate frequency subcarrier signal $f_{IF}$ and pilot carrier signal $f_{LO}$ into an optical signal. The E/O converter 18 comprises a driver amplifier 20, a current source 22, a semiconductor laser element 24, an inductor 26, and a resistor 28. The inductor 26 applies a bias corresponding to the output from the current source 22 to an output signal from the driver amplifier 20. The resistor 28 is an input resistor for supplying the biased output from the driver amplifier 20 to the semiconductor laser element 24 as a direct modulation signal. The semiconductor laser element 24 emits a laser beam modulated in correspondence with the output from the adder 16 and sends the laser beam to an optical fiber 30 as a transmission line. The semiconductor laser element 24 used is a DFB laser diode for analog transmission.

The laser beam output from the semiconductor laser element 24 is transmitted to a transmitting device (not shown) through the optical fiber 30. The resonant frequency of the semiconductor laser element 24 is represented by fr.

Figure 7:
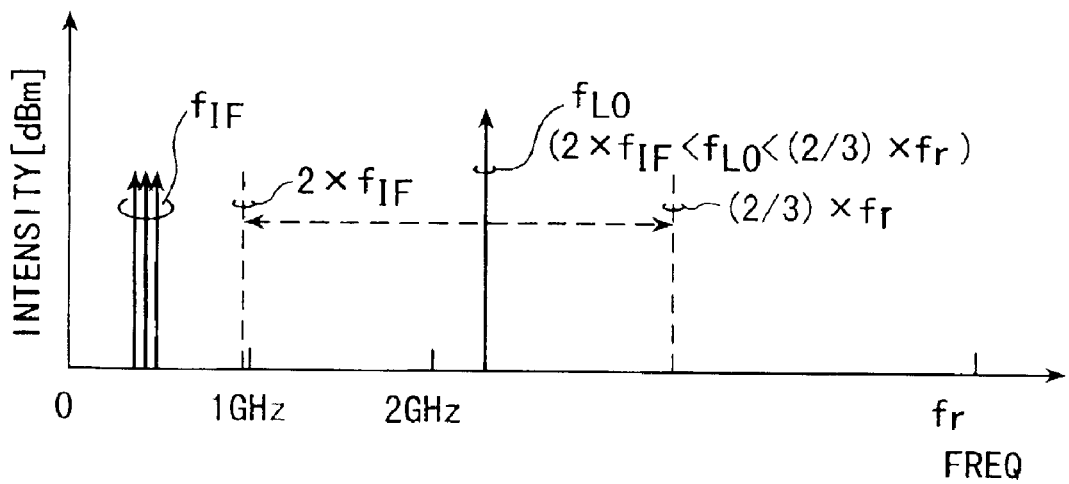
FIG. 7 is a graph showing the frequency arrangement of an intermediate frequency subcarrier signal $f_{IF}$ and a pilot carrier signal $f_{LO}$ in the first embodiment.

In this arrangement, a condition required for the frequency arrangement relationship between the intermediate frequency subcarrier signal $f_{IF}$ and pilot carrier signal $f_{LO}$ is $f_{LO}-f_{IF} \geq 1[GHz]$. FIG. 7 shows the frequency arrangement of the intermediate frequency subcarrier signal $f_{IF}$ and the pilot carrier signal $f_{LO}$.

Normally, the lower the frequency band becomes, the more excellent the modulation distortion characteristics and RIN characteristics of the semiconductor laser element 24 become. Therefore, the intermediate frequency subcarrier signal $f_{IF}$ modulated with the data to be transmitted is arranged on the lower side of the pilot carrier signal $f_{LO}$. The pilot carrier signal $f_{LO}$ is a sinusoidal wave and can stand the distortion.

Figure 8:
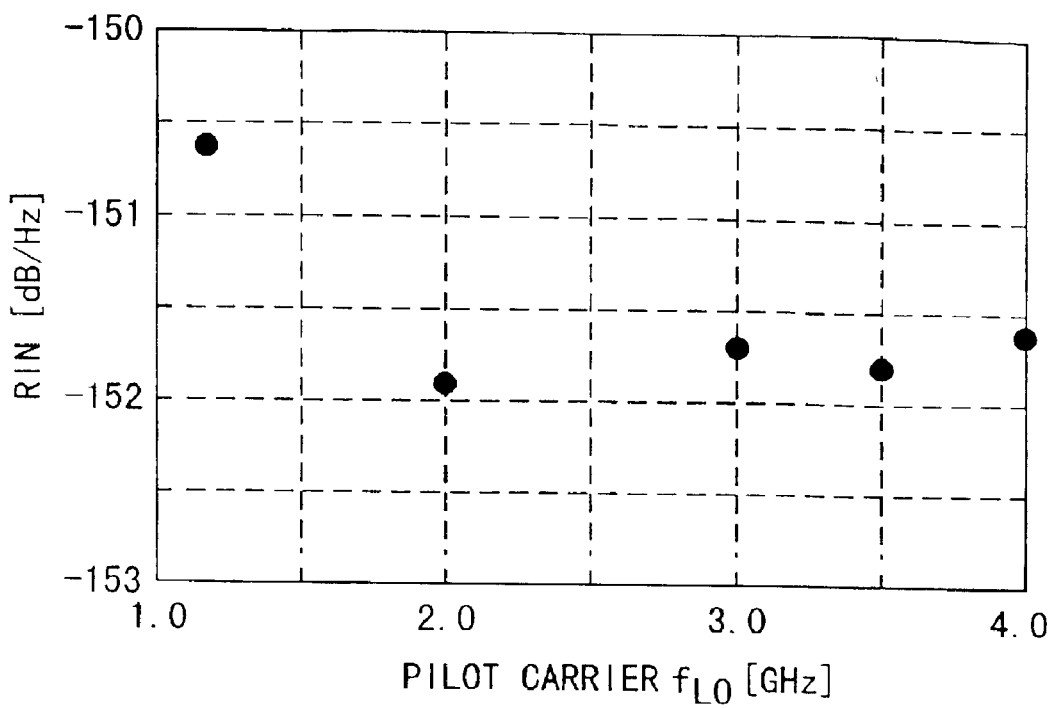
FIG. 8 is a graph showing the RIN vs. frequency characteristics of the pilot carrier signal $f_{LO}$ for the intermediate frequency subcarrier signal $f_{IF}$=1[GHz]

FIG. 8 shows the RIN characteristics of the intermediate frequency subcarrier signal $f_{IF}$ with respect to the frequency of the pilot carrier signal $f_{LO}$ in the semiconductor laser element 24 in the electro-optical converter 18. The intermediate frequency subcarrier signal $f_{IF}$ has a frequency of 1 [GHz]. The optical modulation index of the pilot carrier signal $f_{LO}$ is 40 [%]. The frequency of the intermediate frequency subcarrier signal $f_{IF}$ is changed to 1.2 [GHz], 2 [GHz], 3 [GHz], 3.5 [GHz], and 4 [GHz]. The RIN obtained when the pilot carrier signal $f_{LO}$ is not superposed is −152 [dB/Hz]. The RIN value is influenced by the spectral component of the pilot carrier signal $f_{LO}$. As the frequency becomes close to the pilot carrier signal $f_{LO}$, the degradation becomes large.

When the frequency is separated from the pilot carrier signal $f_{LO}$, the RIN value is improved. As shown in FIG. 8, when $f_{LO}-f_{IF} \geq 1$ [GHz], the RIN value is asymptotic to the value "−152" obtained when the pilot carrier signal $f_{LO}$ is not superposed, and stabilizes.

Figure 9:
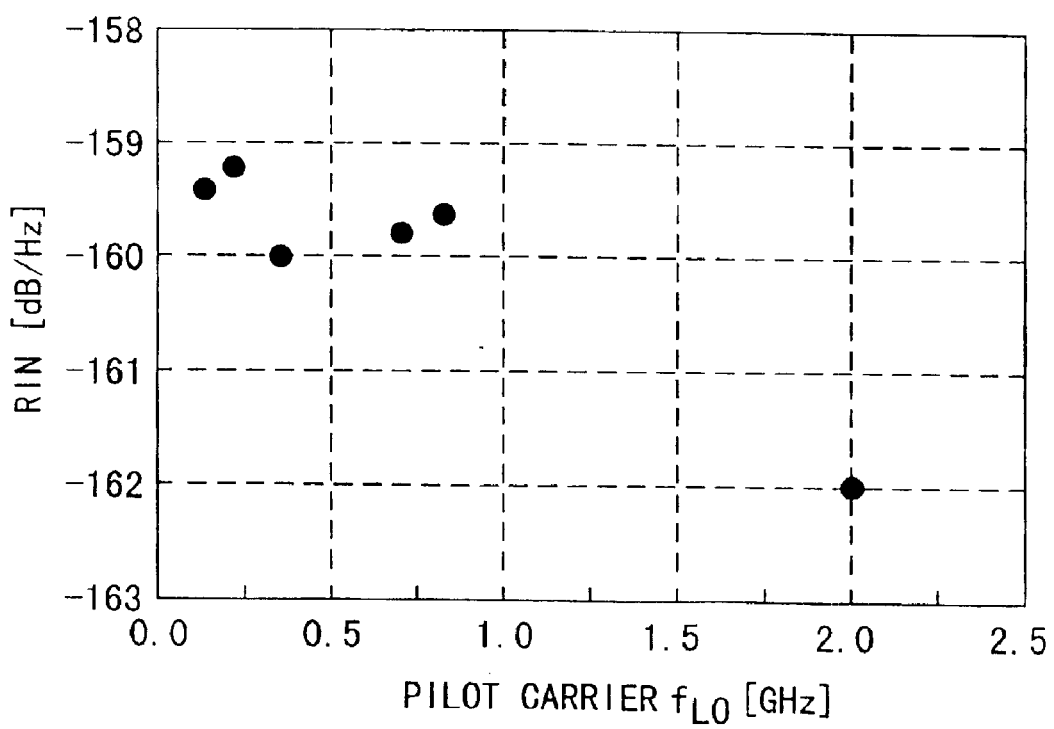
FIG. 9 is a graph showing the RIN vs. frequency characteristics of the pilot carrier signal $f_{LO}$ for the intermediate frequency subcarrier signal $f_{IF}$=120[GHz]

FIG. 9 shows the RIN value to the pilot carrier signal $f_{LO}$ when the intermediate frequency subcarrier signal $f_{IF}$ has a frequency of 120 [MHz]. The optical modulation index of the pilot carrier signal $f_{LO}$ is 40 [%], as in FIG. 8. The RIN value obtained when the pilot carrier signal $f_{LO}$ is not superposed is −164.0 [dB/Hz].

As is apparent from FIG. 9, when the pilot carrier signal $f_{LO}$ is close to the intermediate frequency subcarrier signal $f_{IF}$, and the difference between the two signals is 1 [GHz] or less (i.e., when $f_{LO}-f_{IF}<1$ [GHz]), the RIN value is −160 [dB/Hz], and the degradation is great. For a pilot carrier signal $f_{LO}=2$ [GHz] satisfying $f_{LO}-f_{IF} \geq 1$ [GHz], the RIN value becomes −162 [dB/Hz], and the degradation is apparently suppressed.

As is apparent from the above description, when $f_{LO}-f_{IF} \geq 1$ [GHz], the RIN characteristics can be improved.

Normally, the semiconductor laser element 24 has non-linear E/O conversion characteristics. When a laser element is modulated directly by a sum signal of $f_{LO}$ and $f_{IF}$, intermodulation components are appeared at frequency bands $f_{LO}-f_{IF}$ and $f_{LO}+f_{IF}$. If the intermodulation components overlap $f_{IF}$ and a resonant frequency fr, the noise characteristic for $f_{IF}$ is distorted. It is because the characteristics of laser elements becomes unstable by modulating the resonant frequency fr and RIN increased through the signal frequency band.

Therefore, the pilot carrier signal $f_{LO}$ must be arranged such that the frequency $f_{LO}+f_{IF}$ of the higher-band side distortion becomes lower than the resonant frequency fr and the frequency $f_{LO}-f_{IF}$ of the lower-band side distortion becomes higher than the signal frequency $f_{IF}$. Since $2 \times f_{IF} < f_{LO}$, and $f_{LO}+f_{IF} < fr$, $f_{LO}<(\frac{2}{3}) \times fr$. FIG. 7 shows the frequency arrangement of the intermediate frequency subcarrier signal $f_{IF}$ and pilot carrier signal $f_{LO}$, which satisfies these conditions.

As the semiconductor laser element 24, i.e., the semiconductor laser diode, a distributed feedback semiconductor laser (DFB-LD) or Fabri-Pérot semiconductor laser element (FP-LD) is used. Especially, a distributed feedback semiconductor laser element has a small modulation distortion that suppresses the dynamic range of a multi-channel signal, and is suitable for analog transmission. However, even in the distributed feedback semiconductor laser element, the frequency with a small modulation distortion and noise amount is normally 1 [GHz] or less.

When the intermediate frequency subcarrier signal $f_{IF}$ as an intermediate frequency subcarrier signal is arranged within the range of $f_{IF}>1$ [GHz], the dynamic range is suppressed because of degradation in modulation distortion characteristics and an increase in noise. Therefore, the intermediate frequency subcarrier signal $f_{IF}$ is preferably arranged within the range of $f_{IF}<1$ [GHz].

As is apparent from the RIN value when $f_{IF}=1$ [GHz], which is shown in FIG. 8 as the graph showing the pilot carrier signal $f_{LO}$ frequency vs. RIN characteristics, and the RIN value when $f_{IF}=120$ [MHz], which is shown in FIG. 9 as the graph showing the pilot carrier signal $f_{LO}$ frequency vs. RIN characteristics in the relatively high frequency band, the RIN value on the frequency band of the intermediate frequency subcarrier signal $f_{IF}$, 120 MHz, is smaller by about 10 dB/Hz than the RIN value on the frequency band of $f_{IF}$, 1 GHz.

As described above, when the frequency arrangement of the intermediate frequency subcarrier signal $f_{IF}$ and pilot carrier signal $f_{LO}$ satisfies $f_{IF}<1$ [GHz] and $f_{LO}>2$ [GHz], as shown in FIG. 7, satisfactory transmission characteristics can be maintained without any influence of the RIN characteristics and modulation distortion.

As described above, as a characteristic feature of the first embodiment, the intermediate frequency subcarrier signal $f_{IF}$ modulated with data to be transmitted is added to the pilot carrier signal $f_{LO}$ as a sinusoidal wave. The sum signal is electro-optically converted by directly modulating the semiconductor laser element 24 having the resonant frequency fr and transmitted to the down link optical fiber. The frequency $f_{IF}$ of the intermediate frequency subcarrier signal and the frequency $f_{LO}$ of the pilot carrier signal satisfy $f_{LO}-f_{IF} \geq 1$ [GHz] and $2 \times f_{IF} < f_{LO} < (\frac{2}{3}) \times fr$.

Normally, the lower the frequency band becomes, the more excellent the modulation distortion characteristics and RIN characteristics of the semiconductor laser element become. Therefore, when the intermediate frequency subcarrier signal $f_{IF}$ is arranged on the lower side of the pilot carrier signal $f_{LO}$, the pilot carrier signal $f_{LO}$ as a sinusoidal wave can stand the distortion.

In the RIN characteristics in the $f_{IF}$ band with respect to the pilot carrier signal $f_{LO}$ in the semiconductor laser element, which are shown in FIG. 8, the intermediate frequency subcarrier signal $f_{IF}$ has a frequency of 1 [GHz]. The optical modulation index of the pilot carrier signal $f_{LO}$ is 40 [%]. The frequency of the intermediate frequency subcarrier signal $f_{IF}$ is changed to 1.2 [GHz], 2 [GHz], 3 [GHz], 3.5 [GHz], and 4 [GHz]. The RIN obtained when the pilot carrier signal $f_{LO}$ is not superposed is −152 [dB/Hz]. The RIN value is influenced by the spectral component of the pilot carrier signal $f_{LO}$. As the frequency becomes close to the pilot carrier signal $f_{LO}$, the degradation becomes large.

When the frequency is separated from the pilot carrier signal $f_{LO}$, the RIN value decreases. As shown in FIG. 8, when $f_{LO}-f_{IF} \geq 1$ [GHz], the RIN value is asymptotic to the value "−152" obtained when the pilot carrier signal $f_{LO}$ is not superposed, and stabilizes.

As shown in FIG. 9, in the RIN characteristics with respect to the pilot carrier signal $f_{LO}$ when the intermediate frequency subcarrier signal $f_{IF}$ has a frequency of 120 [MHz], the optical modulation index of the pilot carrier signal $f_{LO}$ is 40 [%], as in FIG. 8. The RIN value obtained when the pilot carrier signal $f_{LO}$ is not superposed is −164.0 [dB/Hz].

As is apparent from FIG. 9, when the pilot carrier signal $f_{LO}$ is close to the intermediate frequency subcarrier signal $f_{IF}$, and the difference between the two signals is 1 [GHz] or less (i.e., when $f_{LO}-f_{IF}<1$ [GHz]), the RIN value is equal to or larger than −160 [dB/Hz], and the degradation is large. However, when the pilot carrier signal $f_{LO}$ maintains the relation to the $f_{IF}$ such that $f_{LO}-f_{IF} \geq 1$ [GHz], the degradation is suppressed.

Hence, when the arrangement satisfies $f_{LO}-f_{IF} \geq 1$ [GHz], the RIN characteristics can be improved.

Normally, the semiconductor laser element has non-linear E/O conversion characteristics. When the laser element is directly modulated, a frequency corresponding to $f_{LO} \pm f_{IF}$ has an intermodulation distortion between the signals $f_{LO}$ and $f_{IF}$, resulting in an increase in noise. Therefore, it is important to arrange the pilot carrier signal $f_{LO}$ with respect to the intermediate frequency subcarrier signal $f_{IF}$ in consideration of $f_{LO} \pm f_{IF}$. When the frequency $f_{LO}-f_{IF}$ of the lower-band side distortion overlaps the frequency band of the intermediate frequency subcarrier signal $f_{IF}$, the RIN characteristics in the peripheral band degrade, as described above.

To prevent this, $f_{LO} > 2 \times f_{IF}$ is set to satisfy $f_{LO}-f_{IF} > f_{IF}$, thereby avoiding the influence of degradation in RIN characteristics. In addition, the semiconductor laser element has the resonant frequency fr which is a specific frequency for each laser element.

Modulation efficiency at the resonant frequency fr band becomes much large comparing with the lower frequency band than fr. The resonant frequency is explained under. If a laser diode is suddenly turned-on from zero bias, a turn-on delay and an exponential rise in the optical output will be observed. The optical output initially overshoots and goes through a few cycles of damped oscillation before reaching equilibrium. The oscillation frequency of this behavior is called "resonant frequency fr". This behavior is caused by the inverse relationship between carrier density and photon density in the semiconductor. If the resonant frequency fr is modulated, the characteristics of the laser element become unstable, and the RIN increases throughout the frequency band. Therefore, the pilot carrier signal $f_{LO}$ must be arranged such that the frequency $f_{LO}+f_{IF}$ of the higher-band side distortion becomes lower than the resonant frequency fr. Since $2 \times f_{IF} < f_{LO}$, and $f_{LO}+f_{IF} < fr$, $f_{LO} < (\frac{2}{3}) \times fr$.

As another characteristic feature of the first embodiment, the frequency band $f_{IF}$ of the intermediate frequency subcarrier signal satisfies is lower than 1 [GHz], and the frequency band $f_{LO}$ of the pilot carrier signal $f_{LO}$ is higher than 2 [GHz].

As the semiconductor laser element, i.e., the semiconductor laser diode, a distributed feedback semiconductor laser (DFIB-LD) or Fabri-Pérot semiconductor laser element (FP-LD) is used. Especially, a DFB-LD has a small modulation distortion that suppresses the dynamic range of a multichannel signal, and is suitable for analog transmission. However, even in the DFB-LD, the frequency band with a small modulation distortion and noise amount is normally 1 [GHz] or less.

When the frequency $f_{IF}$ of the intermediate frequency subcarrier signal $f_{IF}$ as an intermediate frequency subcarrier signal is arranged within the range of $f_{IF} > 1$ [GHz], the dynamic range is suppressed because of degradation in modulation distortion characteristics and an increase in noise. Therefore, the intermediate frequency subcarrier signal $f_{IF}$ is preferably arranged within the range of $f_{IF} < 1$ [GHz].

As is apparent from the RIN value when $f_{IF}=1$ [GHz], which is shown in FIG. 8 as the graph showing the pilot carrier signal $f_{LO}$ frequency vs. RIN characteristics in the relatively low frequency band, and the RIN value when $f_{IF}=120$ [MHz], which is shown in FIG. 9 as the graph showing the pilot carrier signal $f_{LO}$ frequency vs. RIN characteristics in the relatively high frequency band, the RIN value on the frequency band of the intermediate frequency subcarrier signal $f_{IF}$, 120 [MHz], is smaller by about 10 dB/Hz than the RIN value on the frequency band of $f_{IF}$, 1 [GHz].

As described above, when the frequency arrangement of the intermediate frequency subcarrier signal $f_{IF}$ and pilot carrier signal $f_{LO}$ satisfies $f_{IF} < 1$ [GHz] and $f_{LO} > 2$ [GHz], satisfactory transmission characteristics can be maintained without any influence of the RIN characteristics and modulation distortion.

Other embodiments of the optical transmission apparatus according to the present invention will be described. The same portions as those of the first embodiment will be indicated in the same reference numerals and their detailed description will be omitted.

Second Embodiment

Figure 10:
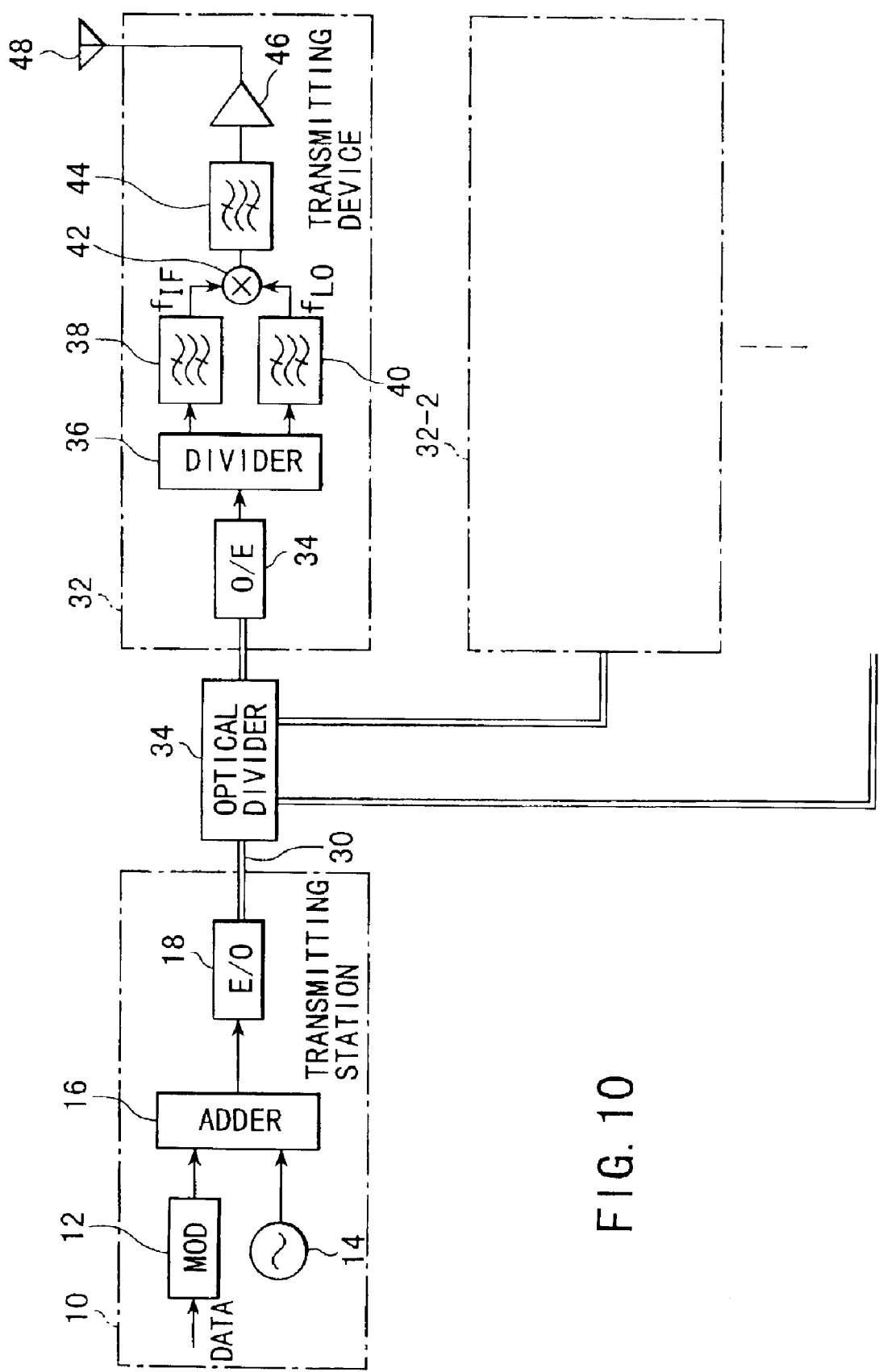
FIG. 10 is a block diagram showing the arrangement of an optical communication system according to a second embodiment of the present invention.

FIG. 10 shows an optical communication system according to the second embodiment of the present invention. The second embodiment is associated with an entire optical communication system including the transmitting station of the first embodiment of the present invention, and a radio communication base station device including a transmitting device.

As shown in FIG. 10, a transmitting station 10 is connected to transmitting devices 32-1, 32-2, . . . through an optical fiber 30.

Each transmitting device 32 is connected to the optical fiber 30 through an optical divider 34. The transmitting devices 32 are set at separate locations. A range where radio waves reach is a radio zone (cell or service area), and each transmitting device 32 can transmit/receive radio waves to/from communication terminals in the cell.

The transmitting station 10 is the same as in the first embodiment shown in FIG. 6.

The optical fiber 30 is an optical transmission line connecting an E/O converter 18 in the transmitting station 10 to an opto-electrical converter (O/E converter) 34 in each transmitting device 32.

Each transmitting device 32 comprises the O/E converter 34, a divider 36, bandpass filters 38 and 40, a multiplier 42, a bandpass filter 44, a power amplifier 46, and a transmission antenna 48.

The O/E converter 34 receives an optical signal transmitted through the optical fiber 30 and converts the optical signal into an electrical signal. The divider 36 receives the electrical signal output from the optical divider 34 and supplies it to the bandpass filters 38 and 40.

The bandpass filter 38 extracts an intermediate frequency subcarrier signal $f_{IF}$ and contains the frequency $f_{IF}$ in the passband. The bandpass filter 40 extracts a pilot carrier signal $f_{LO}$ and contains the frequency $f_{LO}$ in the passband.

The multiplier 42 multiplies output signals from the two bandpass filters 38 and 40 and outputs the multiplied signal. The bandpass filter 44 extracts a predetermined radio frequency signal from the output from the multiplier 42. The power amplifier 46 power-amplifies the radio frequency signal output from the bandpass filter 44. The antenna 48 radiates the amplified signal into air as a radio wave.

In the system with the above arrangement, a radio data signal obtained by adding the pilot carrier signal $f_{LO}$ from a local oscillator 14 to the intermediate frequency subcarrier signal $f_{IF}$ from a radio signal modulator 12 by an adder 16 in the transmitting station 10 is input to an E/O converter 18.

The E/O converter 18 directly modulates a laser beam with the radio data signal to obtain an optical signal. This optical signal is transmitted to the transmitting devices 32-1, 32-2, . . . through the optical fiber 30.

On the side of each of the transmitting devices 32-1, 32-2, . . . , the optical signal transmitted through the optical fiber 30 is received by the O/E converter 34, converted into an electrical signal and separated into two paths by the divider 36. One is supplied to the bandpass filter 38 having the passband for the intermediate frequency subcarrier signal $f_{IF}$, and the other is supplied to the bandpass filter 40 having the passband for the pilot carrier signal $f_{LO}$, thereby reproducing the original intermediate frequency subcarrier signal $f_{IF}$ and pilot carrier signal $f_{LO}$.

The reproduced intermediate frequency subcarrier signal $f_{IF}$ and pilot carrier signal $f_{LO}$ are input to the multiplier 42 and multiplied.

The output from the multiplier 42 is passed through the bandpass filter 44 to extract a predetermined radio frequency signal. The extracted radio frequency signal is amplified through the power amplifier 46, radiated from the transmission antenna 48 into air as a radio wave, and transmitted to a terminal side in the cell.

According to the second embodiment, the frequency arrangement of the intermediate frequency subcarrier signal $f_{IF}$ and pilot carrier signal $f_{LO}$ is set to satisfy $f_{LO}-f_{IF} \geq 1$ [GHz] and $2 \times f_{IF} < f_{LO} < (2/3) \times fr$, or $f_{IF} < 1$ [GHz] and $f_{LO} > 2$ [GHz], as in the first embodiment.

In the above-described manner, the first embodiment can be applied to the base station device for radio communication. The intermediate frequency subcarrier signal $f_{IF}$ is a single-channel or a frequency-division multiplexed signal. In case the intermediate subcarrier signal $f_{IF}$ is a frequency-division multiplexed signal, each channel frequency of $f_{IF}$ may be changed for each unit of transmitting device, or the same frequency of $f_{IF}$ may be used.

The second embodiment of the present invention, in which the first embodiment is applied to the base station device for radio communication, has been described above. Next, the third embodiment in which transmitting devices with the same specifications are used between adjacent cells against the different frequency band of an intermediate frequency signal, a pilot carrier signal and a radio frequency signal, thereby reducing cost of the system without exchanging the hardware for each transmitting device.

Third Embodiment

Figure 11:
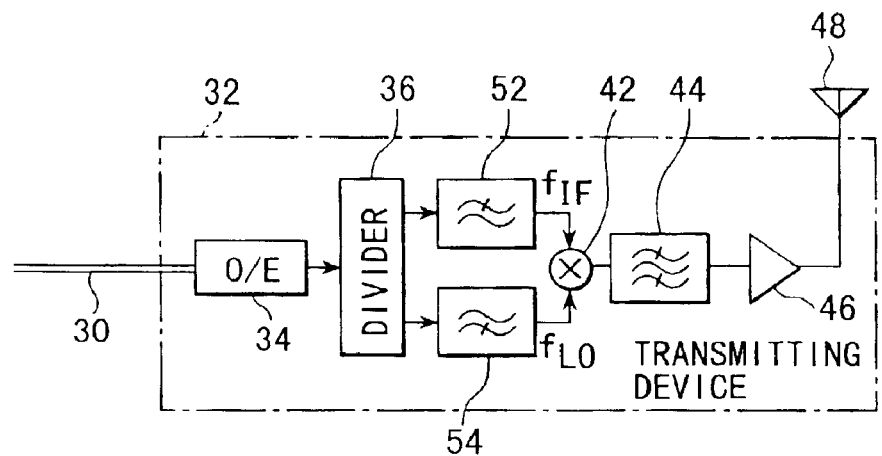
FIG. 11 is a block diagram showing the arrangement of a transmitting device in an optical communication system according to a third embodiment of the present invention.

FIG. 11 shows the third embodiment of the present invention. The transmitting station 10 has the same arrangement as in the first and second embodiments. In the transmitting device 32 as well, the same reference numerals as in the transmitting device 32 of the second embodiment denote the same parts in the third embodiment.

The transmitting device 32 of the third embodiment comprises the O/E converter 34, the divider 36, the multiplier 42, the bandpass filter 44, the power amplifier 46, the antenna 48, a low-pass filter 52, and a high-pass filter 54.

In this system as well, in the transmitting station 10, a radio data signal obtained by adding the pilot carrier signal $f_{LO}$ from the local oscillator 14 to the intermediate frequency subcarrier signal $f_{IF}$ from the radio signal modulator 12 by the adder 16 is input to the E/O converter 18, a semiconductor laser element in the E/O converter 18 is directly modulated by the radio data signal to obtain an optical signal, and this optical signal is transmitted to the transmitting device 32 through the optical fiber 30, as in the first and second embodiments.

Of the constituent elements of the transmitting device 32, the O/E converter 34 receives the optical signal transmitted from the transmitting station 10 through the optical fiber 30 and converts the optical signal into an electrical signal. The divider 36 supplies the electrical signal output from the O/E converter 34 to the low-pass filter 52 and the high-pass filter 54.

The low-pass filter 52 has the passband of the intermediate frequency subcarrier signal $f_{IF}$, and the high-pass filter 54 has the passband of the pilot carrier signal $f_{LO}$.

The multiplier 42 multiples output signals from the two filters 52 and 54 and outputs the multiplied signal. The bandpass filter 44 extracts a predetermined radio frequency signal from the output from the multiplier 42. The power amplifier 46 power-amplifies the radio frequency signal output from the bandpass filter 44 and outputs the amplified signal. The antenna 48 radiates the amplified signal into air as a radio wave.

In the system with the above arrangement, on the transmitting device side, the optical signal transmitted through the optical fiber 30 is received by the O/E converter 34, converted into an electrical signal, and supplied through the divider 36 to the low-pass filter 52 having the passband for the intermediate frequency subcarrier signal $f_{IF}$ and the high-pass filter 54 having the passband for the pilot carrier signal $f_{LO}$, thereby reproducing the original intermediate frequency subcarrier signal $f_{IF}$ and pilot carrier signal $f_{LO}$.

The reproduced intermediate frequency subcarrier signal $f_{IF}$ and pilot carrier signal $f_{LO}$ are input to the multiplier 42 and multiplied.

The output from the multiplier 42 is passed through the bandpass filter 44 to extract a predetermined radio frequency signal. The extracted radio frequency signal is amplified through the power amplifier 46, radiated into air as a radio wave through the antenna 48, and transmitted to a terminal side in the cell.

As described above, in the system according to the third embodiment, on the transmitting device 32 side, two outputs from the divider 36 are input to the low-pass filter 52 and high-pass filter 54, respectively, to extract the intermediate frequency subcarrier signal $f_{IF}$ and pilot carrier signal $f_{LO}$. That is, not the bandpass filters 38 and 40 but the low-pass filter 52 and high-pass filter 54 are used to extract the intermediate frequency subcarrier signal $f_{IF}$ and pilot carrier signal $f_{LO}$.

According to this arrangement, if the passband of the bandpass filter 44 connected to the output side to extract a radio frequency signal has a margin, the flexibility for frequency selection increases so that the carrier of the radio frequency signal can be changed without exchanging the hardware of the transmitting device since the low-pass filter 52 and high-pass filter 54 have wider frequency passbands than the passband of the bandpass filter.

To extract the original pilot carrier signal $f_{LO}$ and intermediate frequency subcarrier signal $f_{IF}$ from the sum signal of the pilot carrier signal $f_{LO}$ and intermediate frequency subcarrier signal $f_{IF}$ using two bandpass filters, bandpass filters having large Q values depending on the CNR value of the signal to be processed are normally used. More specifically, to prevent any decrease in CNR value of a received signal obtained by receiving an optical signal from the transmitting station 10 through the optical fiber 30 and photoelectrically converting the signal by the O/E converter 34, filters having large Q values must be used as the bandpass filters 38 and 40, and the range of selection of the frequency of a radio frequency signal becomes narrow.

However, according to the system of the third embodiment, even when the pilot carrier signal $f_{LO}$ is superposed on the transmitting station 10 side, an increase in RIN value of the intermediate frequency subcarrier signal $f_{IF}$ band can be suppressed. Hence, the optical modulation index of the pilot carrier signal $f_{LO}$ can be made large without increasing the RIN value of the intermediate frequency subcarrier signal $f_{IF}$ band, and the intermediate frequency subcarrier signal $f_{IF}$ and pilot carrier signal $f_{LO}$ can be separated using the low-pass filter 52 and high-pass filter 54. Therefore, flexibility of the radio frequency signal can be increased, so a radio communication station with a wide application range can be provided.

A fourth embodiment in which the frequency of a radio frequency signal can be highly increased even when the frequencies of intermediate frequency subcarrier signal $f_{IF}$ and pilot carrier signal $f_{LO}$ are not high.

Fourth Embodiment

Figure 12:
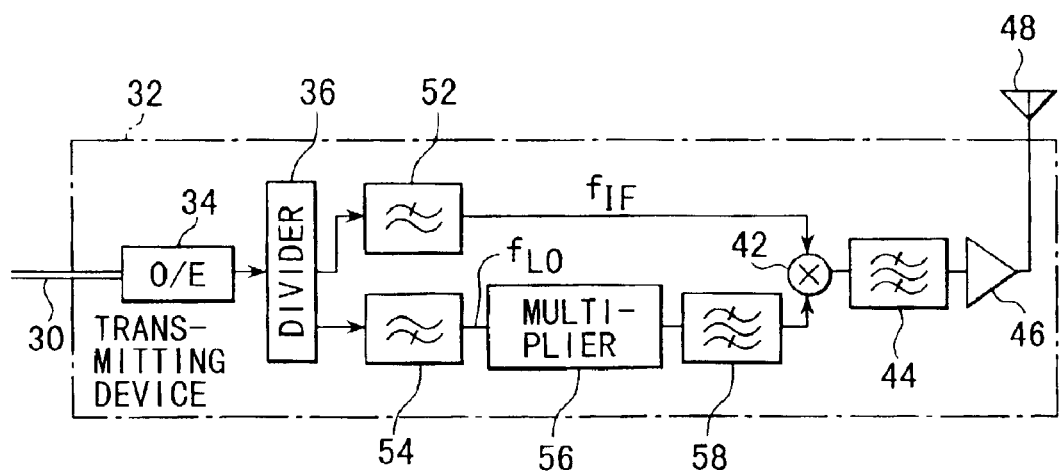
FIG. 12 is a block diagram showing the arrangement of a transmitting device in an optical communication system according to a fourth embodiment of the present invention.

FIG. 12 shows the fourth embodiment of the present invention. The arrangement of a transmitting station 10 is the same as in the first and second embodiments. In a transmitting device 32 as well, the same reference numerals as in the first and second embodiments denote the same parts in the fourth embodiment.

The transmitting device 32 of the fourth embodiment is different from the transmitting device 32 of the third embodiment in that a multiplier 56 and a bandpass filter 58 are connected between the high-pass filter 54 and the multiplier 42. The multiplier 56 is multiples a filtered output from the high-pass filter 54 by n and outputs the signal. The bandpass filter 58 extracts a predetermined frequency band component from the output multiplied by n. Note that n is a positive integer.

In the system having the above arrangement, on the transmitting device 32 side, an optical signal transmitted through the optical fiber 30 is received by the O/E converter 34, converted into an electrical signal. The electrical signal is supplied through the divider 36 to the low-pass filter 52 having the passband for an intermediate frequency subcarrier signal $f_{IF}$ and the high-pass filter 54 having the passband for a pilot carrier signal $f_{LO}$, thereby reproducing the original intermediate frequency subcarrier signal $f_{IF}$ and pilot carrier signal $f_{LO}$.

Of the reproduced intermediate frequency subcarrier signal $f_{IF}$ and pilot carrier signal $f_{LO}$, the pilot carrier signal $f_{LO}$ is multiplied by n by the multiplier 56 and then passed through the bandpass filter 58 to obtain a pilot carrier signal $n \times f_{LO}$ multiplied by a desired value. This signal is input to the multiplier 42 and used for frequency conversion.

The multiplier 42 multiplies the intermediate frequency subcarrier signal $f_{IF}$ from the low-pass filter 52 by the multiplied pilot carrier signal $n \times f_{LO}$. The obtained signal output is passed through a bandpass filter 44 to extract a predetermined radio frequency signal. The radio frequency signal output from the bandpass filter 44 is power-amplified by the power amplifier 46 and radiated from the antenna 48 into air as a radio wave.

In the fourth embodiment, the multiplier 56 and bandpass filter 58 are added to the arrangement of the third embodiment. The filtered output from the high-pass filter 54 is multiplied by n, and a predetermined frequency band component is extracted, by the bandpass filter 58, from the output multiplied by n, thereby obtaining the pilot carrier signal $n \times f_{LO}$ multiplied by a desired value, which is to be used for frequency conversion. This point is different from the third embodiment.

As a laser light source used in the electro-optical converter 18 of the transmitting station 10, a distributed feedback semiconductor laser element (DFB-LD) or a Fabri-Pérot semiconductor laser element (FP-LD) is used. Normally, a modulation band fc of a DFB-LD is 3 [GHz], and that of an FP-LD is 1 to 2 [GHz]. If the frequency band becomes higher, the modulation efficiency degrades. Therefore, except for a special processed laser element which can be modulated by a high frequency signal, the frequency band of the pilot carrier signal $f_{LO}$ that can be superposed is limited to about 3 to 5 [GHz].

Since the frequency of the intermediate frequency subcarrier signal $f_{IF}$ used in this system is lower than 1 [GHz], a frequency $f_{MW}$ of a radio frequency signal corresponding to $f_{IF}+f_{LO}$ (output from the bandpass filter 44) is limited to 4 to 6 [GHz].

However, in the arrangement having the multiplier 56, as shown in FIG. 12, the pilot carrier signal $f_{LO}$ to be used for frequency conversion is multiplied by a desired value. Since the frequency $f_{MW}$ of the radio frequency signal can be set as $f_{MW}=f_{IF}+n \times f_{LO}$, this system can generate a radio frequency signal in a higher frequency band without being limited to the modulation band of the laser element in the electro-optical converter 18.

However, noise is inevitably added upon multiplying the pilot carrier signal $f_{LO}$ by n, and this normally degrades the quality of the radio frequency signal. According to the present invention, however, the optical modulation index of the pilot carrier signal $f_{LO}$ can be made large without increasing the RIN value of the intermediate frequency subcarrier signal $f_{IF}$ band, so both the pilot carrier signal and subcarrier signal can maintain satisfactory CNR characteristics.

Therefore, the system of the fourth embodiment can prevent any large degradation in quality of the radio frequency signal even when the multiplier 56 is used. In place of the low-pass filter 52 and high-pass filter 54, bandpass filters 38 and 40 may be used, as in the first and second embodiments.

According to the fourth embodiment, the transmitting device comprises an opto-electrical converter for receiving an optical signal transmitted through an optical fiber, converting the optical signal into an electrical signal, and outputting the electrical signal, a filter for extracting the intermediate frequency subcarrier signal $f_{IF}$ and pilot carrier signal $f_{LO}$ from the converted and output electrical signal, a frequency multiplier for multiplying the extracted pilot carrier signal $f_{LO}$, a frequency converter for frequency-converting the extracted intermediate frequency subcarrier signal $f_{IF}$ using the multiplied pilot carrier signal $f_{LO}$ to obtain a radio frequency signal, and an antenna for transmitting the obtained radio frequency signal.

On the transmitting station side, the pilot carrier signal $f_{LO}$ as a sinusoidal wave used to up-converting the intermediate frequency subcarrier signal $f_{IF}$ into a radio frequency signal (frequency $F_0$) is added to the intermediate frequency subcarrier signal $f_{IF}$ as a signal in the intermediate frequency band, which is modulated with data to be transmitted. The sum signal is converted into an optical signal and sent to the optical fiber. This conversion to an optical signal is performed by controlling a current from a semiconductor laser element in accordance with the sum signal.

As the semiconductor laser element, a distributed feedback semiconductor laser element (DFB-LD) or a Fabri-Pérot semiconductor laser element (FP-LD) is used. Normally, the modulation band fc of a DFB-LD is 3 [GHz], and that of a FP-LD is 1 to 2 [GHz]. If the frequency band becomes higher, the modulation efficiency degrades. Therefore, except for a special processed laser element which can be modulated by a high frequency signal, the frequency band of the pilot carrier signal $f_{LO}$ that can be superposed is limited to about 3 to 5 [GHz].

Since the frequency of the intermediate frequency subcarrier signal $f_{IF}$ used in this embodiment is lower than 1 [GHz], the frequency $F_0$ of a radio frequency signal corresponding to $f_{IF}+f_{LO}$ is originally limited to 4 to 6 [GHz].

However, when a multiplier is used, the pilot carrier signal $f_{LO}$ to be used for frequency conversion is multiplied. Since the frequency $F_0$ of the radio frequency signal can be set as $F_0=f_{IF}+n \times f_{LO}$ (n is a positive integer), a radio frequency signal in a higher frequency band can be generated without being limited to the modulation band of the laser element in the electro-optical converter 18.

The above embodiments have been described mainly in association with transmission. An actual system need allow transmission and reception. The fifth embodiment for such a system will be described next.

Fifth Embodiment

Figure 13:
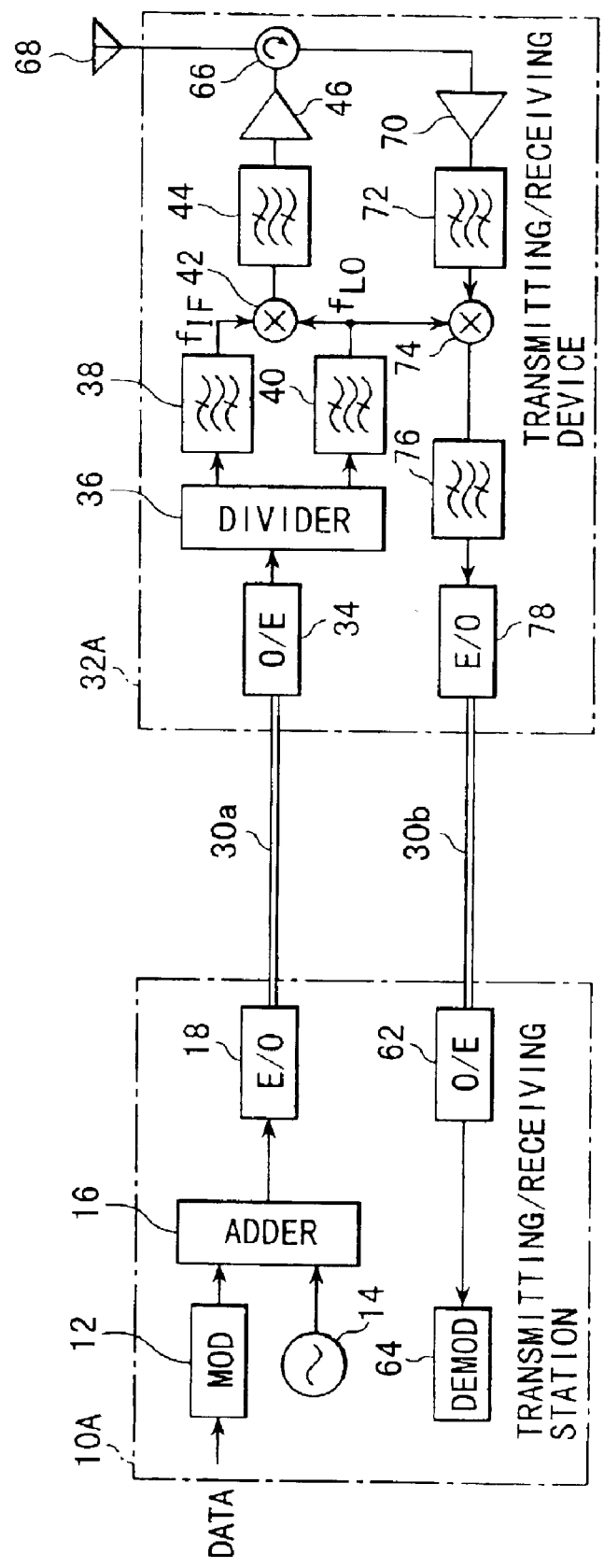
FIG. 13 is a block diagram showing the arrangement of a transmitting device in an optical communication system according to a fifth embodiment of the present invention.
Figure 14:
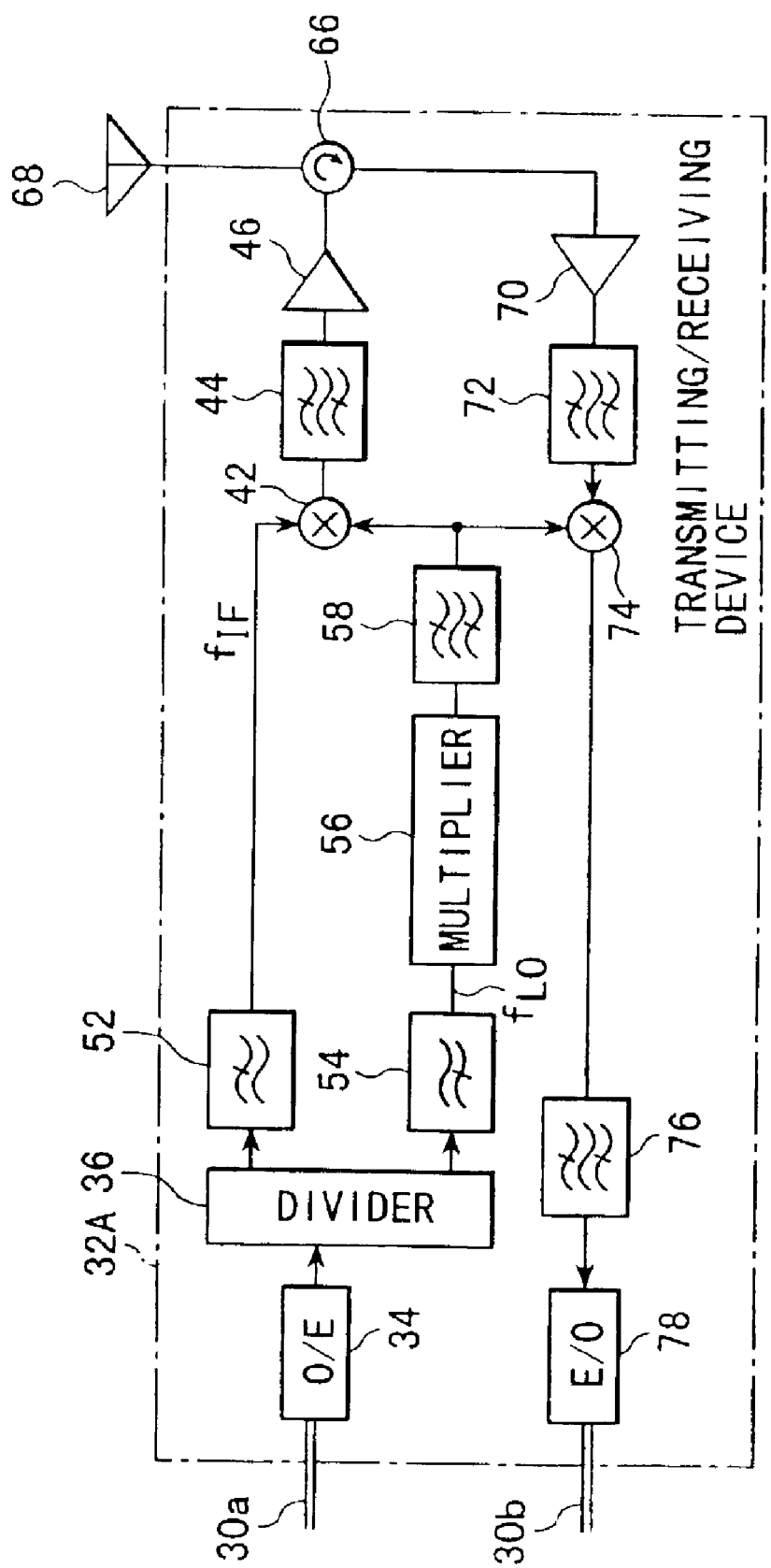
FIG. 14 is a block diagram showing the arrangement of a modification of the fifth embodiment of the present invention.

FIGS. 13 and 14 show the fifth embodiment of the present invention. The main arrangement is the same as in the second embodiment, and the same reference numerals as in the above embodiments denote the same parts in the fifth embodiment. In the fifth embodiment, the present invention is applied to a base station device for radio communication, as in the second embodiment.

In the embodiment shown in FIG. 13, to allow bi-directional communication, the terminal station is constructed as a transmitting/receiving station 10A including not only the transmission function but also the reception function. The transmitting device connected to the transmitting/receiving station 10A is also constructed as a transmitting/receiving device 32A having not only the transmission function but also the reception function.

The transmitting/receiving station 10A and transmitting/receiving device 32A are connected through optical fibers 30*a* and 30*b*. Although FIG. 13 illustrates only one transmitting/receiving device 32A, a plurality of transmitting/receiving devices 32A may be arranged in correspondence with one transmitting/receiving station 10A. When a plurality of transmitting/receiving devices 32A are present, the transmitting/receiving device 32A are set at separate locations. A range where radio waves reach is a radio zone (cell or service area), and each transmitting/receiving device 32A can transmit/receive radio waves to/from communication terminals in the cell.

Of the optical fibers 30*a* and 30*b*, the former is used for a down link (for a transmission line), and the latter is used for an up link (for a reception line).

The transmitting/receiving station 10A has the radio signal modulator 12, the local oscillator 14, the adder 16, and the E/O converter 18 for the down link (for transmission), and an O/E converter 62 and a demodulator 64 for the up link (for reception).

The transmitting/receiving device 32A has the O/E converter 34, the divider 36, the bandpass filters 38, 40, and 44, the multiplier 42, and the power amplifier 46 for the down link (for transmission), a circulator (or duplexer) 66, and a transmission/reception antenna 68. The transmitting/receiving device 32A further includes a low-noise amplifier 70, a bandpass filter 72, a multiplier 74, a bandpass filter 76, and an E/O converter 78 for the up link (for reception).

Of these elements, the E/O converter 18 incorporates a semiconductor laser element as a light source and has a function of outputting an optical signal modulated with a radio data signal output from the adder 16 by controlling the current of the semiconductor laser element in accordance with the radio data signal. The E/O converter 18 is connected to the optical fiber 30*a*. The optical signal output from the E/O converter 18 is output to the optical fiber 30*a*.

The O/E converter 34 as a constituent element of the transmitting/receiving device 32A converts the optical signal transmitted through the optical fiber 30*a* into an electrical signal. The divider 36 supplies the received electrical signal output from the O/E converter 34 to the bandpass filters 38 and 40.

The bandpass filter 38 extracts an intermediate frequency subcarrier signal $f_{IF}$ and contains the frequency $f_{IF}$ in the passband. The bandpass filter 40 extracts a pilot carrier signal $f_{LO}$ and contains the frequency $f_{LO}$ in the passband.

The multiplier 42 multiplies output signals from the two bandpass filters 38 and 40 and outputs the multiplied signal.

The bandpass filter 44 extracts a predetermined radio frequency signal from the output from the multiplier 42. The power amplifier 46 power-amplifies the radio frequency signal output from the bandpass filter 44 and outputs the amplified signal. The antenna 68 receives the amplified signal through the circulator (or duplexer) 66 and radiates the signal into air as a radio wave. The antenna 68 also receives a radio wave arriving from air and supplies the signal to the low-noise amplifier 70 through the circulator 66.

The circulator 66 is a device for switching between the path for guiding the radio frequency signal to be transmitted to the antenna 68 and the path for guiding a received radio frequency signal received by the antenna 68 to the low-noise amplifier 70.

The low-noise amplifier 70 has performance for amplifying the received radio frequency signal with low noise. The bandpass filter 72 passes an output from the low-noise amplifier 70 through a predetermined passband to extract a predetermined passband component. The multiplier 74 multiplies the output from the bandpass filter 72 by the pilot carrier signal $f_{LO}$ output from the bandpass filter 40.

The bandpass filter 76 passes the output from the multiplier 74 in a predetermined passband to extract a predetermined passband component as a radio data signal. The E/O converter 78 converts the radio data signal obtained through the bandpass filter 76 into an optical signal and outputs the optical signal. The E/O converter 78 incorporates a semiconductor laser element as a light source and has a function of outputting an optical signal modulated with the radio data signal by controlling the current of the semiconductor laser element in accordance with the radio data signal. The optical signal output from the E/O converter 78 is output to the optical fiber 30*b*.

The O/E converter 62 of the transmitting/receiving station 10A is connected to the optical fiber 30*b* to convert the optical signal transmitted from the transmitting/receiving device 32A through the optical fiber 30*b* into an electrical signal and outputs the signal. The demodulator 64 receives the electrical signal converted by the O/E converter 62 and demodulates the signal into the original radio data signal.

In the fifth embodiment having the above arrangement, in the transmitting/receiving station 10A, a radio data signal obtained by adding the pilot carrier signal $f_{LO}$ from the local oscillator 14 to the intermediate frequency subcarrier signal $f_{IF}$ from the radio signal modulator 12 by the adder 16 is input to the E/O converter 18.

In the E/O converter 18, the laser element is directly modulated with the radio data signal to obtain an optical signal. This optical signal is transmitted to the transmitting/receiving device 32A through the optical fiber 30*a*.

On the transmitting/receiving device 32A side, the optical signal transmitted through the optical fiber 30*a* is received by the O/E converter 34, converted into an electrical signal. The electrical signal is supplied to the bandpass filter 38 having the passband for the intermediate frequency subcarrier signal $f_{IF}$ and the bandpass filter 40 having the passband for the pilot carrier signal $f_{LO}$, thereby reproducing the original intermediate frequency subcarrier signal $f_{IF}$ and pilot carrier signal $f_{LO}$.

The reproduced intermediate frequency subcarrier signal $f_{IF}$ and pilot carrier signal $f_{LO}$ are input to the multiplier 42 and multiplied.

The output from the multiplier 42 is passed through the bandpass filter 44 to extract a predetermined radio frequency signal. The extracted radio frequency signal is amplified through the power amplifier 46, radiated from the antenna 68 into air through the circulator 66 as a radio wave, and transmitted to a terminal side in the cell.

On the other hand, a radio wave transmitted from a terminal side in the cell is received by the antenna 68, input to the low-noise amplifier 70 through the circulator 66, and amplified. A predetermined band component is extracted by the bandpass filter 72. The extracted component signal is multiplied by the pilot carrier signal $f_{LO}$ from the bandpass filter 40 by the multiplier 74 and down-converted. A predetermined band component is extracted by the bandpass filter 76, converted into an optical signal by the E/O converter 78, sent to the optical fiber 30$b$ as an up link optical signal, and sent to the transmitting/receiving station 10A.

As the characteristic feature of this embodiment, the pilot carrier signal $f_{LO}$ is extracted in the transmitting/receiving device 32A using the bandpass filter 40, the extracted pilot carrier signal $f_{LO}$ is input to the multiplier 42 on the transmission system side and the multiplier 74 on the reception system side. In the transmission system, the extracted pilot carrier signal $f_{LO}$ is multiplied by the intermediate frequency subcarrier signal $f_{IF}$ by the multiplier 42 to up-convert the frequency of the intermediate frequency subcarrier signal $f_{IF}$. In the reception system, the radio frequency signal is multiplied by the pilot carrier signal $f_{LO}$ by the multiplier 74 to down-convert the frequency of the radio frequency signal.

That is, the intermediate frequency subcarrier signal $f_{IF}$ and pilot carrier signal $f_{LO}$ are extracted from two outputs from the divider 36 in the transmitting/receiving device 32A using the bandpass filters 38 and 40. The extracted pilot carrier signal $f_{LO}$ is separated from the transmission system and also input to the multiplier 74 of the reception system.

The multiplier 42 up-converts the frequency of the intermediate frequency subcarrier signal $f_{IF}$ transmitted from the transmitting/receiving station 10A using the pilot carrier signal $f_{LO}$ to obtain a radio frequency signal, and this radio frequency signal is transmitted by radio through the power amplifier 46 and antenna 68, as described above.

The multiplier 74 multiplies a radio frequency signal by the pilot carrier signal $f_{LO}$ to down-convert the frequency of the radio frequency signal.

More specifically, the radio frequency signal transmitted by radio is received by the antenna 68 and input to the low-noise amplifier 70 through the circulator or duplexer 66, and a desired band is extracted by the bandpass filter 72. The frequency of the extracted band component of the radio frequency signal is down-converted by the multiplier 74 using the pilot carrier signal $f_{LO}$. The image frequency and the like are removed by the bandpass filter 76 to extract a desired band, thereby obtaining an up link intermediate frequency signal. The up link intermediate frequency signal is converted into an optical signal by the E/O converter 78 and transmitted to the transmitting/receiving station 10A through the optical fiber 30$b$.

In the transmitting/receiving station 10A, the optical signal transmitted from the transmitting/receiving device 32A side is received by the O/E converter 62 and input to the demodulator 64 to extract data.

As described above, in the fifth embodiment, in the transmitting/receiving device 32A, the intermediate frequency subcarrier signal $f_{IF}$ and pilot carrier signal $f_{LO}$ are extracted from the sum signal of the intermediate frequency subcarrier signal $f_{IF}$ and pilot carrier signal $f_{LO}$ for radio transmission, which are transmitted from the transmitting/receiving station 10A, using the bandpass filters. The extracted pilot carrier signal $f_{LO}$ is used for frequency up conversion in the transmission system and for frequency down conversion in the reception system.

Hence, the transmitting/receiving device 32A can down-converts the frequency of an up link signal from the transmitting/receiving device 32A to the transmitting/receiving station 10A without requiring a component such as a local oscillator. Therefore, the constituent elements of the reception system can be simplified. In addition, a received signal in a radio frequency band, which is received by the antenna is down-converted, input to the E/O converter 78, converted into an optical signal, and sent to the transmitting/receiving station 10A. Therefore, the frequency band required for the E/O converter 78 of the reception system can be made low. Since the frequency band of the signal to be processed is low, specifications of the laser element, driver amplifier, and the like incorporated in the E/O converter 78 can be lenient, and inexpensive elements can be used.

With the above arrangement, the transmitting/receiving device 32A can be made compact and simple, so an inexpensive transmitting/receiving device 32A can be provided.

FIG. 14 shows another arrangement of the transmitting/receiving device 32A. In the transmitting/receiving device 32A shown in FIG. 14, the multiplied pilot carrier signal $f_{LO}$ is used for frequency conversion.

In the example, as in the fourth embodiment shown in FIG. 12, the intermediate frequency subcarrier signal $f_{IF}$ is extracted from the output from the divider 36 by the low-pass filter 52, the pilot carrier signal $f_{LO}$ is extracted by the high-pass filter 54, the extracted pilot carrier signal $f_{LO}$ is multiplied by n by the multiplier 56 and passed through the multiplier 56, and this pilot carrier signal n×$f_{LO}$ multiplied by a desired value is used for frequency up conversion in the transmission system and frequency down conversion in the reception system.

Except that the pilot carrier signal n×$f_{LO}$ multiplied by a desired value is input to the multiplier 42 and used for up conversion or input to the multiplier 74 and used for down conversion, the arrangement is the same as in FIG. 13, and a detailed description thereof will be omitted.

In this example, since the multiplier 56 and bandpass filter 58 are added, the circuit scale becomes larger than that of the example shown in FIG. 13. Even with this arrangement, the frequency band required for the E/O converter 78 in the reception system can be made low, as in the example shown in FIG. 13. Specifications of the laser element, driver amplifier, and the like incorporated in the E/O converter 78 can be lenient because the frequency band of a signal to be processed becomes low. Hence, inexpensive elements can be used. In addition, since the multiplier is added, the pilot carrier signal $f_{LO}$ to be used for frequency conversion is multiplied by a desired value. The frequency of a radio frequency signal can be made higher by n, so a radio frequency signal in a higher frequency band can be generated without being limited by the modulation band in the E/O converter 18 in the transmitting/receiving station 10A.

According to the fifth embodiment, even when the optical modulation index of the pilot carrier signal $f_{LO}$ is increased, the CNR of the intermediate frequency subcarrier signal $f_{IF}$ does not decrease. Therefore, on the transmitting/receiving device 32A side, the pilot carrier signal $f_{LO}$ with a satisfactory CNR can be obtained. In the transmitting/receiving device 32A, the radio frequency signal received by the antenna 68 is sometimes weak, and the signal for frequency conversion by the multiplier 74 is required to have a high CNR. As the signal for frequency conversion, the pilot carrier signal $f_{LO}$ from the transmitting/receiving station 10A can be provided. Additionally, when the pilot carrier signal $f_{LO}$ is multiplied as a signal for frequency conversion, the noise characteristics are not largely degraded in frequency conversion because the CNR of the received pilot carrier signal $f_{LO}$ is large.

In place of the low-pass filter 52 and high-pass filter 54, the bandpass filters 38 and 40 may be used, as in the first and second embodiments.

Sixth Embodiment

An embodiment in which when modulated and multiplexed subcarrier signals are to be transmitted from a transmitting/receiving station to a plurality of transmitting/receiving devices, the number of pilot carrier signals for maintaining the frequency stability of radio waves to be radiated from the transmitting/receiving devices is decreased, and a data signal to be radiated can be separated from the received optical signal by a simple filter in each transmitting/receiving device will be described. In this case, only two pilot carrier signals are used regardless of the number of the subcarrier signals, and subcarrier signals are multiplexed at a sufficiently large frequency interval such that the subcarrier signals can be separated by a simple filter. More specifically, the frequency interval between the two pilot carrier signals and that between the subcarrier signals are made equal.

For three or more systems of subcarrier signals to be transmitted as radio signals, only two pilot carrier signals $f_{LO}$ are prepared. Each of the three or more systems of subcarrier signals is converted into a radio signal having a desired carrier frequency. Since transmission and reception systems have the same arrangement, the down link signal processing system will be described in the sixth embodiment for the descriptive convenience.

Figure 15:
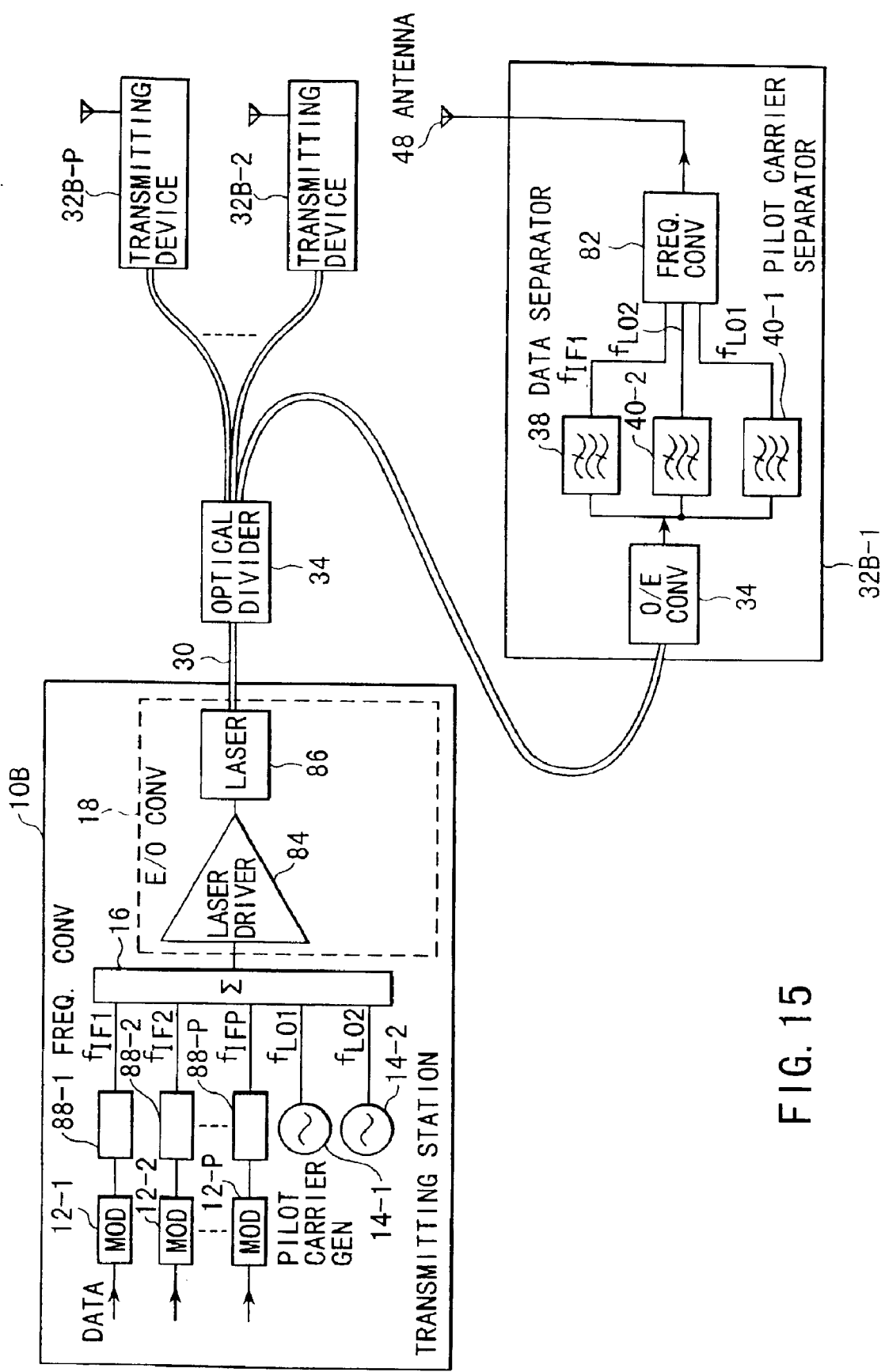
FIG. 15 is a block diagram showing the system arrangement of a down link system in an optical communication system according to a sixth embodiment of the present invention.

FIG. 15 is a block diagram showing the arrangement of the sixth embodiment. Transmitting/receiving devices 32B-1, 32B-2, ..., 32B-p are arranged in predetermined service areas. A transmitting/receiving station 10B manages and operates the transmitting/receiving devices 32B-1, 32B-2, ..., 32B-p and supplies intermediate frequency subcarrier signals $f_{IF1}, f_{IF2}, \ldots, f_{IFp}$ to be transmitted from the transmitting/receiving devices 32B-1, 32B-2, ..., 32B-p, which are synthesized with two pilot carrier signals $f_{LO1}$ and $f_{LO2}$, to the corresponding transmitting/receiving devices 32B-1, 32B-2, ..., 32B-p.

The transmitting/receiving station 10B has the E/O converter 18 formed from a laser element 86 and a laser driver 84, the adder 16, frequency converters 88-1, 88-2, ..., 88-p, modulators 12-1, 12-2, ..., 12-p, and first and second pilot carrier generators 14-1 and 14-2.

The modulators 12-1, 12-2, ..., 12-p output signals modulated with input data to the frequency converters 88-1, 88-2, ..., 88-p, respectively. The frequency converters 88-1, 88-2, ..., 88-p frequency-converts the modulated input signals and output the signals.

The first and second pilot carrier generators 14-1 and 14-2 are circuits for generating the pilot carrier signals $f_{LO1}$ and $f_{LO2}$ having different frequencies. The adder 16 synthesizes the two pilot carrier signals $f_{LO1}$ and $f_{LO2}$ with the outputs $f_{IF1}, f_{IF2}, f_{IFp}$ from the frequency converters 88-1, 88-2, ..., 88-p. The laser driver 84 drives the laser element 86 in accordance with the signal synthesized by the adder 16. The laser element 86 is caused by the laser driver 84 to output a laser beam optically modulated in accordance with the synthesized signal from the adder 16 and send the signal to the optical fiber 30.

Each of the transmitting/receiving devices 32B-1, 32B-2, ..., 32B-p comprises the O/E converter 34, bandpass filter 38 for separating the intermediate frequency subcarrier signal $f_{IF1}$, bandpass filters 40-1 and 40-2 for separating the pilot carrier signals $f_{LO1}$ and $f_{LO2}$, a frequency converter 82 formed from a multiplier and a power amplifier, and the antenna 48.

The O/E converter 34 converts an optical signal sent through the optical fiber 30 into an electrical signal. The bandpass filter 38 separates the intermediate frequency subcarrier signal from the electrical signal. The bandpass filters 40-1 and 40-2 separate the first and second pilot carrier signals from the electrical signal from the O/E converter 34.

The frequency converter 82 frequency-converts the separated first and second pilot carrier signals and intermediate frequency subcarrier signal and sends a data signal to the antenna 48.

The optical fiber 30 is an optical transmission line connecting the transmitting/receiving station 10B to the transmitting/receiving devices 32B-1, 32B-2, ..., 32B-p and has the optical divider 34 inserted in the midway. The optical divider 34 divides the optical signal from the laser element 86 and distributes the optical signals to all the transmitting/receiving devices 32B-1, 32B-2, ..., 32B-p connected.

Figure 16:
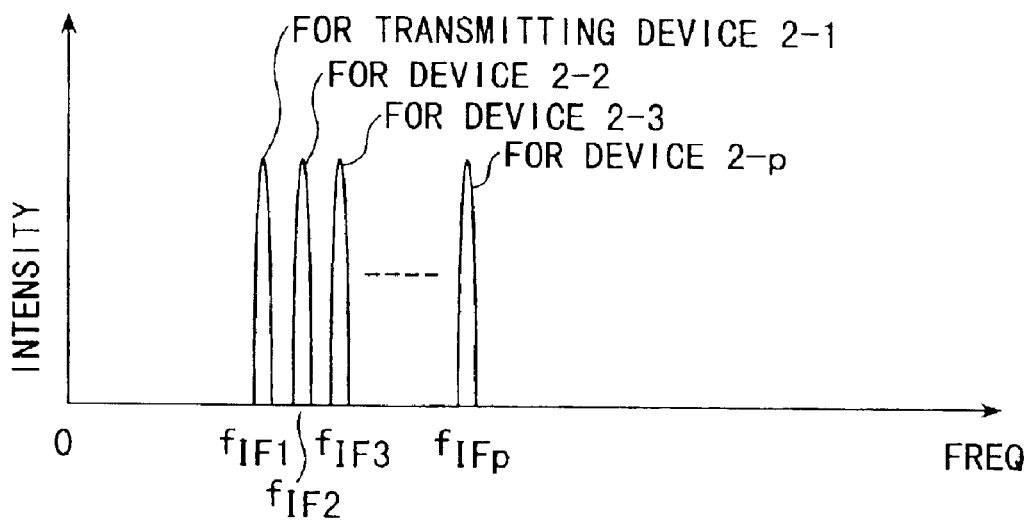
FIG. 16 is a graph for explaining subcarrier multiplex in the sixth embodiment.

In this system, the intermediate frequency subcarrier signals $f_{IF1}, f_{IF2}, \ldots, f_{IFp}$ optically transmitted from the transmitting/receiving station 10B to the transmitting/receiving devices 32B-1, 32B-2, ..., 32B-p are subcarrier-multiplexed at a large frequency interval, as shown in FIG. 16, such that the signals can be separated by a simple filter.

In addition to the intermediate frequency subcarrier signals $f_{IF1}, f_{IF2}, \ldots, f_{IFp}$, the pilot carrier signals $f_{LO1}$ and $f_{LO2}$ are transmitted. In this system, the number of pilot carrier signals $f_{LO1}$ and $f_{LO2}$ is always two independently of the number of intermediate frequency subcarrier signals. The frequencies of the two pilot carrier signals $f_{LO1}$ and $f_{LO2}$ are set such that a frequency to be sent from the antenna is obtained when integral multiples of the frequencies $f_{LO1}$ and $f_{LO2}$ of the pilot carrier signals are appropriately added/subtracted to/from the frequencies of the intermediate frequency subcarrier signals $f_{IF1}, f_{IF2}, f_{IFp}$.

In the system having the above arrangement, in the transmitting/receiving station 10B, data to be transmitted to the transmitting/receiving devices 32B-1, 32B-2, ..., 32B-p are supplied to the modulators 12-1, 12-2, ..., 12-p corresponding to the transmitting/receiving devices and modulated into an appropriate form by QPSK, QAM, or the like.

Outputs from the modulators 12-1, 12-2, ..., 12-p are supplied to the frequency converters 88-1, 88-2, ..., 88-p, respectively, and converted into appropriate intermediate frequency subcarrier frequencies $f_{IF1}, f_{IF2}, \ldots, f_{IFp}$ corresponding to the transmitting/receiving devices 32B-1, 32B-2, ..., 32B-p.

At this time, the frequencies of the plurality of intermediate frequency subcarrier signals are sufficiently separated from each other, as shown in FIG. 16. For example, the bandwidth of each intermediate frequency subcarrier signal is about 20 [MHz], an interval of about 100 [MHz] is set.

The first and second pilot carrier generators 14-1 and 14-2 generate the pilot carrier signals $f_{LO1}$ and $f_{LO2}$ having different frequencies, respectively. These pilot carrier signals $f_{LO1}$ and $f_{LO2}$ are input to the adder 16.

The adder 16 multiplexes the intermediate frequency subcarrier signals $f_{IF1}, f_{IF2}, \ldots, f_{IFp}$ output from the frequency converters 88-1, 88-2, ..., 88-p with the first and second pilot carrier signals $f_{LO1}$ and $f_{LO2}$ generated by the first and second pilot carrier generators 14-1 and 14-2, respectively. The multiplexed signal is input to the laser driver 84 and converted into an optical signal by the laser element 86.

The optical signal converted by the laser element 86 and output is input to the optical fiber 30. The optical divider 34 is inserted midway along the optical fiber 30, so the optical signal from the laser element 86 is divided and distributed to all the transmitting/receiving devices 32B-1, 32B-2, . . . , 32B-p connected.

The optical signal transmitted to a transmitting/receiving device, e.g., the transmitting/receiving device 32B-1 is converted into an electrical signal by the O/E converter 34. The intermediate frequency subcarrier signal $f_{IF1}$ that is sent to the self station is separated from the obtained electrical signal by the bandpass filter 38. The bandpass filter 38 can be formed from a simple filter having a relatively small Q value. The bandpass filters 40-1 and 40-2 further extract the first pilot carrier signal $f_{LO1}$ and second pilot carrier signal $f_{LO2}$ from the signal obtained by the O/E converter 34, respectively. The bandpass filters 40-1 and 40-2 can also be constructed by simple filters having relatively small Q values.

The intermediate frequency subcarrier signal $f_{IF1}$ separated by the bandpass filter 38 and the two pilot carrier signals $f_{LO1}$ and $f_{LO2}$ separated by the bandpass filters 40-1 and 40-2 are input to the frequency converter 82. The frequency converter 82 appropriately converts the intermediate frequency subcarrier signal $f_{IF1}$ into a target radio frequency by appropriately multiplying, adding, and subtracting the frequencies of these three signals.

The frequency converter 82 mainly comprises a mixer, a multiplier, a filter, a switch, and the like. Details of the arrangement will be described later.

The intermediate frequency subcarrier signal $f_{IF1}$ converted into a desired radio frequency by the frequency converter 82 is radiated from the antenna 48 of the self station into air and sent to a terminal in the service area of the self station.

According to the sixth embodiment, when data signals are to be optically transmitted from the transmitting/receiving station 10B to the plurality of transmitting/receiving devices 32B-1, 32B-2, . . . , 32B-p as subcarriers, only two pilot carrier signals $f_{LO1}$ and $f_{LO2}$ are used while setting a large frequency interval between the intermediate frequency subcarrier signals $f_{IF1}, f_{IF2}, \ldots, f_{IFp}$, and the frequencies are set in advance such that a frequency to be sent from the antenna is obtained when integral multiples of the frequencies of the pilot carrier signals $f_{LO1}$ and $f_{LO2}$ are appropriately added/subtracted to/from the frequencies of the intermediate frequency subcarrier signals $f_{IF1}, f_{IF2}, f_{IFp}$.

Since the frequency interval between the intermediate frequency subcarrier signals is set to be sufficiently large, each transmitting/receiving device can extract the intermediate frequency subcarrier signal addressed to the self station from the subcarrier-multiplexed data signal using a simple filter.

The frequencies of the pilot carrier signals $f_{LO1}$ and $f_{LO2}$ are set to satisfy the above relationship. Therefore, the advantage in use of the pilot carrier signals $f_{LO1}$ and $f_{LO2}$ can be maintained: the signal to be sent from the antenna has high frequency stability although only two pilot carrier signals $f_{LO1}$ and $f_{LO2}$ are used. Additionally, since the number of pilot carrier signals $f_{LO1}$ and $f_{LO2}$ is as small as two, high-quality transmission can be performed without largely decreasing the optical modulation index of the intermediate frequency subcarrier signal in optical transmission.

In the present invention, the intermediate frequency subcarrier signals to be optically transmitted from the transmitting/receiving station to the plurality of transmitting/receiving devices are subcarrier-multiplexed at a large frequency interval such that the signals can be separated by a simple filter.

In addition to the intermediate frequency subcarrier signals $f_{IF1}, f_{IF2}, \ldots f_{IFp}$, the pilot carrier signals $f_{LO1}$ and $f_{LO2}$ are transmitted from the transmitting/receiving station 10B to the plurality of transmitting/receiving devices 32B-1, 32B-2, . . . , 32B-p. Unlike the prior art, the number of pilot carrier signals $f_{LO1}$ and $f_{LO2}$ is only two independently of the number of intermediate frequency subcarrier signals $f_{IF1}, f_{IF2}, \ldots, f_{IFp}$. The frequencies of the two pilot carrier signals $f_{LO1}$ and $f_{LO2}$ and the frequencies of the intermediate frequency subcarrier signals $f_{IF1}, f_{IF2}, \ldots, f_{IFp}$ are set such that the frequency of each intermediate frequency subcarrier signal can be up-converted into a frequency to be sent from the antenna when integral multiples of the frequencies of the two pilot carrier signals $f_{LO1}$ and $f_{LO2}$ are appropriately added/subtracted to/from the frequencies of the intermediate frequency subcarrier signals $f_{IF1}, f_{IF2}, \ldots, f_{IFp}$. Note that "integers" for "integral multiples" include "0" and all positive and negative integers.

In the frequency converter 82, the pilot carrier signals $f_{LO1}$ and $f_{LO2}$ are multiplied by a multiplier or mixer. Addition/subtraction of signals or the frequencies of multiplied pilot carrier signals is also performed using the mixer.

With this arrangement, even when three or more transmitting/receiving devices are accommodated in a PON, only two pilot carrier signals $f_{LO1}$ and $f_{LO2}$ are necessary to be sent to all the transmitting/receiving devices. In addition, the frequency interval between the intermediate frequency subcarrier signals $f_{IF1}, f_{IF2}, \ldots, f_{IFp}$ can be set to be sufficiently large such that each signal can be extracted using a simple filter.

As a consequence, the optical modulation index of the intermediate frequency subcarrier signals $f_{IF1}, f_{IF2}, \ldots, f_{IFp}$ is not sacrificed by a number of pilot carrier signals, and satisfactory transmission can be performed. In addition, the process of extracting a necessary signal after reception of the optical signal becomes simple and inexpensive.

Next, a specific example of the frequency arrangement of the two pilot carrier signals $f_{LO1}$ and $f_{LO2}$ will be described as a seventh embodiment.

Seventh Embodiment

Figure 17:
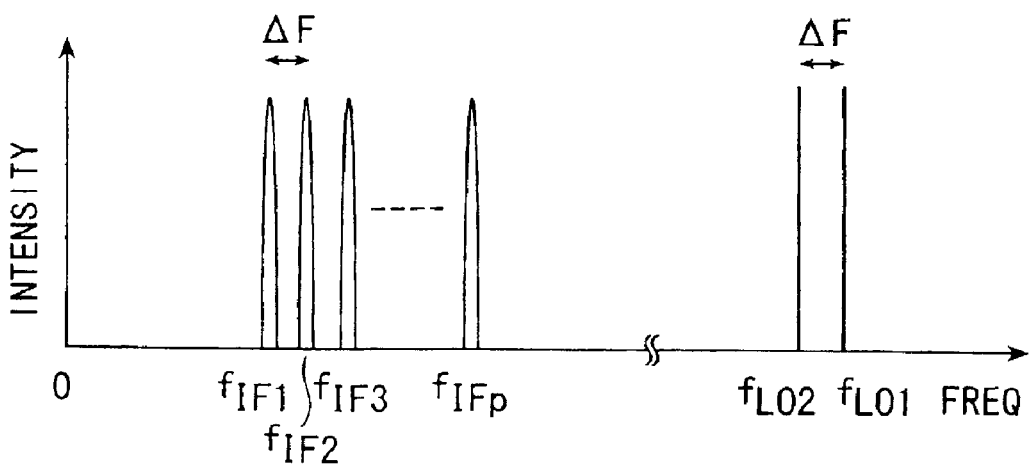
FIG. 17 is a graph showing a specific frequency arrangement of pilot carrier signals $f_{LO}$ of two types in an optical communication system according to a seventh embodiment of the present invention.

FIG. 17 is a graph showing a specific frequency arrangement of two pilot carrier signals $f_{LO1}$ and $f_{LO2}$. As shown in FIG. 17, modulated data signals to be transmitted to transmitting/receiving devices 32B-1, 32B-2, . . . , 32B-p are subcarrier-multiplexed with center frequencies $f_{IF1}, f_{IF2}, \ldots, f_{IFp}$. The frequency difference between adjacent intermediate frequency subcarrier signals is ΔF or an integral multiple of ΔF.

The frequency difference between the pilot carrier signals $f_{LO1}$ and $f_{LO2}$ is also ΔF. In the seventh embodiment, as shown in FIG. 17, the pilot carrier signals $f_{LO1}$ and $f_{LO2}$ are arranged in a frequency region higher than that range where the intermediate frequency subcarrier signals $f_{IF1}, f_{IF2}, \ldots, f_{IFp}$ are arranged.

The operation of the present invention will be described using specific numerical data.

Assume that four intermediate frequency subcarrier signals $f_{IF1}, f_{IF2}, f_{IF3}, f_{IF4}$ having frequencies of 100 [MHz], 200 [MHz], 400 [MHz], and 500 [MHz], respectively, are subcarrier-multiplexed, and the first and second pilot carrier signals $f_{LO1}$ and $f_{LO2}$ have frequencies of 2 [GHz] and 1.9 [GHz], respectively. A radio frequency $F_0$ to be sent from an antenna 48 of the transmitting/receiving device 32B is 22 [GHz].

In the transmitting/receiving device 32B-1 which uses the intermediate frequency subcarrier signal $f_{IF1}$, the bandpass filter 38 extracts the intermediate frequency subcarrier signal $f_{IF1}$ from the subcarrier-multiplexed optical signal, and the bandpass filters 40-1 and 40-2 extract the first and second pilot carrier signals $f_{LO1}$ and $f_{LO2}$, respectively.

To up-convert the intermediate frequency subcarrier signal $f_{IF1}$ (=100 [MHz]) into the radio frequency $F_0$ (=22 [GHz]) using these signals, the second pilot carrier signal $f_{LO2}$ (=1.9 [GHz]) is added to a frequency (=20 [GHz]) obtained by multiplying the first pilot carrier signal $f_{LO1}$ by 10, and the frequency $f_{IF1}$ (=100 [MHz]) of the intermediate frequency subcarrier signal is added to the resultant frequency. That is, $$f_{LO1}(=2\ [\text{GHz}]) \times 10 + f_{LO2}(=1.9\ [\text{GHz}]) + f_{IF1}(=100\ [\text{MHz}]) =$$
$$20 + 1.9 + 0.1 = 22\ [\text{GHz}]$$

As a result, the intermediate frequency subcarrier signal $f_{IF1}$ having a frequency of 100 [MHz] can be up-converted into the radio frequency $F_0$ of 22 [GHz] using the first and second pilot carrier signals $f_{LO1}$ and $f_{LO2}$.

To up-convert the intermediate frequency subcarrier signal $f_{IF2}$ (=200 [MHz]) into the radio frequency $F_0$, a frequency (=3.8 [GHz]) obtained by multiplying the second pilot carrier signal $f_{LO2}$ by 2 is added to a frequency (=18 [GHz]) obtained by multiplying the first pilot carrier signal $f_{LO1}$ by 9, and the intermediate frequency subcarrier signal $f_{IF2}$ (=200 [MHz]) is added to the resultant frequency. That is $$f_{LO1}(=2\ [\text{GHz}]) \times 9 + f_{LO2}(=1.9\ [\text{GHz}]) \times 2 + f_{IF2}(=200\ [\text{MHz}]) =$$
$$18 + 3.8 + 0.2 = 22\ [\text{GHz}]$$

As a result, the intermediate frequency subcarrier signal $f_{IF2}$ having a frequency of 200 [MHz] can be up-converted into the radio frequency $F_0$ of 22 [GHz] using the first and second pilot carrier signals $f_{LO1}$ and $f_{LO2}$.

To up-convert the intermediate frequency subcarrier signal $f_{IF3}$ (=400 [MHz]) into the radio frequency $F_0$, a frequency (=7.6 [GHz]) obtained by multiplying the second pilot carrier signal $f_{LO2}$ by 4 is added to a frequency (=14 [GHz]) obtained by multiplying the first pilot carrier signal $f_{LO1}$ by 7, and the intermediate frequency subcarrier signal $f_{IF3}$ (=400 [MHz]) is added to the resultant frequency. That is $$f_{LO1}(=2\ [\text{GHz}]) \times 7 + f_{LO2}(=1.9\ [\text{GHz}]) \times 4 + f_{IF3}(=400\ [\text{MHz}]) =$$
$$14 + 7.6 + 0.4 = 22\ [\text{GHz}]$$

As a result, the intermediate frequency subcarrier signal $f_{IF3}$ having a frequency of 400 [MHz] can be up-converted into the radio frequency $F_0$ of 22 [GHz] using the first and second pilot carrier signals $f_{LO1}$ and $f_{LO2}$.

To up-convert the intermediate frequency subcarrier signal $f_{IF4}$ (=500 [MHz]) into the radio frequency $F_0$, a frequency (=9.5 [GHz]) obtained by multiplying the second pilot carrier signal $f_{LO2}$ by 5 is added to a frequency (=12 [GHz]) obtained by multiplying the first pilot carrier signal $f_{LO1}$ by 6, and the frequency $f_{IF4}$ (=500 [MHz]) of the intermediate frequency subcarrier signal is added to the resultant frequency. That is $$f_{LO1}(=2\ [\text{GHz}]) \times 6 + f_{LO2}(=1.9\ [\text{GHz}]) \times 5 + f_{IF4}(=500\ [\text{MHz}]) =$$
$$12 + 9.5 + 0.5 = 22\ [\text{GHz}]$$

As a result, the intermediate frequency subcarrier signal $f_{IF4}$ having a frequency of 500 [MHz] can be up-converted into the radio frequency $F_0$ of 22 [GHz] using the first and second pilot carrier signals $f_{LO1}$ and $f_{LO2}$.

As described above, using only the two pilot carrier signals $f_{LO1}$, and $f_{LO2}$, the intermediate frequency subcarrier signals can be up-converted into the radio frequency $F_0$ in all transmitting/receiving devices.

Arrangements of the frequency converter 82 will be described next with reference to FIGS. 18, 19, and 22.

[First Arrangement of Frequency Converter]

Figure 18:
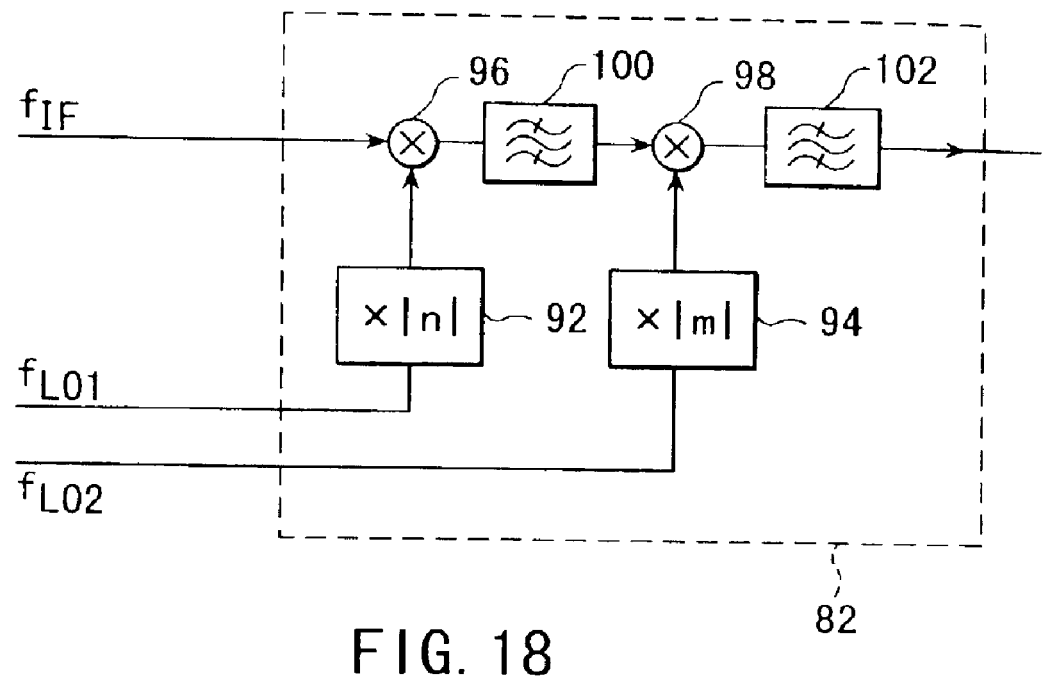
FIG. 18 is a block diagram showing an arrangement of a frequency converter in the seventh embodiment.

FIG. 18 shows a first arrangement of the frequency converter 82 in the transmitting/receiving device.

The frequency converter 82 shown in FIG. 18 comprises multipliers 92 and 94, mixers 96 and 98, and bandpass filters 100 and 102.

The multiplier 92 multiplies the first pilot carrier signal $f_{LO1}$ by $|n|$ and supplies the signal to the mixer 96. The mixer 96 also receives the intermediate frequency subcarrier signal $f_{IF}$ and mixes this signal with the signal from the multiplier 92, which is multiplied by $|n|$. The bandpass filter 100 extracts a desired frequency component from the signal from the mixer 96.

The multiplier 94 multiplies the second pilot carrier signal $f_{LO2}$ by $|m|$ and supplies the signal to the mixer 98. The mixer 98 also receives the signal from the bandpass filter 100 and mixes this signal with the second pilot carrier signal $f_{LO2}$ from the multiplier 94, which is multiplied by $|m|$. The bandpass filter 102 extracts a desired frequency component from the signal from the mixer 98.

In the frequency converter 82 having the arrangement shown in FIG. 18, the first pilot carrier signal $f_{LO1}$ is multiplied by a necessary multiplying factor ($|n|$) by the multiplier 92. In the example of the above-described intermediate frequency subcarrier signal $f_{IF1}$, the first pilot carrier signal $f_{LO1}$ is multiplied by 10 and the second pilot carrier signal $f_{LO2}$ is multiplied by a necessary multiplying factor ($|m|$) by the multiplier 94. In the above example, the second pilot carrier signal $f_{LO2}$ is multiplied by 1, i.e., passes through the multiplier 94 without any multiplication. The intermediate frequency subcarrier signal $f_{IF1}$ (100 [MHz]) is mixed with the first pilot carrier signal $f_{LO1}$ (20 [GHz]) multiplied by $|n|$ by the mixer 96. Of the sum frequency component (20.1 [GHz]) and difference frequency component (19.9 [GHz]) output from the mixer 96, the sum frequency component (20.1 [GHz]) is selected by the filter 100 and outputted.

The output from the filter 100 is mixed with the second pilot carrier signal $f_{LO2}$ (1.9 [GHz]) multiplied by $|m|$ by the mixer 98. Of the sum frequency component (22 [GHz]) and difference frequency component (18.2 [GHz]) output from the mixer 98, the sum frequency component (22 [GHz]) is selected by the bandpass filter 102 and outputted.

In this way, the frequency converter 82 can obtain the intermediate frequency subcarrier signal up-converted to the target frequency.

[Second Arrangement of Frequency Converter]

Figure 19:
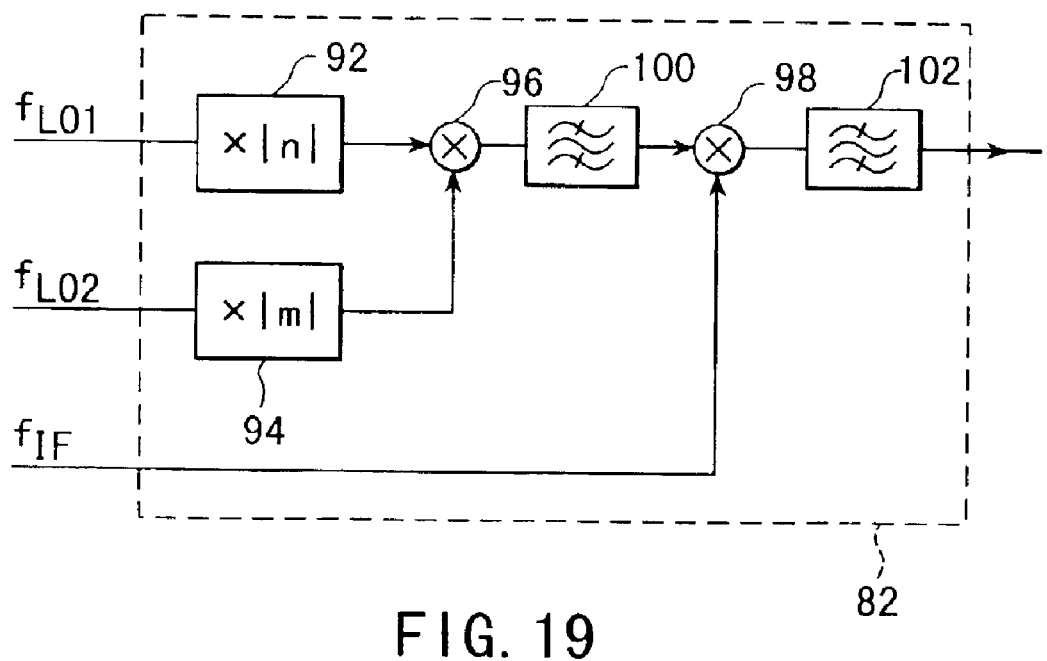
FIG. 19 is a block diagram showing another arrangement of the frequency converter in the seventh embodiment.

FIG. 19 shows another arrangement of the frequency converter 82 in the transmitting/receiving device.

The frequency converter 82 shown in FIG. 19 comprises the multipliers 92 and 94, mixers 96 and 98, and bandpass filters 100 and 102.

The multiplier 92 multiplies the first pilot carrier signal $f_{LO1}$ by $|n|$ and supplies the signal to the mixer 96. The multiplier 94 multiplies the second pilot carrier signal $f_{LO2}$ by $|m|$ and supplies the signal to the mixer 96. The mixer 96 mixes the multiplied outputs from the multipliers 92 and 94.

The bandpass filter 100 extracts a desired frequency component from the signal from the mixer 96 and outputs the frequency component to the mixer 98. The mixer 98 also receives the intermediate frequency subcarrier signal $f_{IF}$, mixes this signal with the signal passed through the bandpass filter 100, and outputs the mixed signal to the filter 102. The bandpass filter 102 extracts a desired frequency component from the signal from the mixer 98.

In the frequency converter 82 having the arrangement shown in FIG. 19, the first pilot carrier signal $F_{LO1}$ is multiplied by a necessary multiplying factor ($|n|$) by the multiplier 92. In the example of the above-described intermediate frequency subcarrier signal $f_{IF1}$, the first pilot carrier signal $f_{LO1}$ is multiplied by 10 and the second pilot carrier signal $f_{LO2}$ is multiplied by a necessary multiplying factor ($|m|$) by the multiplier 94. In the above example, the second pilot carrier signal $f_{LO2}$ is multiplied by 1, i.e., passes through the multiplier 94 without any multiplication. The first pilot carrier signal $f_{LO1}$ (20 [GHz]) multiplied by $|n|$ and second pilot carrier signal $f_{LO2}$ (1.9 [GHz]) multiplied by $|m|$ are mixed by the mixer 96, and a sum frequency component (21.9 [GHz]) and difference frequency component (18.1 [GHz]) are output.

Of these frequency components, the sum frequency component (21.9 [GHz]) is selected by the bandpass filter 100 and outputted. The intermediate frequency subcarrier signal $f_{IF1}$ (100 [MHz]) and output from the bandpass filter 100 are mixed by the mixer 98. Of the sum frequency component (22 [GHz]) and difference frequency component (21.8 [GHz]) output from the mixer 98, the sum frequency component (22 [GHz]) is selected by the filter 102 and outputted.

In this manner, the frequency converter 82 can obtain the intermediate frequency subcarrier signal up-converted to the target frequency (22 [GHz]).

[Arrangement of Multiplier]

Figure 20:
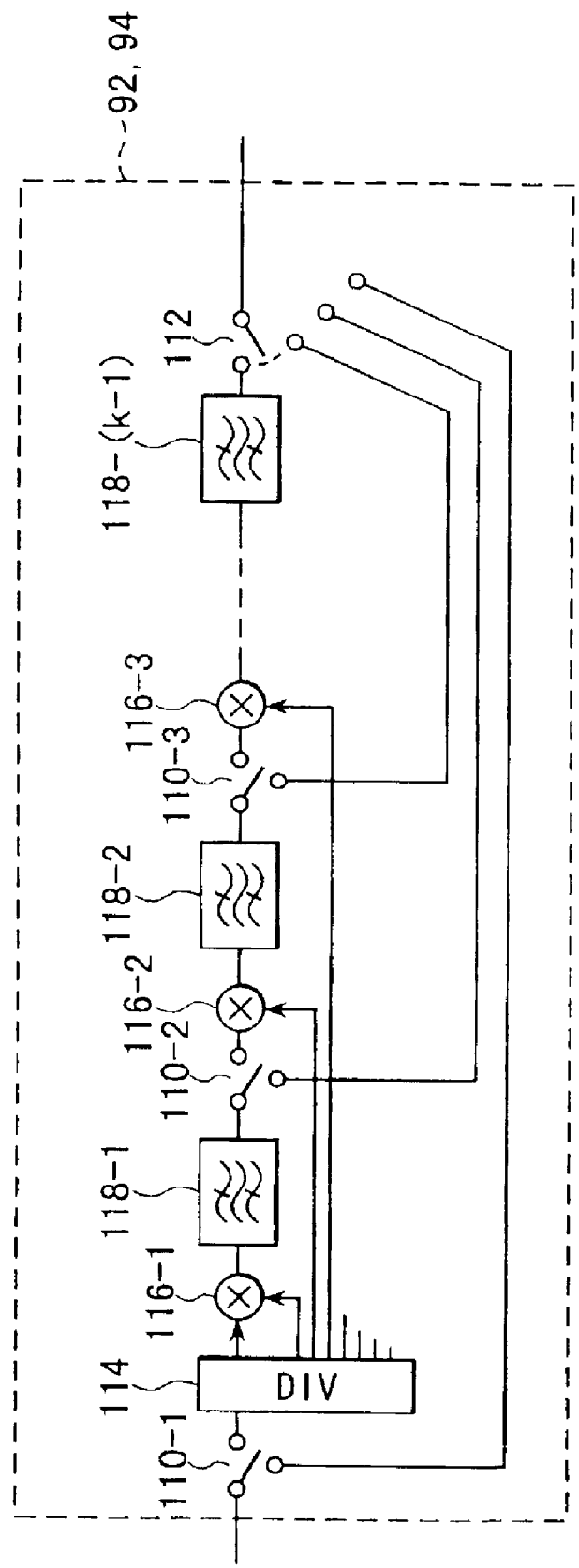
FIG. 20 is a block diagram showing still another arrangement of the frequency converter in the seventh embodiment.

As the multipliers 92 and 94 used for the frequency converter 82, conventional frequency multipliers with fixed multiplying factors are used if the multiplying factors $|n|$ and $|m|$ can be fixed. However, the multiplying factors may change sometimes depending on the system arrangement. That is, the frequency of an intermediate frequency subcarrier signal sent to the self station may change. In such a case, the multipliers 92 and 94 are constructed as shown in FIG. 20. In this example, the multiplying factor can be changed from 1 (without any multiplication) to k.

An input is supplied to a divider 114 through a switch 110-1. The switch 110-1 is a path change-over switch for selectively supplying the input to the divider 114 side or a selector 112 side. When the path is switched to the selector 112 side, the input signal is output without any multiplication.

The divider 114 distributes the input signal to k paths (outputs). The first and second outputs are input to a mixer 116-1. The mixer 116-1 outputs the sum frequency component and difference frequency component of the two input signals. From the output from the mixer 116-1, the sum frequency component is extracted by a bandpass filter 118-1, and a signal multiplied by 2 is output.

The output from the bandpass filter 118-1 is supplied to a switch 110-2. The switch 110-2 is a path change-over switch for supplying the signal to a mixer 116-2 of the next stage or the selector 112 side. The mixer 116-2 mixes the output from the bandpass filter 118-1 with the output from the divider 114 and outputs the mixed signal. The mixer 116-2 mixes the output from the mixer 116-1 for multiplication by 2 with the output from the divider 114, i.e., the original frequency signal. Hence, frequency up conversion of multiplication by 3 is performed. A bandpass filter 118-2 extracts the sum frequency component from the output from the mixer 116-2.

In a similar manner, an output from a bandpass filter 118-i is supplied to a switch 110-(i+1). The switch 110-(i+1) is a path change-over switch for supplying this signal to a mixer 116-(i+1) or the selector 112 side. The mixer 116-(i+1) mixes the output from the bandpass filter 118-i with the output from the divider 114 and outputs the mixed signal. The output from the mixer 116-(i+1) is supplied to a bandpass filter 118-(i+1) for extracting the sum frequency component, and frequency up conversion of (i+1) multiplication is performed.

The selector 112 selects one of the signal (original signal) from the switch 110-1 and signals frequency-up-converted by the respective stages and outputs the selected signal.

In the example shown in FIG. 20, multiplication by 1 (without any multiplication) to k can be performed. The input pilot carrier signals $f_{LO1}$ and $f_{LO2}$ are input to the switch 110-1. When the signals are to be multiplied by 1, i.e., output without any multiplication, the switch 110-1 is switched to the selector 112 side, and the selector 112 is switched to the switch 110-1 side.

In this way, a carrier signal multiplied by 1 is output. For multiplication by 2 or more, the switch 110-1 is switched and connected to the divider 114 side.

The divider 114 divides the input signal into k components. Two components are input to the two terminals of the mixer 116-1. The sum frequency component generated by the mixer 116-1 is selected by the bandpass filter 118-1 and outputted.

The output from the bandpass filter 118-1 is connected to the switch 110-2. When the switch 110-2 is connected to the selector 112 side, a signal multiplied by 2 is output. When the switch 110-2 is connected to the mixer 116-2 on the output side, the signal is multiplied by 3 or more. Similarly, the switches 110-2, 110-3, . . . and selector 112 are controlled such that the mixers and filters are alternately connected, and the signal multiplied by a necessary multiplying factor is connected to the output terminal.

With this arrangement, a multiplier with a variable multiplying factor can be constructed.

Figure 21:
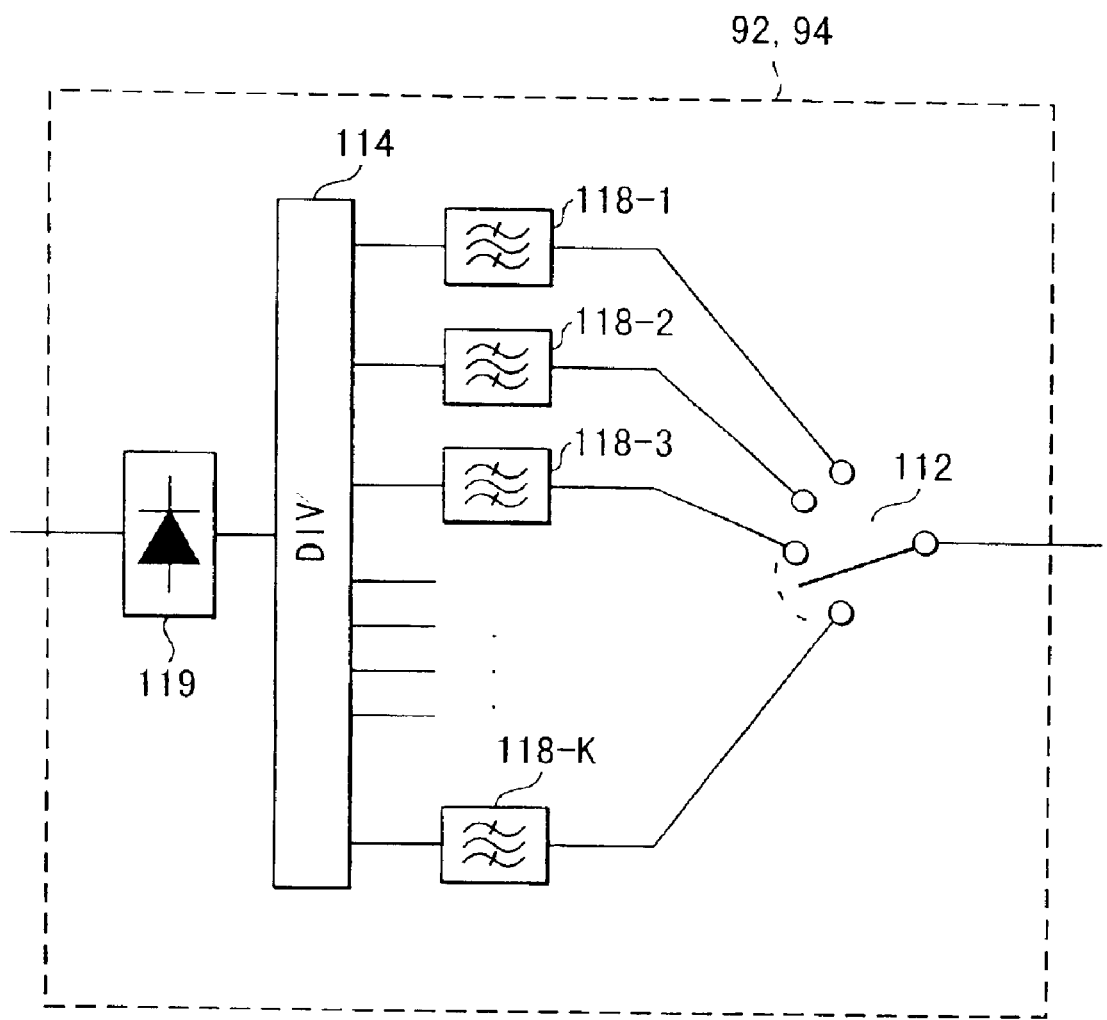
FIG. 21 is a block diagram showing an arrangement of a frequency multiplier in the frequency converter in the seventh embodiment.

Another arrangement may be employed for the multiplier with a variable multiplying factor. FIG. 21 shows a multiplier 92 or 94 having a nonlinear element such as a diode 119 to which an input signal is supplied, a filter bank formed of filters 118-1, 118-2, . . . , 118-k to which an output signal of the diode 119 is supplied via a divider 114, and a selector 112 selecting one of output signals from the filters 118-1, 118-2, . . . , 118-k.

Each of filters 118-1, 118-2, . . . , 118-k of the filter bank has pass characteristics corresponding to its harmonics. A filter corresponding to a desired multiplying factor is selected from the filter bank, thereby constructing a multiplier with a variable multiplying factor. Each output from the filter bank 118 is supplied to a selector 112. The selector 112 is controlled to select any path from the filter bank 118 and the signal multiplied by a necessary multiplying factor is connected to the output terminal.

[Third Arrangement of Frequency Converter]

Still another arrangement of the frequency converter 82 with a variable multiplying factor will be described with reference to FIG. 22.

The first pilot carrier signal $f_{LO1}$ is distributed into (n+m) components by a divider 128-1. The second pilot carrier signal $f_{LO2}$ is distributed into (n+m) by a divider 128-2.

Switches 126-1, 126-2, ..., 126-(n+m) select outputs from the divider 128-1 or 128-2. Outputs from the switches 126-1 and 126-2 are supplied to a mixer 122-1. An output from the mixer 122-1 is supplied to a mixer 122-2 through a bandpass filter 124-1.

In a similar manner, a mixer 122-i mixes an output from a bandpass filter 124-(i−1) with an output from a switch 126-(i+1). A mixer 122-(n+m) at the final stage mixes an output from a bandpass filter 124-(n+m−1) with the intermediate frequency subcarrier signal $f_{IF}$. An output from the mixer 122-(m+n) is output through a bandpass filter 124-(n+m). Even when the values n and m change, the value (n+m) does not change.

In this arrangement, the two pilot carrier signals $f_{LO1}$ and $f_{LO2}$ are distributed, by the dividers 128-1 and 128-2, into plural signals whose number equals a maximum multiplying factor. The mixer 122-1 has two terminals to which one of the signals $f_{LO1}$, $f_{LO2}$, and $f_{IF}$ is directly input, and each of the mixers 122-2 to 122-(n+m−1) has one terminal to which one of the signals $f_{LO1}$, $f_{LO2}$, and $f_{IF}$ is directly input. Hence, a total of n+m input terminals are present.

The switches 126-1, 126-2, ... are controlled such that the first pilot carrier signal $f_{LO1}$ is input to n terminals and the second pilot carrier signal $f_{LO2}$ is input to m terminals. The filters 124-1, 124-2, connected to the output sides of the mixers 122-1, 122-2, ... select sum frequency components from the difference frequency components and sum frequency components between the mixed signals output from the 122-1, 122-2, ... and the directly input signals $f_{LO1}$, $f_{LO2}$, and $f_{IF}$ and output the sum frequency components.

In this arrangement, the filter 124-(n+m−1) outputs a sum carrier of the first pilot carrier signal $f_{LO1}$ multiplied by n and the second pilot carrier signal $f_{LO2}$ multiplied by m. This signal is mixed with the intermediate frequency subcarrier signal $f_{IF}$ by the mixer 122-(n+m). As a result, the sum frequency component and difference frequency component are output from the mixer 122-(n+m), and the sum frequency component is selected by the bandpass filter 124-(m+n) and output, so a multiplied signal $f_{LO1} \times n + f_{LO2} \times m + f_{IF}$ is obtained.

With this arrangement, a frequency converter whose multiplying factor can be changed to a desired value can be constructed.

[Fourth Arrangement of Frequency Converter]

Still another arrangement of the frequency converter 82 will be described. In the above examples, n and m are "0" or positive integers.

However, in the present invention, n and m can be negative values. For example, assume that a relation $$10 \times f_{LO1} + f_{Ifi} = F_0$$

holds between the target frequency $F_0$, pilot carrier signals $f_{LO1}$ and $f_{LO2}$ (=$f_{LO1}-\Delta f$), and intermediate frequency subcarrier signal $f_{IF1}$.

For an intermediate frequency subcarrier signal $f_{IFi}+1$ (=$f_{IFi}+\Delta F$), $$9 \times f_{LO1} + f_{LO2} + f_{Ifi} = F_0$$

That is, the target frequency $F_0$ can be synthesized using positive values for both n and m, i.e., n=9 and m=1.

On the other hand, for an intermediate frequency subcarrier signal having a frequency of $f_{IFi-1}$ (=$f_{IFi}-\Delta F$), $$40 \times f_{LO1} - f_{LO2} + f_{Ifi-1} = F_0$$

That is, one of n and m is set to be negative: n=40 and m=−1.

In the arrangement of the frequency converter 82 shown in, e.g., FIG. 18, frequency synthesis using a negative value, i.e., subtraction can be executed by selecting, by the bandpass filter 102, the difference frequency component from the sum frequency component and difference frequency component generated by the mixer 98 and outputting the difference frequency component.

When negative values can be used as n and m, the upper and lower limits of the intermediate frequency subcarrier signal, i.e., limitation on the number of channels of subcarrier multiplex is moderated, and a flexible system can be constructed.

Various arrangements of the frequency converter have been described above. A pilot carrier signal separator will be described next.

[Arrangement of Pilot Carrier Signal Separator]

The pilot carrier signal separators (bandpass filters 40-1 and 40-2 in FIG. 15) in each of the transmitting/receiving devices 32B-1, 32B-2, ..., 32B-p can be realized by filters having small Q values, as described above. However, when PLLs (Phase-Locked Loops) are used together with the filters, the pilot carrier signals $f_{LO1}$ and $f_{LO2}$ with higher quality can be separated.

An optical signal sent from the transmitting/receiving station 10B contains not only the necessary intermediate frequency subcarrier signals $f_{IF}$ and pilot carrier signals $f_{LO1}$ and $f_{LO2}$ but also various noise components.

There are noise called relative intensify noise originally contained in the optical signal, thermal noise generated by the optical receiver, and shot noise generated when a photocurrent flows to the photodiode. These noise components are generally white noise.

When the pilot carrier signals $f_{LO1}$ and $f_{LO2}$ are separated from the optical signal containing such white noise using only filters with small Q values as the bandpass filters 40-1 and 40-2, a number of noise components are also extracted.

The demand for the noise amount changes depending on the system. Some systems can directly use components extracted by filters. However, in a system with a strict demand for noise, a PLL is connected to the output side of a filter having a small Q value. With this arrangement, the carrier-to-noise ratios of the pilot carrier signals $f_{LO1}$ and $f_{LO2}$ can be made high.

As mentioned in the description of prior arts, in some systems, the center frequency of a radio signal radiated from the antenna 48 of the self station slightly changes in units of the plurality of transmitting/receiving devices 32B-1, 32B-2, ..., 32B-p.

For example, when radio waves in the same 2 [GHz] band are radiated, the center frequency of the radio signal radiated from one transmitting/receiving device is 2.000000 [GHz], and the center frequency of the radio signal radiated from another transmitting/receiving device is 2.000100 [GHz]. That is, the center frequency changes at an interval of, e.g., 100 [kHz].

In this case as well, in the present invention, the frequency interval between subcarrier signals to be optically transmitted is set to be much larger than the frequency interval (e.g., 100 [kHz]) of the radio range. As a result, processing such as data separation in the transmitting/receiving device is facilitated.

When the present invention is applied to a system in which the frequencies of radio signals radiated from the transmitting/receiving devices 32B-1, 32B-2, ..., 32B-p are slightly different from each other, a frequency difference corresponding to the frequency difference (e.g., 100 [kHz])

between the radio waves of the transmitting/receiving devices 32B-1, 32B-2, . . . , 32B-p is applied to the frequencies of subcarrier signals to be optically transmitted in advance as an offset.

Since the frequency interval between the subcarrier signals to be optically transmitted is very large, this offset does not affect the operation of the present invention at all.

An example will be described below.

Assume that a signal radiated from the self station antenna 48 of the transmitting/receiving device 32B-1 has a center frequency $F_{01}$, and a signal radiated from the self-station antenna 48 of the transmitting/receiving device 32B-2 has a center frequency $F_{02}$ ($=F_{01}+\Delta F_R$).

The center frequency of the first and second pilot carrier signals $f_{LO1}$ and $f_{LO2}$ to be optically transmitted is $f_{LO2}$ ($=f_{LO1}+\Delta F$). The intermediate frequency subcarrier signal $f_{IF1}$ is subcarrier-transmitted with a center frequency $F_{01}$ that is given by $$F_{01}=7\times f_{LO1}+3\times f_{LO2}+f_{IF1}.$$

The intermediate frequency subcarrier signal $f_{IF2}$ is subcarrier-transmitted with a center frequency $F_{02}$ that is given by $$F_{02}=8\times f_{LO1}+2\times f_{LO2}+f_{IF2}.$$

At this time, the intermediate frequency subcarrier signals $f_{IF1}$ and $f_{IF2}$ are determined such that the difference between the center frequencies $f_{IF1}$ and $f_{IF2}$ of the two intermediate frequency subcarrier signals is represented by $$\Delta F+\Delta F_R.$$

Since $$\Delta F>>\Delta F_R$$

then $$\Delta F+\Delta F_R=\Delta F.$$

In this case, $\Delta F_R$ is the above-described offset amount of the subcarrier frequency.

In the embodiments of the present invention, such a small offset has not been specified so far and will not particularly be described in examples later. However, note that the method described in the seventh embodiment may be employed in practicing the present invention.

Eighth Embodiment

Figure 23:
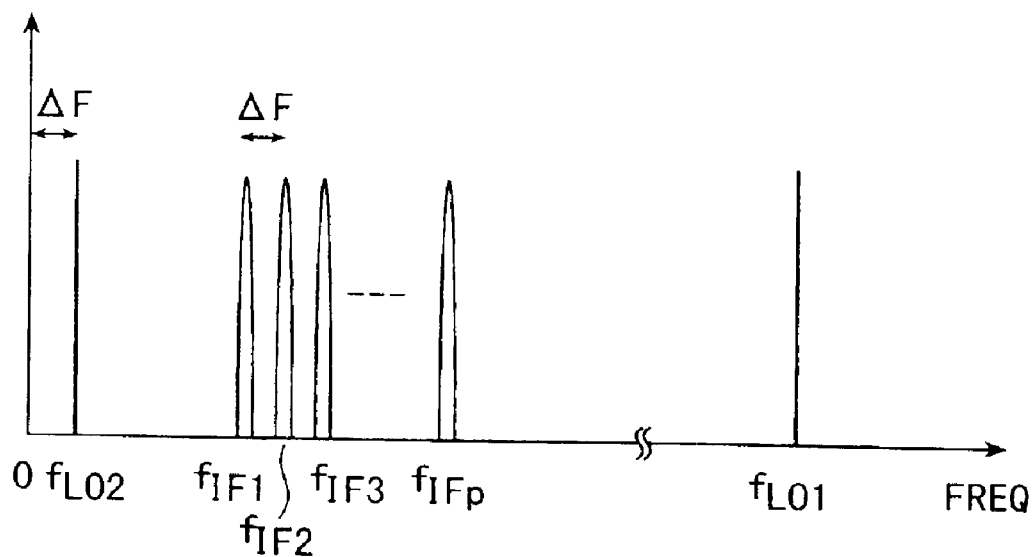
FIG. 23 is a graph showing a specific frequency arrangement of pilot carrier signals $f_{LO}$ of two types in an optical communication system according to an eighth embodiment of the present invention.

FIG. 23 is a graph showing the frequency arrangement in optical transmission of the eighth embodiment. Intermediate frequency subcarrier signals are subcarrier-multiplexed to center frequencies $f_{IF1}, f_{IF2}, \ldots, f_{IFp}$. The center frequency interval between adjacent intermediate frequency subcarrier signals is an integral multiple ($\geq 1$) of $\Delta F$. A first pilot carrier signal $f_{LO1}$ is set in a frequency band higher than that of the intermediate frequency subcarrier signals $f_{IF1}, f_{IF2}, \ldots, f_{IFp}$, as in the case described in the seventh embodiment. On the other hand, a second pilot carrier signal $f_{LO2}$ is set in a frequency band lower than that of the intermediate frequency subcarrier signals $f_{IF1}, f_{IF2}, \ldots, f_{IFp}$ and has the frequency $\Delta F$ in this embodiment.

Assume that for the intermediate frequency subcarrier signal $f_{IF1}$, the frequency $F_0$ of a signal to be radiated from the antenna is $F_0=n\times f_{LO1}+f_{IF1}$. The intermediate frequency subcarrier signal $f_{IF2}$ ($=f_{IF1}+\Delta F$) is synthesized such that the frequency $F_0$ becomes $F_0=n\times f_{LO1}-f_{LO2}+f_{IF2}$. That is, the intermediate frequency subcarrier signal $f_{IF1}$ is synthesized while setting a multiplying factor m of the second pilot carrier signal $f_{LO2}$ at 0, and the intermediate frequency subcarrier signal $f_{IF2}$ is synthesized while setting the multiplying factor m at −1. The intermediate frequency subcarrier signals $f_{IF3}, f_{IF4}, \ldots, f_{IFp}$ are also synthesized in a similar manner.

If a negative multiplying factor m is not preferable, for the intermediate frequency subcarrier signal $f_{IFp}$ having the highest frequency, $F_0=n\times f_{LO1}+f_{IFp}$ is set. For an intermediate frequency subcarrier signal $f_{IFp-1}$ ($=f_{IFp}-\Delta F$), $F_0=n\times f_{LO1}+f_{LO2}+f_{IFp-1}$ is set. Frequencies are sequentially synthesized in a similar manner.

For an intermediate frequency subcarrier signal $f_{IFi}$, $F_0=n\times f_{LO1}+f_{IFi}$ is set. For an intermediate frequency subcarrier signal having a frequency lower than $f_{IFi}$, an integral multiple of $f_{LO2}$ is appropriately added. For an intermediate frequency subcarrier signal having a frequency higher than $f_{IFi}$, an integral multiple of $f_{LO2}$ is appropriately subtracted.

The arrangement of the system to which the eighth embodiment is applied is the same as in FIG. 15. The arrangement of a frequency converter 82 in each of the transmitting/receiving devices 32B-1, 32B-2, . . . , 32B-p is the same as in FIG. 18 or 19.

Although the arrangement is the same as in the eighth embodiment, the operation is slightly different. The operation of the arrangement shown in FIG. 18 will be described, assuming that the intermediate frequency subcarrier signal used by the station is $f_{IF3}$ ($=f_{IF1}+2\times\Delta F$), and the target center frequency of frequency conversion is $F_0=n\times f_{LO1}+f_{IF1}$.

Referring to FIG. 18, the intermediate frequency subcarrier signal $f_{IF3}$ is input to the mixer 96. On the other hand, the first pilot carrier signal $f_{LO1}$ is input and multiplied by n (>0) by the multiplier 92. Unlike the arrangement in FIG. 18, the value n is constant independently of the center frequency in subcarrier transmission of the intermediate frequency subcarrier signal.

The intermediate frequency subcarrier signal $f_{IF3}$ and the first pilot carrier signal $f_{LO1}$ multiplied by n are mixed by the mixer 96, so a sum frequency component ($n\times f_{LO1}+f_{IF3}$) and difference frequency component ($n\times f_{LO1}-f_{IF3}$) are obtained. Of the sum frequency component ($n\times f_{LO1}+f_{IF3}$) and difference frequency component ($n\times f_{LO1}-f_{IF3}$) output from the mixer 96, the sum frequency component is selected by the bandpass filter 100 and outputted.

The second pilot carrier signal $f_{LO2}$ is multiplied by $|m|$ by the multiplier 94. In this example, since the multiplying factor m is −2, the second pilot carrier signal $f_{LO2}$ is multiplied by 2 by the multiplier 94.

The output from the bandpass filter 100 and the output from the multiplier 94 are mixed by the mixer 98. Consequently, the sum frequency component ($n\times f_{LO1}+f_{IF3}+|m|\times f_{LO2}$) and difference frequency component ($n\times f_{LO1}+f_{IF3}-|m|\times f_{LO2}$) between the two signals are output from the mixer 98.

Since the multiplying factor m is a negative value, the bandpass filter 102 selects the difference frequency component and outputs this component. As a result, the target frequency $F_0$ is output from the bandpass filter 102.

The frequency converter 82 may have the arrangement shown in FIG. 19.

In the frequency converter 82 having this arrangement, the first pilot carrier signal $f_{LO1}$ is multiplied by n (>0) by the multiplier 92. In this case as well, the value n is constant independently of the subcarrier center frequency of the intermediate frequency subcarrier signal, unlike the arrangement in FIG. 18.

The second pilot carrier signal $f_{LO2}$ is multiplied by $|m|$ by the multiplier 94. For the intermediate frequency subcarrier signal $f_{IF3}$, the multiplying factor m is −2, the second pilot carrier signal $f_{LO2}$ is multiplied by 2 by the multiplier 94.

The first pilot carrier signal $f_{LO1}$ multiplied by n and second pilot carrier signal $f_{LO2}$ multiplied by |m| are supplied to the mixer 96 and mixed. As a consequence, the sum frequency component $(n \times F_{LO1} + |m| \times f_{LO2})$ and difference frequency component $(n \times f_{LO1} - 51\,m| \times f_{LO2})$ are output from the mixer 96.

As described above, since the value m is negative, of the sum frequency component $(n \times f_{LO1} + |m| \times f_{LO2})$ and difference frequency component $(n \times f_{LO1} - |m| \times f_{LO2})$ output from the mixer 96, the difference frequency component is selected by the filter 100. The output from the filter 100 is input to the mixer 98.

The mixer 98 mixes the intermediate frequency subcarrier signal $f_{IF3}$ with the output from the filter 100. As a result, the sum frequency component $(n \times f_{LO1} - |m| \times f_{LO2} + f_{IF3})$ and difference frequency component $(n \times f_{LO1} - |m| \times f_{LO2} - f_{IF3})$ between the two signals is output from the mixer 98. This output signal is supplied to the filter 102.

Of the sum frequency component $(n \times f_{LO1} - |m| \times f_{LO2} + f_{IF3})$ and difference frequency component $(n \times f_{LO1} - |m| \times f_{LO2} - f_{IF3})$ output from the mixer 98, the difference frequency component is selected by the filter 102. Consequently, the target frequency $F_0$ is output from the filter 102.

In the above examples, the value n is constant independently of the subcarrier frequency in optical transmission. If the value n can change depending on the transmitting/receiving device, the absolute values of n and m can be decreased in accordance with a condition. This condition is that the first pilot carrier signal $f_{LO1}$ is an integral multiple of the second pilot carrier signal $f_{LO2}$ (=ΔF). An example will be described.

For example, an intermediate frequency subcarrier signal having a center frequency $f_{IF4}$ (=$f_{IF1}$+4×ΔF) when $f_{LO1}$=3× $f_{LO2}$ will be considered.

Assume that the center frequency of a radio signal radiated from the antenna 48 is $F_0$ (=$n \times f_{LO1} + f_{IF1}$) In this case, as in the above examples, the first pilot carrier signal $f_{LO1}$ is multiplied by n, a difference between the resultant signal and the second pilot carrier signal $f_{LO2}$ multiplied by 4 is calculated, and the intermediate frequency subcarrier signal $f_{IF4}$ is added to the difference. That is, $n \times f_{LO1} - 4 \times f_{LO2} + f_{IF4}$ is calculated. With this frequency conversion, the target frequency $F_0$ can be obtained.

Alternatively, since $f_{LO1} = 3 \times f_{LO2}$, the target frequency $F_0$ can be obtained by frequency conversion $(n-1) \times f_{LO1} - f_{LO2} + f_{IF4}$. At this time, the first pilot carrier signal $f_{LO1}$ is multiplied by (n−1), and the second pilot carrier signal $f_{LO2}$ is multiplied by (|m|−3).

<Arrangement Using Transmitting/receiving Device with A Plurality of Antennas>

The above description has been made in association with a system using a transmitting/receiving device having one antenna. Each of the transmitting/receiving devices 32B-1, 32B-2, . . . , 32B-p extracts one of a plurality of intermediate frequency subcarrier signals frequency-multiplexed and transmitted from the transmitting/receiving station 10B.

However, an arrangement using a transmitting/receiving device with a plurality of antennas may also be used. In this case, a plurality of intermediate frequency subcarrier signals need be used by one transmitting/receiving device.

Figure 24:
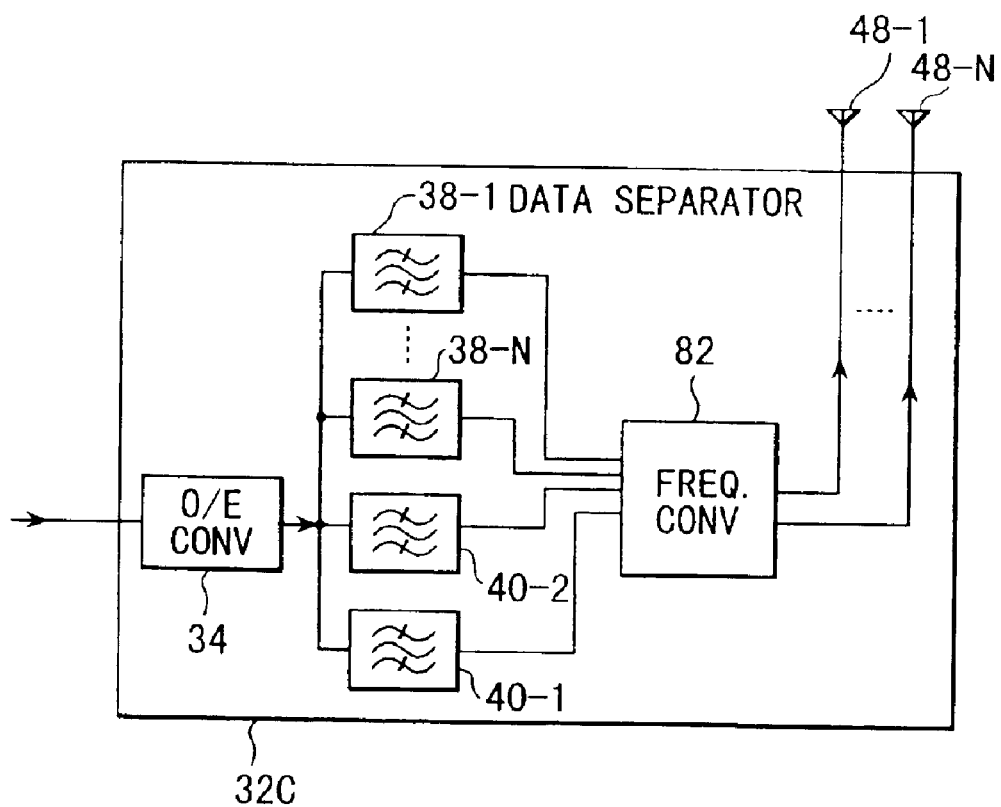
FIG. 24 is a block diagram showing the arrangement of a transmitting/receiving device having a plurality of antennas as a modification of the eighth embodiment.

FIG. 24 shows the arrangement of such a transmitting/receiving device 32C.

The transmitting/receiving device 32C comprises the O/E converter 34, intermediate frequency subcarrier signal separation bandpass filters 38-1, 38-2, . . . , 38-N, the pilot carrier signal separation bandpass filters 40-1 and 40-2, the frequency converter 82 formed from a multiplier and a power amplifier, and antennas 48-1, 48-2, . . . , 48-N. The bandpass filters 38-1, . . . , 38-N are arranged in correspondence with the antennas 48-1, . . . , 48-N, respectively. The bandpass filters 38-1, . . . , 38-N extract intermediate frequency subcarrier signals for corresponding antennas 48-1, . . . , 48-N from an electrical signal from the O/E converter 34 and are formed from simple filters having small Q value.

In this arrangement, an optical signal transmitted from the transmitting/receiving station 10B as shown in FIG. 15 is photoelectrically converted into an electrical signal. From the electrical signal obtained by photoelectrically converting a received optical signal by the O/E converter 34, the first pilot carrier signal separator 40-1 extracts the first pilot carrier signal $f_{LO1}$, and the second pilot carrier signal separator 40-2 extracts the second pilot carrier signal $f_{LO2}$.

When the transmitting/receiving device 32C uses N (N≧2) intermediate frequency subcarrier signals, the intermediate frequency subcarrier signals are separated by the bandpass filters 38-1, 38-2, . . . , 38-N formed from simple filters.

The separated intermediate frequency subcarrier signals are converted into frequencies to be radiated from the antennas 48-1, 48-2, . . . , 48-N by the frequency converter 82. The signals are sent to the antennas 48-1, 48-2, . . . 48-N and radiated into air.

Figure 22:
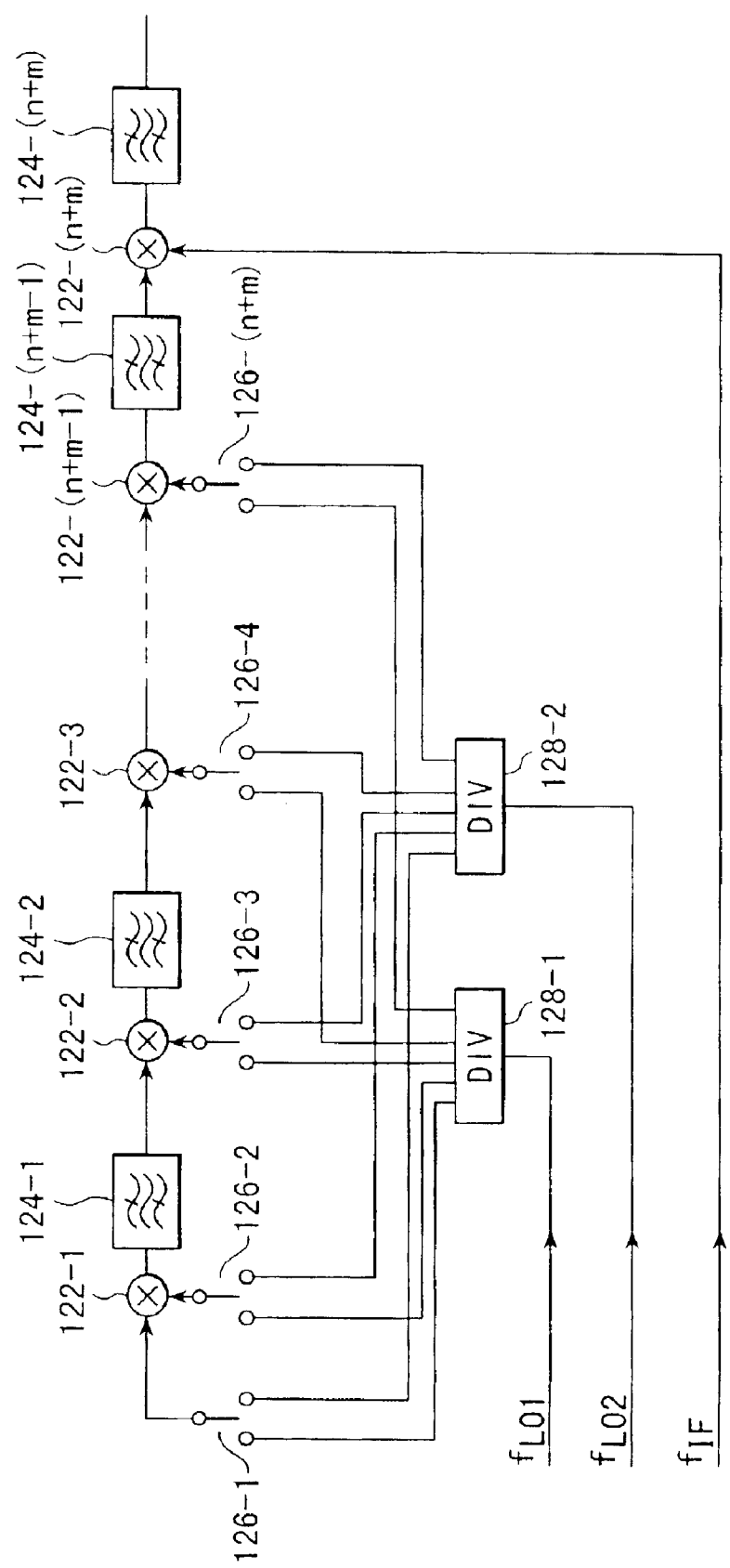
FIG. 22 is a block diagram showing still another arrangement of the frequency converter in the seventh embodiment.

For the frequency converter 82, the arrangement shown in FIG. 18, 19, or 22 may be prepared in number corresponding to the number of intermediate frequency subcarrier signals. Alternatively, portions where the frequencies of the pilot carrier signals $f_{LO1}$ and $f_{LO2}$ are multiplied by a desired value and added, which are common to the intermediate frequency subcarrier signals, may be shared by the intermediate frequency subcarrier signals.

In this embodiment, if the value N is large, the transmitting/receiving stations 10B and transmitting/receiving devices 32C may be connected in a one-to-one correspondence instead of connecting one transmitting/receiving station to a plurality of transmitting/receiving devices as in the above examples.

The above description has been made about the transmission system (down link signal processing system). A reception system is also necessary, and the reception system (up link signal processing system) of this system will be described next as a ninth embodiment.

Ninth Embodiment

The ninth embodiment is associated with a reception system (up link signal processing system). When three or more intermediate frequency subcarrier signals, i.e., intermediate frequency subcarrier signals of three or more systems are to be received by different antennas, only two pilot carrier signals $f_{LO1}$ and $f_{LO2}$ are used for frequency conversion of the intermediate frequency subcarrier signals, an intermediate frequency subcarrier signal of a system is converted into a signal with a desired frequency using the pilot carrier signals and the intermediate frequency subcarrier signal of that system and optically transmitted to a transmitting/receiving station.

Figure 25:
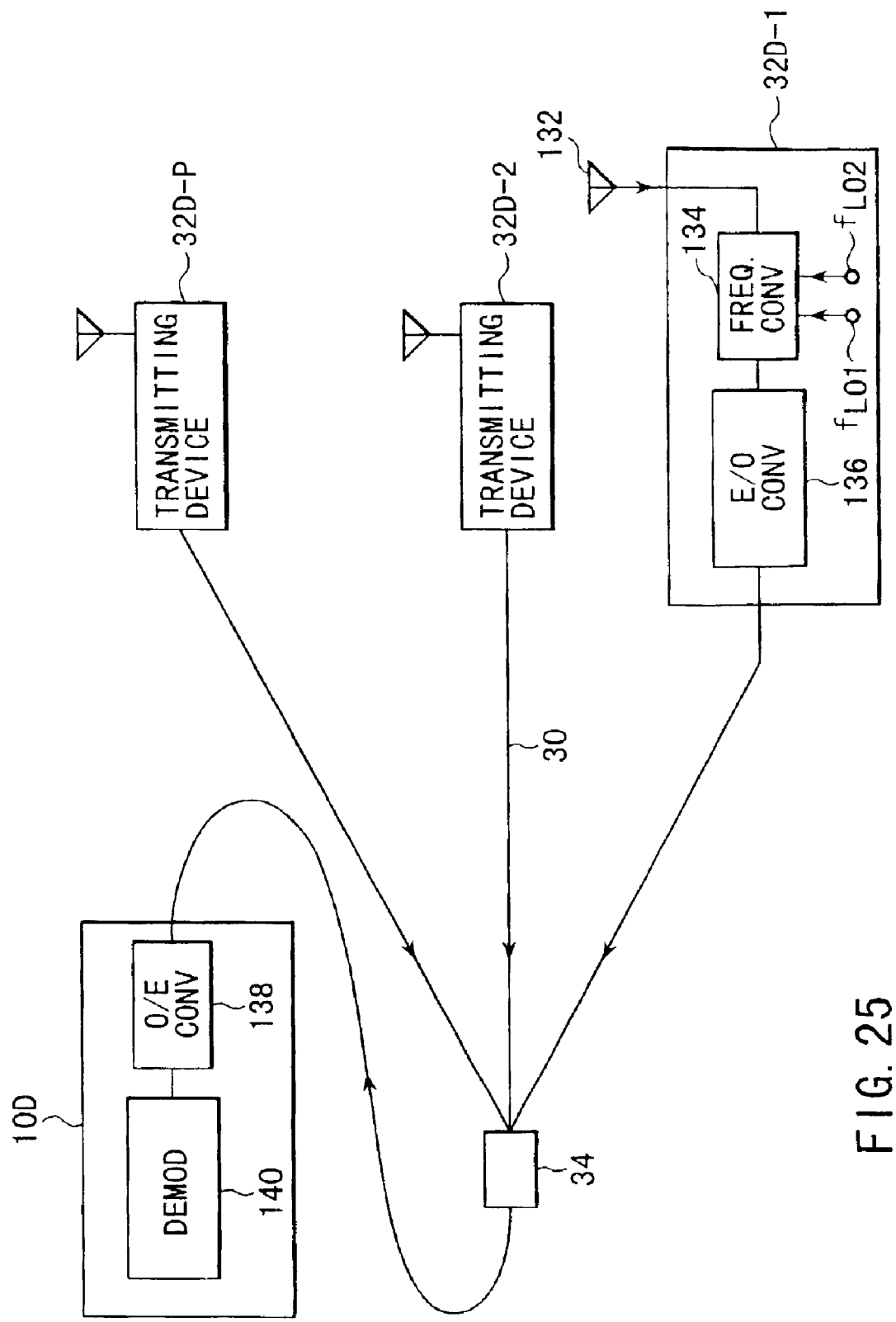
FIG. 25 is a block diagram showing the arrangement of a reception system (up link system) in an optical communication system according to a ninth embodiment of the present invention.

FIG. 25 is a block diagram showing an embodiment of the reception system, i.e., up link signal processing system of such a system. As shown in FIG. 25, as the system arrangement of the reception system, a receiving station 10D incorporates a data separation demodulator 140 and an O/E converter 138.

Each of a plurality of receiving devices 32D-1, 32D-2, . . . , 32D-p has an E/O converter 136, a frequency converter 134, and an antenna 132. The frequency converter 134 receives the first and second pilot carrier signals $f_{LO1}$ and $f_{LO2}$.

The plurality of receiving devices 32D-1, 32D-2, ..., 32D-p and receiving station 10D are connected through optical fibers 30. Optical signals received by the receiving devices 32D-1, 32D-2, ..., 32D-p are coupled by an optical divider 34 inserted midway along the optical fibers 30, and are guided to the receiving station 10D.

The frequency converter 134 frequency-converts a received radio signal into an intermediate frequency subcarrier signal $f_{IF}$ using the first and second pilot carrier signals $f_{LO1}$ and $f_{LO2}$ and the carrier component of the radio signal. The first and second pilot carrier signals $f_{LO1}$ and $f_{LO2}$ are transmitted from a device with exception of the receiving device 32D-1. It is most reasonable to use the pilot carrier signals $f_{LO1}$ and $f_{LO2}$ from the terminal station 10D, which are separated in the transmission system (down link signal processing system).

The E/O converter 136 converts the intermediate frequency subcarrier signal $f_{IF}$ frequency-converted by the frequency converter 134 into an optical signal and optically subcarrier-transmits the optical signal to the optical fiber 30.

The O/E converter 138 in the receiving station 10D converts the optical signal optically subcarrier-transmitted through the optical fiber 30 into an electrical signal. The data separation demodulator 140 separates the electrical signal converted by the O/E converter 138 into intermediate frequency subcarrier signals in units of channels and demodulates the signals.

In the system having this arrangement, the radio signals having center frequencies $F_0$, which are received by the antennas 132 of the receiving devices 32D-1, ..., 32D-p, are frequency-converted into intermediate frequency subcarrier signals $f_{IF1}, ..., f_{IFp}$ by the frequency converters 134. The first and second pilot carrier signals $f_{LO1}$ and $f_{LO2}$ are input to each frequency converter 134. Signals obtained by appropriately multiplying the two pilot carrier signals $f_{LO1}$ and $f_{LO2}$ are appropriately added/subtracted to/from the frequencies of the radio signals having the center frequencies $F_0$ to obtain the intermediate frequency subcarrier signals $f_{IF1}, ..., f_{IFp}$. The signals converted into the intermediate frequency subcarrier signals $f_{IF1}, ..., f_{IFp}$ are converted into optical signals by the E/O converters 136 and optically subcarrier-transmitted to the receiving station 10D through the optical fibers 30.

Figure 26:
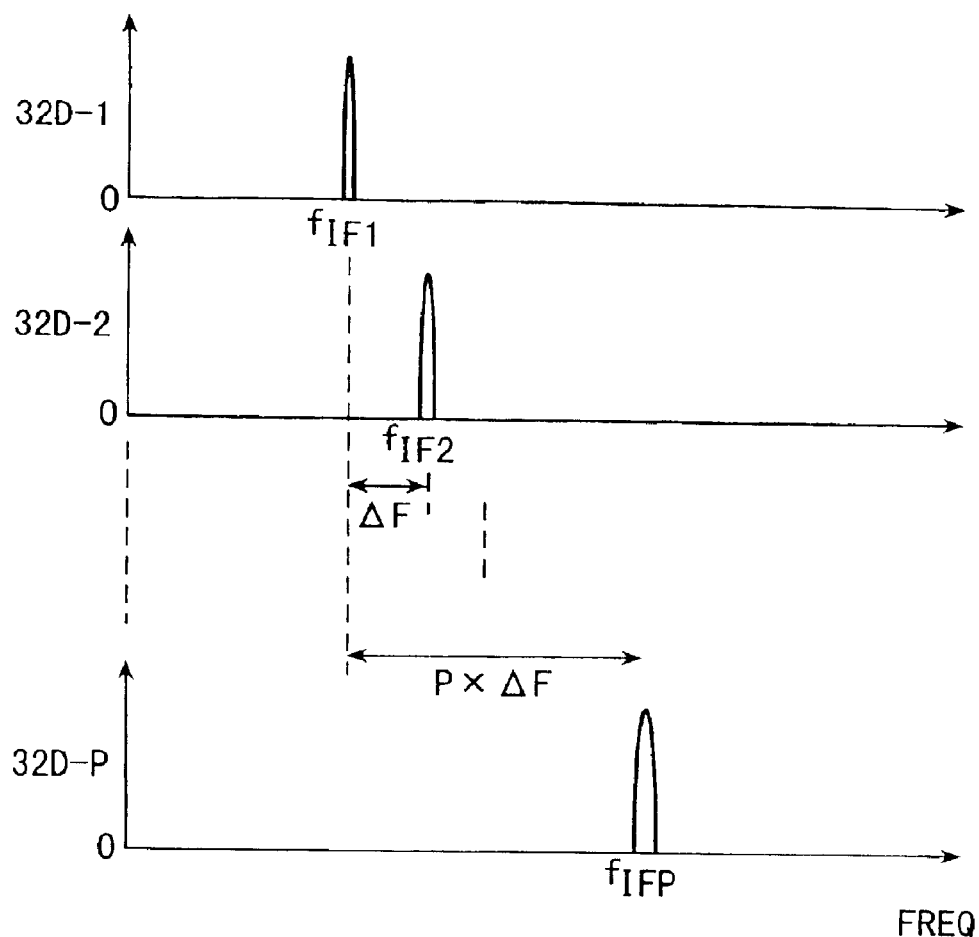
FIG. 26 is a graph showing an intermediate frequency subcarrier for each transmitting/receiving device in the ninth embodiment.

FIG. 26 is a graph showing the frequency arrangement of the intermediate frequency subcarrier signals $f_{IF1}, ..., f_{IFp}$. The frequency converters 134 of the receiving devices 32D-1, ..., 32D-p use different multiplying factors for the two pilot carrier signals $f_{LO1}$ and $f_{LO2}$ and different signs for addition/subtraction.

Optical signals output from the plurality of receiving devices 32D-1, ..., 32D-p are coupled by the optical divider 34 and converted into an electrical signal by the O/E converter 138 in the receiving station 10D. For the spectrum of the electrical signal received and converted by the O/E converter 138, the center frequencies have a difference such that the signal can be separated in units of devices, as shown in FIG. 26. At the demodulator 140, the received signal is separated to each subcarrier signal corresponding with each intermediate frequency band and demodulated to the data.

With this arrangement, each different subcarrier frequency which is converted data signals in the same radio frequency band into at the receiving devices becomes stable.

Like the down link signal (transmission signal) processing system shown in FIG. 24, the up link signal (reception signal) processing system may also employ an arrangement using one transmitting/receiving device having a plurality of antennas. In this arrangement, intermediate frequency subcarrier signals received by the plurality of antennas are converted into different frequencies and optically transmitted to the transmitting/receiving station.

Figure 27:
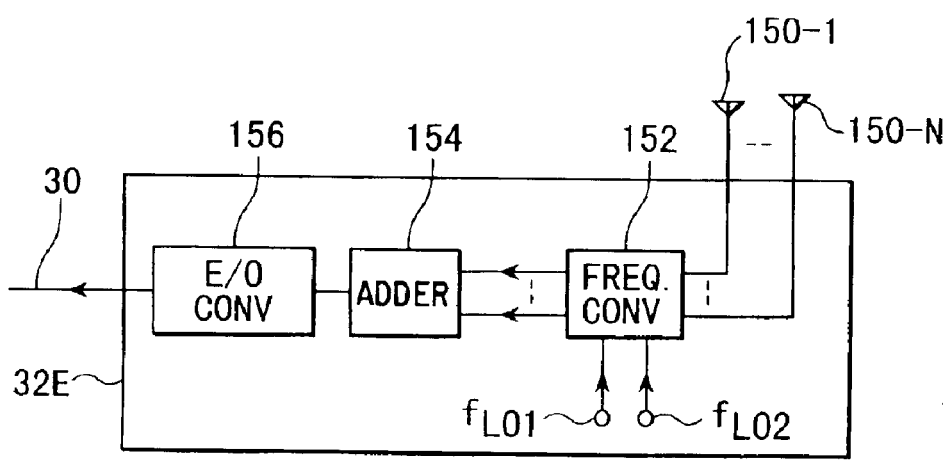
FIG. 27 is a block diagram showing the arrangement of a transmitting/receiving device having a plurality of antennas as a modification of the ninth embodiment.

FIG. 27 shows the arrangement of a receiving device 32E. Referring to FIG. 27, antennas 150-1, ..., 150-N are antennas of different systems. Outputs from the antennas 150-1, ..., 150-N are transmitted to the optical fiber 30 through a frequency converter 152, a mixer 154, and an E/O converter 156. The frequency converter 152 converts the radio signals received by the plurality of antennas 150-1, ..., 150-N into different subcarrier frequencies using the first and second pilot carrier signals $f_{LO1}$ and $f_{LO2}$.

The mixer 154 mixes the subcarrier signals of different antenna systems, which are output from the frequency converter 152. The E/O converter 156 modulates the mixed subcarrier signal into an optical signal and outputs the optical signal to the optical fiber 30.

In the system having the above arrangement, radio signals are received by the plurality of antennas 150-1, ..., 150-N of the receiving device 32E. The received radio signals are converted into different subcarrier frequencies by the frequency converter 152 using the first and second pilot carrier signals $f_{LO1}$ and $f_{LO2}$.

The pilot carrier signals $f_{LO1}$ and $f_{LO2}$ are transmitted from an external device of the receiving device 32E. The frequency converter 152 appropriately multiplies and adds/subtracts the pilot carrier signals $f_{LO1}$ and $f_{LO2}$ to frequency-convert the radio signals received by the antennas.

The multiplying factors and, in some cases, the signs for addition/subtraction of the pilot carrier signals $f_{LO1}$ and $f_{LO2}$ change in units of signals received by the antennas.

The frequency converter 152 may have independent multiplication and addition/subtraction means in correspondence with the antennas, or a common portion may be shared.

The signals frequency-converted into different subcarrier frequencies by the frequency converter 152 are added by the adder 154, converted into an optical signal by the E/O converter 156, and transmitted to the receiving station. As in FIG. 25, signals from the plurality of receiving devices may be mixed and transmitted to the receiving station. Alternatively, the receiving devices and receiving stations may be connected in a one-to-one correspondence.

In the above-described examples, the transmitting/receiving device has only the down link signal processing system or only the up link signal processing system. However, a transmitting/receiving device incorporating both a down link signal processing system and up link signal processing system is also necessary. An example, will be described below.

Tenth Embodiment

An example of a transmitting/receiving device incorporating a down link signal processing system and up link signal processing system will be described. The communication system to be described below has the characteristic features of both the above-described arrangement applied to a down link signal and that applied to an up link signal. The transmitting/receiving device also uses two pilot carrier signals $f_{LO1}$ and $f_{LO2}$ contained in an optical signal sent from a transmitting/receiving station for frequency conversion of an up link signal received by the antenna.

Figure 28:
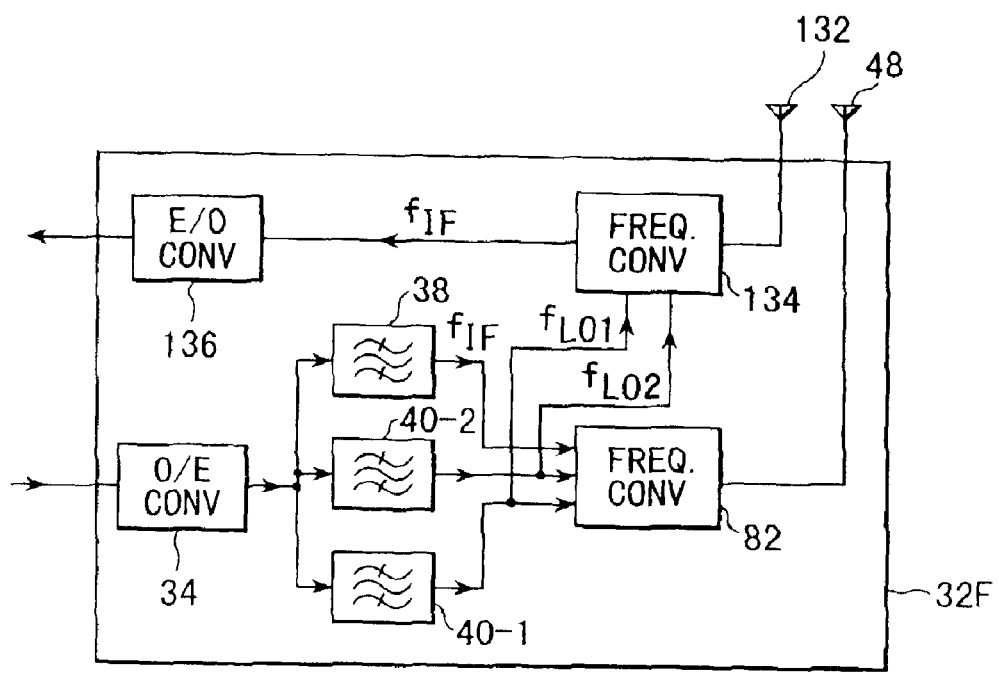
FIG. 28 is a block diagram showing an arrangement of a transmitting/receiving device in an optical communication system according to a tenth embodiment of the present invention.
Figure 29:
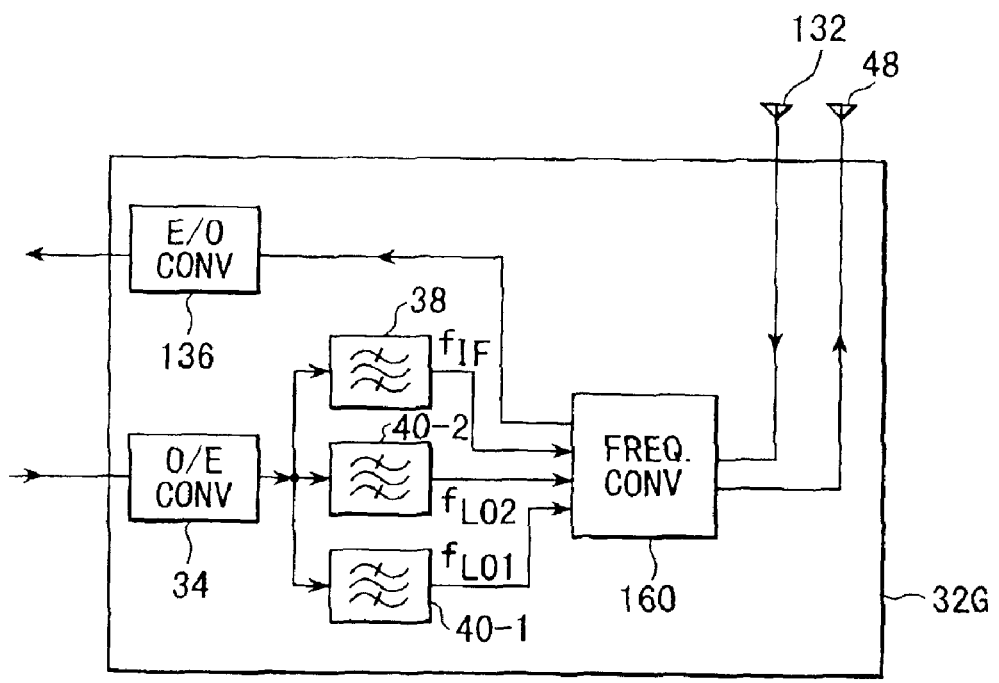
FIG. 29 is a block diagram showing another arrangement of the transmitting/receiving device in the optical communication system according to the tenth embodiment of the present invention.

FIGS. 28 and 29 show arrangements of the transmitting/receiving device. The transmitting/receiving device shown in FIG. 28 has both the transmitting/receiving device structures shown in FIGS. 15 and 25. In addition, the pilot carrier signals $f_{LO1}$ and $f_{LO2}$ obtained by the system for processing a down link signal are divided and input to the system for processing an up link signal.

More specifically, the down link signal processing system of a transmitting/receiving device 32F comprises the O/E converter 34, bandpass filter 38 for extracting an intermediate frequency subcarrier signal, bandpass filters 40-1 and 40-2 for extracting pilot carrier signals, frequency converter 82, and antenna 48. The up link signal processing system comprises an antenna 132, a frequency converter 134, and an E/O converter 136.

The bandpass filters 40-1 and 40-2 extract the first and second pilot carrier signals $f_{LO1}$ and $f_{LO2}$. The pilot carrier signals $f_{LO1}$ and $f_{LO2}$ are used by the frequency converter 82 in the down link signal processing system and also supplied to the frequency converter 134 in the up link signal processing system. The frequency converter 134 frequency-converts a received radio signal into an intermediate frequency subcarrier signal $f_{IF}$ using the first and second pilot carrier signals $f_{LO1}$ and $f_{LO2}$.

As described above, the first and second pilot carrier signals $f_{LO1}$ and $f_{LO2}$ extracted by the bandpass filters 40-1 and 40-2 in the down link signal processing system are used not only by the frequency converter 82 in the down link signal processing system but also by the frequency converter 134 in the up link signal processing system to frequency-convert an up link signal.

In the arrangement shown in FIG. 28, the transmitted pilot carrier signals $f_{LO1}$ and $f_{LO2}$ are separated and independently multiplied and added/subtracted in the frequency converters 82 and 134. After this, frequency conversion is performed to obtain a predetermined frequency. A portion capable of partially sharing the multiplication and addition/subtraction functions may be shared. An example is shown in FIG. 29.

In FIG. 29, a frequency converter 160 which integrates the frequency converters 82 and 134 of the arrangement shown in FIG. 28 is used. In this frequency converter 160, the multiplication and addition/subtraction functions are partially shared by up and down link signals.

In the frequency converter 160, a multiplier output and, as needed, a mixer output of the frequency converter for a down link signal in FIG. 18 or 19 are divided and used for frequency conversion of an up link signal.

Figure 30:
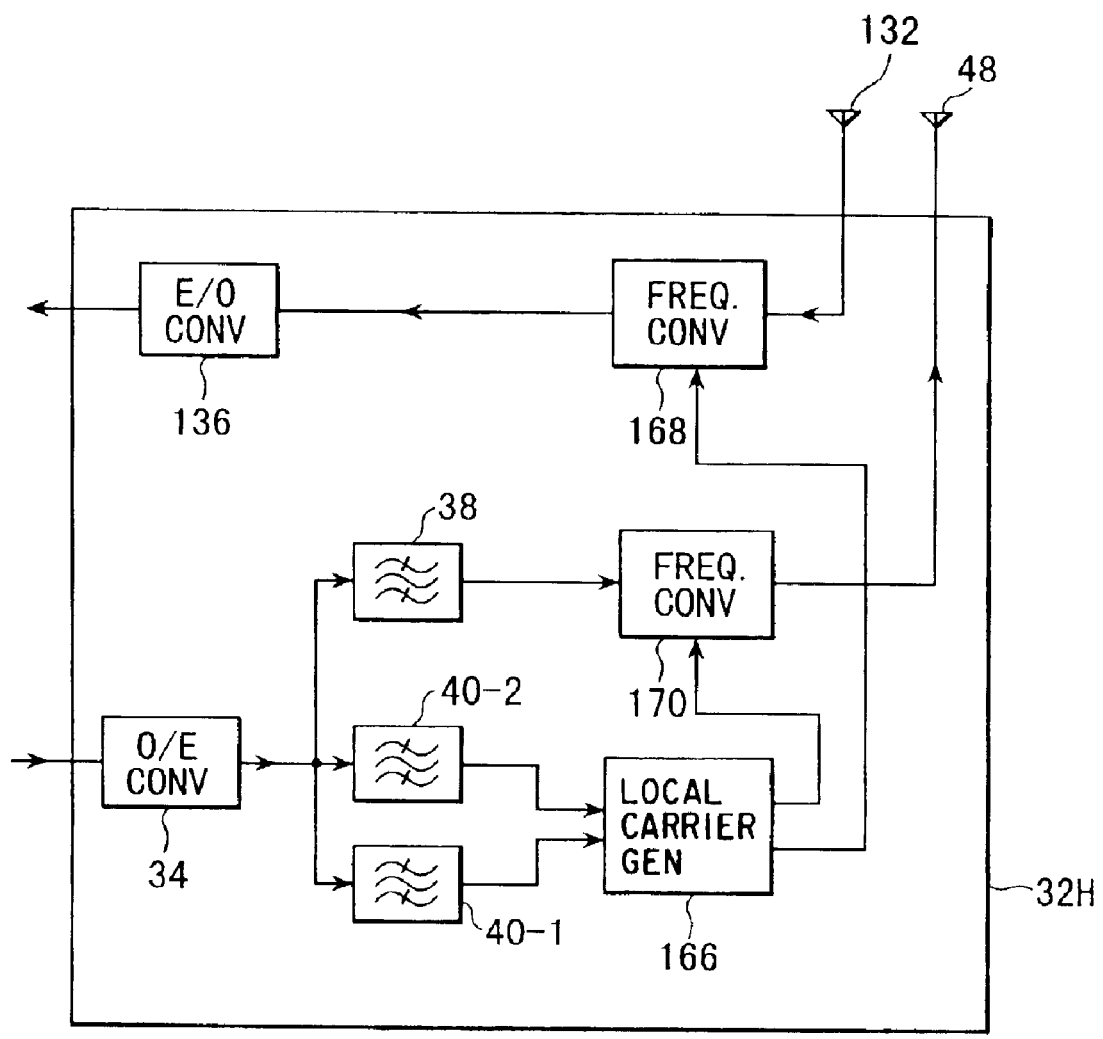
FIG. 30 is a block diagram showing still another arrangement of the transmitting/receiving device in the tenth embodiment.

In addition, as shown in FIG. 30, outputs from the bandpass filters 40-1 and 40-2 are input to a local carrier generation unit 166. The local carrier generation unit 166 generates local carrier signals to be used to frequency-convert up link and down link signals.

A frequency converter 168 for an up link signal and a frequency converter 170 for a down link signal only add/subtract the local carrier signals generated by the local carrier generation unit 166 to/from the frequencies of signals before frequency conversion. Hence, each of the frequency converters 168 and 170 has a simple arrangement mainly comprising a mixer and a filter.

In the above example, the antennas for up link and down link signals are separated. However, when one antenna can be used for both up link and down link signals, a circulator is connected to one antenna such that the up link system and down link system can share the antenna through the circulator.

Figure 31:
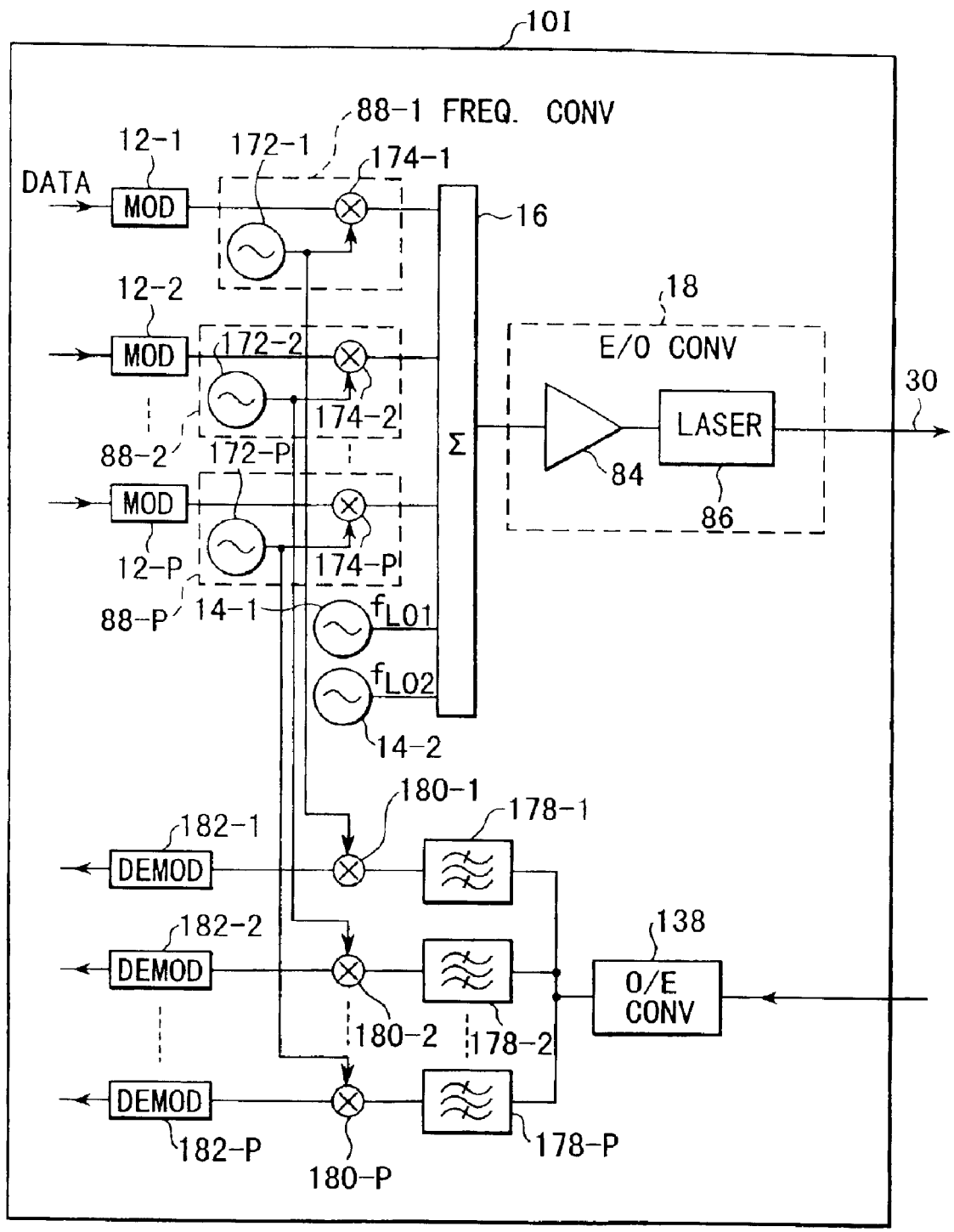
FIG. 31 is a block diagram showing still another arrangement of the transmitting/receiving device (subcarrier multiplex type transmitting/receiving device) in the tenth embodiment of the present invention.

In this form, in a transmitting/receiving station 10I, local carrier signals can be used to generate subcarrier signals for a down link signal and also to frequency-convert subcarrier signals for an up link signal before modulation. FIG. 31 is a block diagram showing an example of the transmitting/receiving station 10I with such an arrangement.

<Arrangement of Subcarrier Signal Sharing Transmitting/Receiving Station>

The transmitting/receiving station 10I shown in FIG. 31 has, as a down link system (transmission system), the E/O converter 18 formed from the laser element 86 and the laser driver 84, adder 16, frequency converters 88-1, 88-2, . . . , 88-p each comprising a local carrier generator 172 and a mixer 174, modulators 12-1, 12-2, . . . , 12-p, and first and second pilot carrier generators 14-1 and 14-2.

The modulators 12-1, 12-2, . . . , 12-p modulate input data and output them to the corresponding frequency converters 88-1, 88-2, . . . , 88-p, respectively.

Local carrier generators 172-1, . . . , 172-p generate different local carrier signals. The local carrier generators 172-1, . . . , 172-p are arranged, respectively, corresponding to frequency converters 88-1, 88-2, . . . , 88-p and output local carrier signals to corresponding mixers 174-1, 174-2, . . . , 174-p, respectively. Each of the mixers 174-1, 174-2, . . . , 174-p converts the modulated input signal into the intermediate frequency subcarrier signal $f_{IF}$ having a desired center frequency using the frequency of the input signal and local carrier signal and outputs the converted signal.

The first and second pilot carrier generators 14-1 and 14-2 generate the first and second pilot carrier signals $f_{LO1}$ and $f_{LO2}$ having different frequencies, respectively. The adder 16 synthesizes the two pilot carrier signals $f_{LO1}$ and $f_{LO2}$ and outputs from the frequency converters 88-1, 88-2, . . . , 88-p. The laser driver 84 drives the laser element 86 in accordance with the signal synthesized by the adder 16. The laser element 86 outputs a laser beam optically modulated in accordance with the synthesized signal from the adder 16 and sends the laser beam to the optical fiber 30.

The reception system, i.e., the up link signal processing system comprises the O/E converter 138, intermediate frequency subcarrier signal separators 178-1, . . . , 178-p, mixers 180-1, . . . , 180-p for frequency conversion, and demodulators 182-1, 182-p.

The O/E converter 138 is connected to an optical divider (not shown) and receives an optical signal transmitted from the transmitting/receiving device side through the optical fiber 30 and converts the optical signal into an electrical signal. Each of the intermediate frequency subcarrier signal separators 178-1, . . . , 178-p separates and extracts an intermediate frequency subcarrier signal for a specific one of the plurality of transmitting/receiving devices from the electrical signal from the O/E converter 138 and is formed from a simple filter or the like.

The mixers 180-1, . . . , 180-p are arranged, respectively, corresponding to intermediate frequency subcarrier signal separators 178-1, . . . , 178-p. Each of the mixers 180-1, . . . , 180-p receives a local carrier signal from a corresponding one of the local carrier generators 172-1, . . . , 172-p and frequency-converts an intermediate frequency subcarrier signal using the intermediate frequency subcarrier signal obtained from a corresponding one of the intermediate frequency subcarrier signal separators 178-1, . . . , 178-p.

The demodulators 182-1, . . . , 182-p are arranged, respectively, corresponding to mixers 180-1, . . . , 180-p. Each of the demodulators 182-1, . . . , 182-p demodulates the intermediate frequency subcarrier signal frequency-converted and supplied from a corresponding one of the mixers 180-1, . . . , 180-p and outputs the demodulated signal.

In this arrangement, data signals from transmitting/receiving devices are modulated by, e.g., QSPK by the corresponding modulators 12-1, . . . , 12-p.

The signals modulated by the modulators 12-1, . . . , 12-p are frequency-converted into intermediate frequency subcarrier signals for optical transmission by the corresponding frequency converters 88-1, . . . , 88-p, respectively. More specifically, each of the frequency converters 88-1, . . . , 88-p adds/subtracts the frequency of the local carrier signal generated by a corresponding one of the local carrier generators 172-1, . . . , 172-p to/from the input band signal, thereby performing frequency conversion.

The first and second pilot carrier generators 14-1 and 14-2 generate the pilot carrier signals $f_{LO1}$ and $f_{LO2}$ having different frequencies, respectively. The adder 16 synthesizes the two pilot carrier signals $f_{LO1}$ and $f_{LO2}$ and outputs from the frequency converters 88-1, 88-2, . . . , 88-p, and outputs the synthesized signal to the laser driver 84. The laser driver 84 drives the laser element 86 in accordance with the signal synthesized by the adder 16 to generate a laser beam optically modulated in accordance with the synthesized signal from the adder 16, and sends the laser beam to the optical fiber 30.

In the up link signal processing system, an optical signal transmitted through the optical fiber 30 is converted into an electrical signal by the O/E converter 138 and supplied to the intermediate frequency subcarrier signal separators 178-1, . . . , 178-p.

The intermediate frequency subcarrier signal separators 178-1, . . . , 178-p separate intermediate frequency subcarrier signals of predetermined channels from the electrical signal. Each of the mixers 180-1, . . . , 180-p converts the intermediate frequency subcarrier signal supplied from a corresponding one of the intermediate frequency subcarrier signal separators 178-1, . . . , 178-p into a signal having a predetermined center frequency using the local carrier signal.

More specifically, each of the mixers 180-1, . . . , 180-p receives a local carrier signal from a corresponding one of the local carrier generators 172-1, . . . , 172-p. The intermediate frequency subcarrier signal is converted into a specific center frequency using the local carrier signal and the carrier component of the intermediate frequency subcarrier signal obtained from a corresponding one of the intermediate frequency subcarrier signal separators 178-1, . . . , 178-p. The specific center frequency is the same as the output frequency from the modulators 12-1, 12-2, . . . , 12-p.

The intermediate frequency subcarrier signals frequency-converted by the mixers 180-1, . . . , 180-p are demodulated by the corresponding demodulators 182-1, . . . , 182-p, respectively.

In this embodiment, in the arrangement having the down link signal processing system and up link signal processing system in the transmitting/receiving station 10I, local carrier signals are shared by the down link signal processing system and up link signal processing system.

More specifically, a local carrier signal is input from the local carrier generator 172-1 to the mixer 174-1 in the frequency converter 88-1, another local carrier signal is input from the local carrier generator 172-2 to the mixer 174-2 in the frequency converter 88-2, and still another local carrier signal is input from the local carrier generator 172-p to the mixer 174-p in the frequency converter 88-p. In this manner, local carrier signals are supplied from local carrier generators of the corresponding systems and also supplied to the mixers 180-1, . . . , 180-p in the up link signal processing system. More specifically, a local carrier signal is input from the local carrier generator 172-1 to the mixer 180-1, another local carrier signal is input from the local carrier generator 172-2 to the mixer 180-2, and still another local carrier signal is input from the local carrier generator 172-p to the mixer 180-p.

Figure 1:
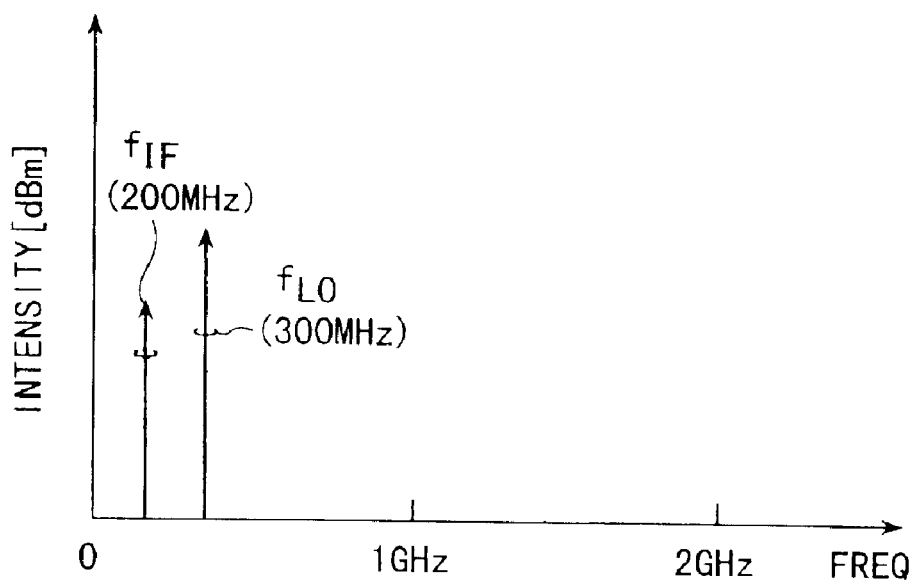
FIG. 1 is a graph showing the frequency arrangement of a conventional optical communication system.
Figure 2:
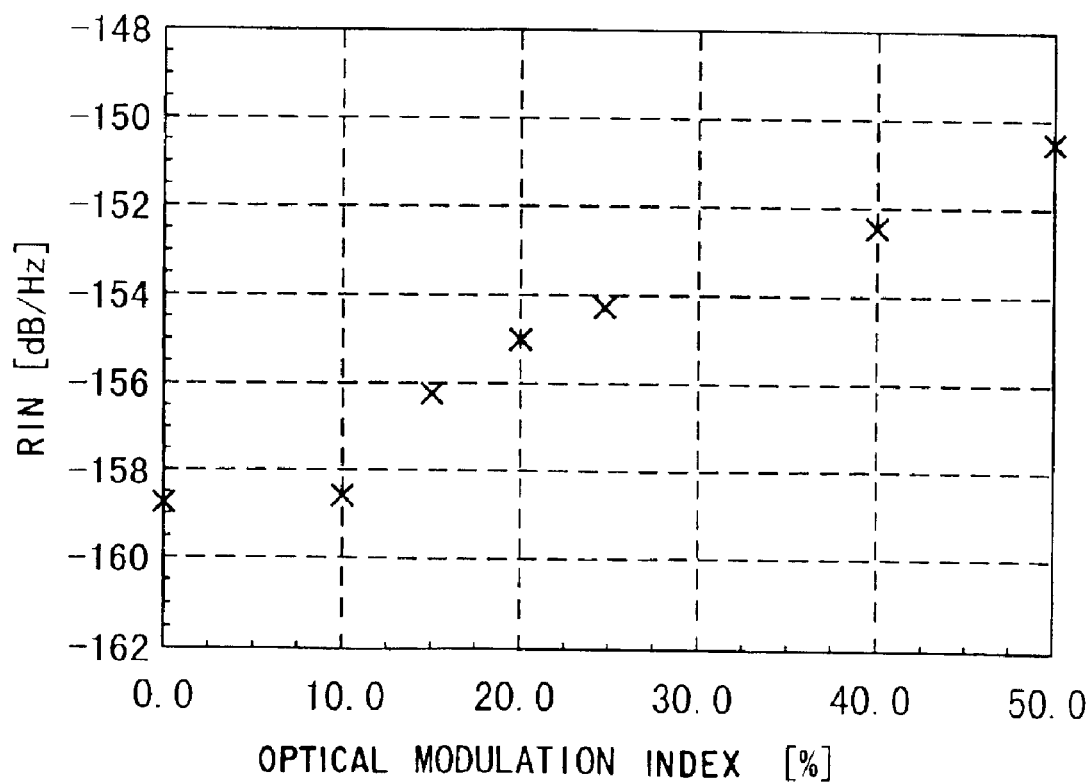
FIG. 2 is a graph showing the optical modulation index vs. RIN characteristics of a pilot carrier signal $f_{LO}$ in the conventional frequency arrangement.
Figure 3:
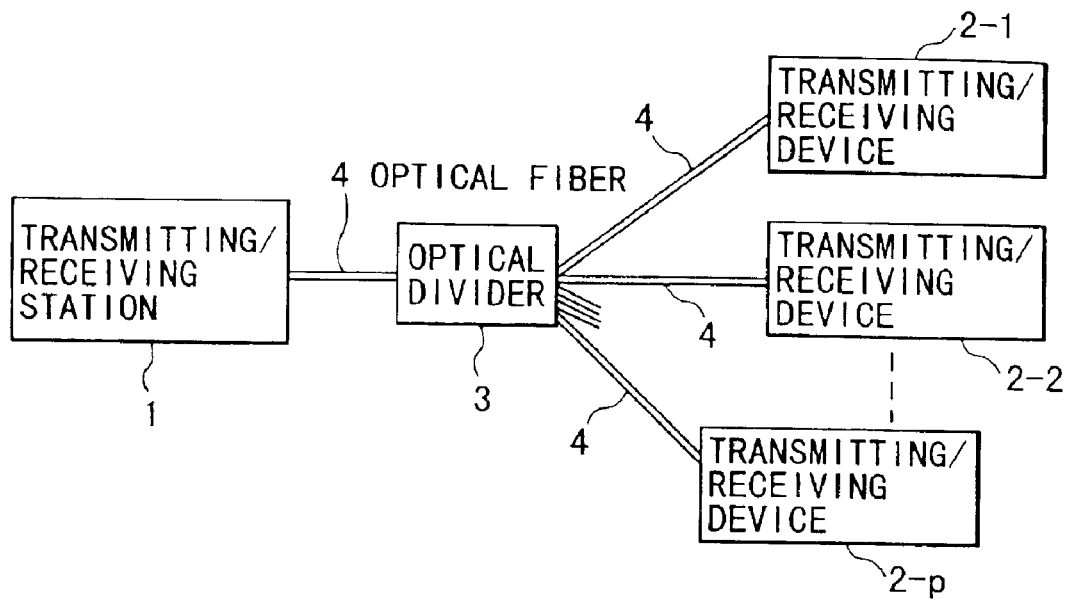
FIG. 3 shows a system arrangement of a conventional passive optical network.
Figure 4:
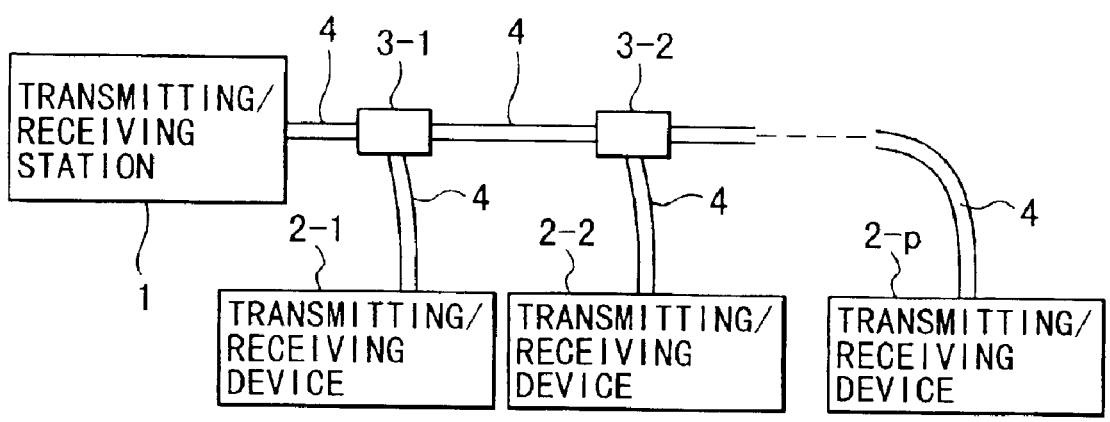
FIG. 4 shows another system arrangement of a conventional passive optical network.
Figure 5:
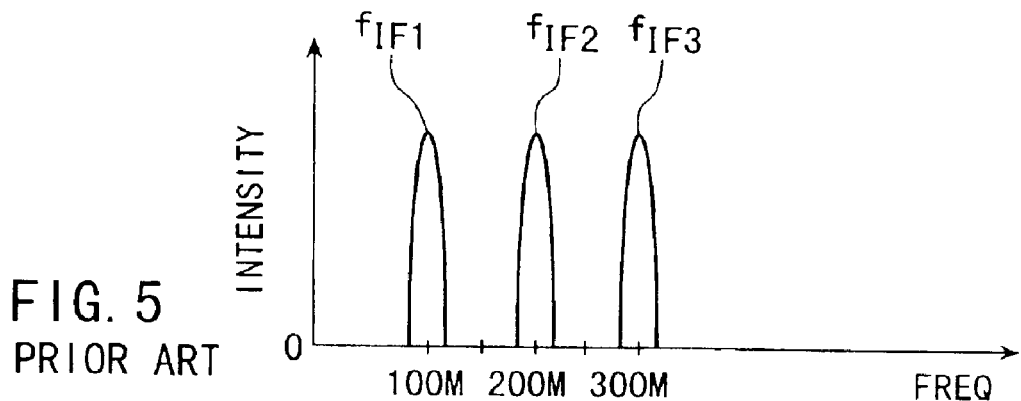
FIG. 5 shows the subcarrier multiplex of the conventional passive optical network.

In the present invention, up link subcarrier signals transmitted from the transmitting/receiving device having the arrangement as shown in FIG. 28, 29, or 30 are multiplexed at a sufficiently large frequency interval, as shown in FIG. 5, like the down link subcarrier signals. The frequency interval is the same as that between the down link subcarrier signals.

In the transmitting/receiving station 10I, the output from the local carrier generator 172-1 is divided into two paths. One path is connected to the mixer 174-1 in the frequency converter 88-1, and the other path is connected to the mixer 180-1. The up link intermediate frequency subcarrier signals $f_{IF1}$, . . . , $f_{IFp}$ obtained by converting an optical signal into an electrical signal and separating the signal by the intermediate frequency subcarrier signal separators 178-1, . . . , 178-p are converted by the mixers 180-1, . . . , 180-p, into frequencies suitable for demodulation by the demodulators 182-1, . . . , 182-p, respectively.

Since the local carriers from the local carrier generators 172-1, . . . , 172-p are used by the mixers 180-1, . . . , 180-p, the frequencies of signals to be input to the demodulators 182-1, . . . , 182-p can be easily and accurately controlled.

With this arrangement, the subcarrier frequencies between the transmitting/receiving devices when up link signals are subcarrier-multiplexed can be easily stabilized, and the frequencies of demodulator inputs of up link signals in the transmitting/receiving station are stabilized, so frequency control for demodulation is facilitated. Additionally, since the local carrier generator can be shared in the transmitting/receiving station, the equipment can be reduced. Furthermore, since local carriers are generated in the transmitting/receiving device and used for frequency conversion of both of the up link and down link signals, the frequency conversion unit of the transmitting/receiving device can be simplified.

The conversion frequency interval for frequency conversion of up link and down link signals in the transmitting/receiving devices may be different between the up link and down link. When down link signals are subcarrier-multiplexed as shown in FIG. 5, the up link signals need not be arranged in the same order as that of the down link signals, i.e., in the order of transmitting/receiving devices 32B-1, 32B-2, . . . , 32B-p in ascending order of frequencies. The order may be changed by appropriately changing the conversion frequency interval of the up link signals.

When the radio signal frequency radiated from the antenna largely changes between the up link and down link, the conversion frequency interval of up link signals is intentionally made different from that of down link signals in the transmitting/receiving devices such that the frequencies are in almost the same frequency band in optical subcarrier transmission. With this arrangement, the cost can be reduced because the subcarrier frequency band which allows inexpensive optical subcarrier transmission is limited.

In the above examples, the transmitting/receiving device has antennas independently prepared for the up link signal system and down link signal system. However, as in the arrangement for the up link signal system or down link signal system (FIG. 24 or 27), a plurality of antennas for the up link signal system or down link signal system may be arranged.

The above embodiments have been described about only an optical fiber network called a PON. However the present invention can be applied to another form such as a cable coaxial transmission or HFIFC (Hybrid fiber Coax) in which a signal is transmitted through an optical fiber and then divided through a coaxial cable.

The present invention is not limited to the above-described embodiments, and various changes and modifications can be made. For example, the multiplying factor of the frequency multiplier for multiplying a pilot carrier signal is not limited to an integral multiple and may be a decimal multiple.

As has been described above, according to the present invention, even when a large optical modulation index is set for the pilot carrier signal $f_{LO}$, the CNR of the intermediate frequency subcarrier signal $f_{IF}$ does not decrease, and the pilot carrier signal $f_{LO}$ with a high CNR can be obtained on the transmitting device side. Since a radio frequency signal received by the antenna of the receiving device may be weak, a signal for frequency conversion by the multiplier is required to have a high CNR. As the signal for frequency conversion, the pilot carrier signal $f_{LO}$ can be provided from the transmitting station. When the pilot carrier signal $f_{LO}$ is multiplied as the signal for frequency conversion, the noise characteristics are not largely degraded in frequency conversion because the CNR of the received pilot carrier signal $f_{LO}$ is high.

By adding the pilot carrier signal $f_{LO}$, an increase in RIN value of the intermediate frequency subcarrier signal $f_{IF}$ band can be suppressed. Hence, degradation in CNR of the intermediate frequency subcarrier signal $f_{IF}$ band can be reduced, and the optical modulation index of the pilot carrier signal $f_{LO}$ to be transmitted to the transmitting device side can be made large without increasing the RIN of the intermediate frequency subcarrier signal $f_{IF}$ band. Since the CNR of the pilot carrier signal $f_{LO}$ received on the transmitting device side can be made high, a high-quality radio frequency signal can be obtained while suppressing additive noise in frequency conversion. Since any degradation in CNR characteristics of the intermediate frequency subcarrier signal $f_{IF}$ and pilot carrier signal $f_{LO}$ can be suppressed, the optical fiber transmission distance can be increased. For example, when optical analog transmission of the present invention is applied to a radio communication base station, the communication service area covered by one transmitting station can be expanded.

According to the present invention, when one transmitting/receiving station accommodates a plurality of transmitting/receiving devices through a PON, the frequency stability between the transmitting/receiving devices can be maintained using a simpler optical transmission system. More specifically, when data signals subcarrier-multiplexed are to be distributed from a transmitting/receiving station to a plurality of transmitting/receiving devices, the intermediate frequency subcarrier signals to be used by the transmitting/receiving devices are subcarrier-multiplexed at a sufficiently large frequency interval such that the intermediate frequency subcarrier signals can be separated by a simple filter after reception of an optical signal. In addition, the radio frequency is set such that only two pilot carrier signals suffice to synchronize the frequencies of radio waves radiated from the transmitting/receiving devices (independently of the number of transmitting/receiving devices).

As a consequence, a communication system in which while establishing frequency synchronization between the transmitting/receiving devices, satisfactory transmission can be performed without sacrificing the optical modulation index of the intermediate frequency subcarrier signal in optical subcarrier transmission due to transmission of the pilot carrier signal, and the process of extracting necessary signals after reception of an optical signal is easy and inexpensive can be provided.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed:

1. A communication system in which at least three intermediate frequency subcarrier signals are frequency-multiplexed and transmitted, the at least three intermediate frequency subcarrier signals are frequency-converted into target frequency bands at transmission destination sides, and a signal bandwidth containing all the at least three intermediate frequency subcarrier signals is wider than a signal bandwidth of the target frequency bands, wherein when first and second pilot carriers are to be multiplexed and transmitted together with the at least three intermediate frequency subcarrier signals, frequencies of the at least three intermediate frequency subcarrier signals, a frequency of the first pilot carrier signal, and a frequency of the second pilot carrier signal are determined to obtain a frequency in the target frequency band by adding/subtracting an integral multiple of the frequency of the first pilot carrier signal and in an integral multiple of the frequency of the second pilot carrier signal to/from each of the frequencies of the at least the intermediate frequency subcarrier signals, wherein frequency subcarrier signals of at least three systems is an integral multiple of a predetermined frequency, and a frequency difference between the first pilot carrier signal and the second pilot carrier signal equals the predetermined frequency.

2. The system according to claim 1, further comprising:

a first multipler configured to multiply the first pilot carrier signal;

a second multipler configured to multiply the second pilot carrier signal;

a first mixer configured to mix an output from said first multipler with the intermediate frequency subcarrier signal; and a second mixer configured to mix an output from said first mixer with an output from said second multipler.

3. The system according to claim 1, further comprising:

a first multipler configured to multiply the first pilot carrier signal;

a second multipler configured to multiply the second pilot carrier signal;

a first mixer configured to mix an output from said first multipler with an output from said second multipler; and a second mixer configured to mix an output from said first mixer with the intermediate frequency subcarrier signal.

4. The system according to claim 1, further comprising:

a first divider configured to distribute the first pilot carrier signal into plural outputs;

a second divider configured to distribute the second pilot carrier signal into plural outputs;

a first mixer configured to add m outputs from said first divider;

a second mixer configured to add n outputs from said second divider; and a third mixer configured to mix outputs from said first and second mixers with the intermediate frequency subcarrier signal.

5. A communication system in which at least three intermediate frequency subcarrier transmission signals are frequency-multiplexed and transmitted from a transmitting/receiving station to one or a plurality of transmitting/receiving devices, the at least three intermediate frequency subcarrier transmission signals are frequency-converted into target frequency bands at the transmitting/receiving devices, at least three intermediate frequency subcarrier reception signals are frequency-converted in the transmitting/receiving devices, frequency-multiplexed, and transmitted to said transmitting/receiving station, and a signal bandwidth containing all the at least three intermediate frequency subcarrier transmission signals is wider than a signal bandwidth of the target frequency bands, wherein when said transmitting/receiving station is to multiplex and transmit, to said transmitting/receiving device, first and second pilot carrier signals together with the at least three intermediate frequency subcarrier transmission signals, frequencies of the at least three intermediate frequency subcarrier transmission signals, a frequency of the first pilot carrier signal, and a frequency of the second pilot carrier signal are determined to obtain a frequency in the target frequency band by adding/subtracting an integral multiple of the frequency of the first pilot carrier signal and an integral multiple of the frequency of the second pilot carrier signal to/from each of the frequencies of the at least three intermediate frequency subcarrier transmission signals, and said transmitting/receiving device frequency-converts the intermediate frequency subcarrier reception signal using the integral multiple of the frequency of the first pilot carrier signal transmitted from said transmitting/receiving station and the integral multiple of the frequency of the second pilot carrier signal transmitted from said transmitting/receiving station.

6. A communication system in which at least three intermediate frequency subcarrier transmission signals are frequency-multiplexed and transmitted from a transmitting/receiving station to one or a plurality of transmitting/receiving devices, the at least three intermediate frequency subcarrier transmission signals are frequency-converted into target frequency bands at the transmitting/receiving devices, at least three intermediate frequency subcarrier reception signals are frequency-converted in the transmitting/receiving devices, frequency-multiplexed, and transmitted to said transmitting/receiving station, and a signal bandwidth containing all the at least three intermediate frequency subcarrier transmission signals is wider than a signal bandwidth of the target frequency bands, wherein when said transmitting/receiving station is to multiplex and transmit, to said transmitting/receiving device, first and second pilot carrier signals together with the at least three intermediate frequency subcarrier transmission signals, frequencies of the at least three intermediate frequency subcarrier transmission signals, a frequency of the first pilot carrier signal, and a frequency of the second pilot carrier signal are determined to obtain a frequency in the target frequency band by adding/subtracting an integral multiple of the frequency of the first pilot carrier signal and an integral multiple of the frequency of the second pilot carrier signal to/from each of the at least three frequencies of the intermediate frequency subcarrier transmission signs, and said transmitting/receiving device generates a local carrier signal using the integral multiple of the frequency of the first pilot carrier signal transmitted from said transmitting/receiving station and the integral multiple of the frequency of the second pilot carrier signal transmitted from said transmitting/receiving station, frequency-converts the intermediate frequency subcarrier transmission signal into the target frequency band using the local carrier signal, and frequency-converts a received radio frequency signal into the intermediate frequency subcarrier reception signal using the local carrier signal.

7. A communication system in which at least three intermediate frequency subcarrier signals are frequency-multiplexed and transmitted, the at least three intermediate frequency subcarrier signals are frequency-converted into target frequency bands at transmission destination sides, and a signal bandwidth containing all the at least three intermediate frequency subcarrier signals is wider than a signal bandwidth of the target frequency bands, wherein when first and second pilot carriers are to be multiplexed and transmitted together with the at least three intermediate frequency subcarrier signals, frequencies of the at least three intermediate frequency subcarrier signals, a frequency of the first pilot carrier signal, and a frequency of the second pilot carrier signal are determined to obtain a frequency in the target frequency band by adding/subtracting an integral multiple of the frequency of the first pilot carrier signal and in an integral multiple of the frequency of the second pilot carrier signal to/from each of the frequencies of the at least the intermediate frequency subcarrier signals, wherein a frequency interval between the intermediate frequency subcarrier signals of at least three systems is an integral multiple of a predetermined frequency, and a frequency of the second pilot carrier signal, equals the predetermined frequency.

8. The system according to claim 7, further comprising:
a first multipler configured to multiply the first pilot carrier signal;
a second multipler configured to multiply the second pilot carrier signal;
a first mixer configured to mix an output from said first multipler with the intermediate frequency subcarrier signal; and
a second mixer configured to mix an output from said first mixer with an output from said second multipler.

9. The system according to claim 7, further comprising:
a first multipler configured to multiply the first pilot carrier signal;
a second multipler configured to multiply the second pilot carrier signal;
a first mixer configured to mix an output from said first multipler with an output from said second multipler; and
a second mixer configured to mix an output from said first mixer with the intermediate frequency subcarrier signal.

10. The system according to claim 7, further comprising:
a first divider configured to distribute the first pilot carrier signal into plural outputs;
a second divider configured to distribute the second pilot carrier signal into plural outputs;
a first mixer configured to add m outputs from said first divider;
a second mixer configured to add n outputs from said second divider; and
a third mixer configured to mix outputs from said first and second mixers with the intermediate frequency subcarrier signal.

* * * * *